United States Patent
Coleman

(10) Patent No.: US 8,619,363 B1
(45) Date of Patent: Dec. 31, 2013

(54) LIGHT REDIRECTING ELEMENT COMPRISING A FORWARD DIFFRACTING REGION AND A SCATTERING REGION

(75) Inventor: Zane Coleman, Somerville, MA (US)

(73) Assignee: Fusion Optix, Inc., Woburn, MA (US)

( * ) Notice: Subject to any disclaimer, the term of this patent is extended or adjusted under 35 U.S.C. 154(b) by 866 days.

(21) Appl. No.: 12/266,532

(22) Filed: Nov. 6, 2008

Related U.S. Application Data

(60) Provisional application No. 60/985,649, filed on Nov. 6, 2007.

(51) Int. Cl.
*G02B 5/18* (2006.01)

(52) U.S. Cl.
USPC ............... 359/576; 359/599; 362/607

(58) Field of Classification Search
None
See application file for complete search history.

(56) References Cited

U.S. PATENT DOCUMENTS

| | | | |
|---|---|---|---|
| 5,420,947 A | 5/1995 | Li et al. | |
| 5,703,667 A | 12/1997 | Ochiai | |
| 6,020,944 A | 2/2000 | Hoshi | |
| 6,151,166 A | 11/2000 | Matsushita et al. | |
| 6,259,561 B1 * | 7/2001 | George et al. | 359/566 |
| 6,947,215 B2 | 9/2005 | Hoshi | |
| 6,991,358 B2 | 1/2006 | Kokogawa | |
| 7,364,340 B2 * | 4/2008 | Choi et al. | 362/619 |
| 2003/0002153 A1 * | 1/2003 | Hiraishi et al. | 359/452 |
| 2006/0181903 A1 | 8/2006 | Okuwaki | |
| 2006/0187677 A1 | 8/2006 | Parikka et al. | |

OTHER PUBLICATIONS

Siitonen, Samuli, "White LED light coupling into light guides with diffraction gratings," Applied Optics, Apr. 20, 2006, pp. 2623-2630, vol. 45, No. 12.
Siitonen, Samuli, "Coupling of light from an LED into a thin light guide by diffractive gratings,"Applied Optics, Oct. 20, 2004, pp. 5631-5636, vol. 43, No. 30.
Laakkonen, Pasi,"Double-groove, two depth grating coupler for light guides," J. Opt. Soc Am. A, Dec. 2006, pp. 3156-3161,vol. 23, No. 12.
Waldhausi, Ralf, "Efficient coupling into polymer waveguides by gratings," Applied Optics, Dec. 20, 1997, pp. 9383-9390, vol. 36, No. 36.
Chien, Ko-Wei, "An integrated lightguide equipped with polarization conversion," Society for Information Display 2002 International Symposium Digest, 2002, pp. 1229-1231, vol. 33.
Lee, M.G., "Optical Characteristics of Holographic Light-Guide Plate for LCD," EuroDisplay 2002 Conference Proceedings, 2002, pp. 343-346.

* cited by examiner

*Primary Examiner* — Arnel C Lavarias
(74) *Attorney, Agent, or Firm* — Fusion Optix, Inc.

(57) ABSTRACT

Improved Light Re-directing Elements (ILRE) are provided in which a diffracting region is combined with a light scattering region to correct angular chromatic dispersion. Further embodiments include optical devices and systems using ILRE to reduce moiré, efficiently re-direct light, improve spatial and angular color and luminance uniformity, and reduce wavelength dispersion. In one embodiment, the light scattering region is a volumetric anisotropic light scattering region. Embodiments are included for use of ILRE in light emitting devices, displays and light fixtures.

12 Claims, 9 Drawing Sheets

LIGHT REDIRECTING ELEMENT COMPRISING A FORWARD DIFFRACTING REGION AND A SCATTERING REGION

RELATED APPLICATIONS

This application claims the benefit of priority under 35 U.S.C. 119(e) to U.S. Provisional Application No. 60/985,649, filed on Nov. 6, 2007, the entire contents of which is incorporated herein by reference.

FIELD OF THE INVENTION

The invention generally relates to optical elements, methods of manufacturing optical elements and light emitting devices comprising optical elements.

BACKGROUND

Conventional liquid-crystal-display (LCD) backlights for large displays have conventionally employed multiple lamps to provide sufficient brightness over a large area. Typically, these spatially non-uniform, directly illuminated backlights are used for television and large display applications and contain linear arrays of fluorescent lamps with reflectors. In order to provide a uniform intensity profile from the surface of the backlight before passing through the LCD panel, volumetric diffuser plates or films are used to "spread-out" or diffuse the light from the linear array of fluorescent lights so as to eliminate the visibility of linear "hot spots" or non-uniformities in the backlight luminance.

With the emergence of light-emitting diodes (LED's) as new light sources for backlights, the LED's are often employed in linear or grid arrays and may include separate red, green and blue LED packages or all three within the same package. Backlights employing LED's not only have to improve the luminance uniformity using films, plates, and housings, but they also need to improve the color uniformity. This is often accomplished by simply increasing the amount of diffusion and not taking into account the loss in efficiency resulting by using diffusers with symmetric forward scattering profiles.

For many display applications, such as for some televisions, the viewing angle in the vertical direction is reduced such that the brightness in the forward direction is increased. This light is typically directed from higher vertical angles closer to the normal to the display using collimating films, such as prismatic brightness enhancement films. Additional films are often used such as reflective polarizers, such as dual brightness enhancement film (DBEF) from 3M (St. Paul, Minn., US). The patent literature refers to scattering reflective polarizers (U.S. Pat. Nos. 5,825,543 and 5,751,388); however, the systems described in these patents are not optimized to take into account the spatial non-uniformity of the light sources and the requirements needed to achieve spatial luminance uniformity, spatial color uniformity, as well increased head-on luminance in compact, thin, efficient systems. Using multiple films to attempt to achieve properties, such as spatial luminance uniformity, is optically inefficient due to the multiple interfacial reflections; and the manufacturing and assembly costs are higher. A more-efficient optical system for reducing the non-uniformities is needed to reduce the number of lamps (to provide a lowercost system) or to reduce the brightness of the lamps (wherein longer-lifetime or lower-cost lamps could be used) in a system with a reduced cost.

It is known that anisotropic diffusers can improve the luminance uniformity of backlights with spatially non-uniform light sources; however, greater system efficiency is desired in order to improve the system luminance and color uniformity as well as luminance uniformity while also achieving increased luminance.

Additionally, the light from backlight components such as light guides is often directed at an angle far from the normal angle. It is commonly preferred to redirect light from backlight components toward the backlight or display normal, which is the preferred viewing angle. Numerous optical films such as beaded diffusers, volumetric diffusers, collimation films, reverse prism films attempt to direct light toward the display normal with varying efficiencies and trade-offs, particularly the need for multiple film components to achieve the redirection and spread of light spatially to provide uniformity. Existing films and components are either inefficient, expensive to produce, or un-optimized with regards to providing sufficient uniformity and light re-direction for large displays.

The use of multiple films within an LCD backlight increases the production costs, increases the likelihood of dust and blemishes, and increases the part count and thickness. There is a need for fewer components for backlights that have light redirecting or collimation properties, sufficient diffusion for light homogenization and light recycling properties combined together in order to help alleviate these problems and that can be manufactured in a low-cost simple method. There is a need for a component for a backlight with increased spatial luminance uniformity and increased luminance in a particular direction. In newer LED-based backlights, increased color uniformity is important.

The use of prismatic surface structures wherein the features are greater than 10 times the wavelength of light of interest (typically greater than about 5 µm for visible light devices) on optical films can often lead to problems of Moire interference with the pixel pitch of a spatial light modulator such as an liquid crystal display in one or more directions. Also, a large range of input angles to the films can introduce spurious reflections that cause light to deviate significantly from the intended direction.

SUMMARY

Embodiments of this invention include an Improved Light Re-directing Element (ILRE) comprising a forward or backward diffracting region with predetermined chromatic dispersion properties in combination with a light scattering region with predetermined light scattering properties in order to correct angular chromatic dispersion. Further embodiments of this invention include an ILRE in an optical system to reduce moiré, efficiently re-direct light, improve spatial and angular color and luminance uniformity and reduced wavelength dispersion. In one embodiment, the light scattering region is a volumetric anisotropic light scattering region. In a further embodiment, a light emitting device, display or light fixture comprises the ILRE.

In one embodiment of this invention, a light emitting device comprises an ILRE and has improved spectral and luminance output properties. In a further embodiment, an electroluminescent display comprises a backlight which comprises at least one light source and the improved light redirecting element. In another embodiment, the ILRE further comprises an anisotropic light scattering region and a blazed diffraction grating. In further embodiments, light emitting devices including light fixtures, backlights and displays comprising the ILRE have improved optical properties such as low angular color shift.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
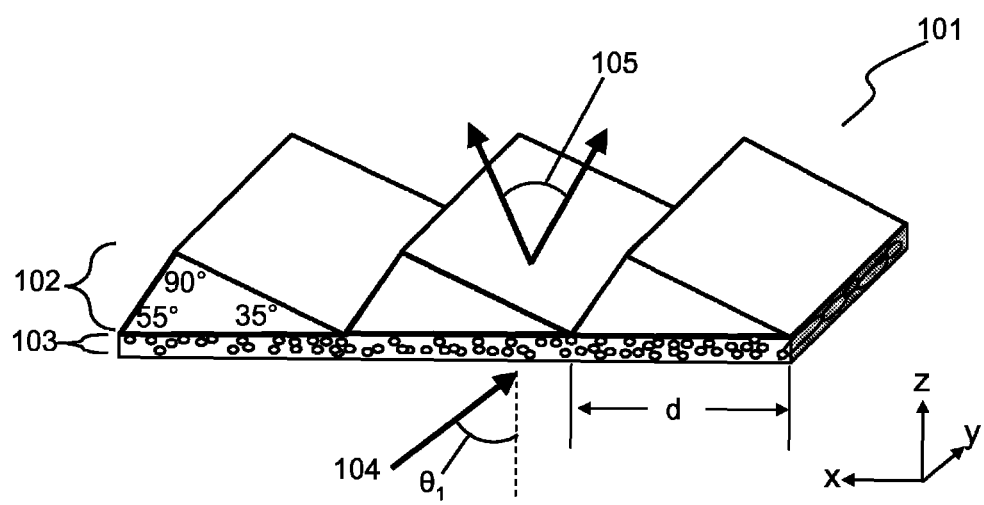
FIG. 1 is a perspective view of one embodiment of this invention of an ILRE wherein light is incident on a light scattering region which is optically coupled to a light diffracting region.

The features and other details of the invention will now be more particularly described. It will be understood that particular embodiments described herein are shown by way of illustration and not as limitations of the invention. The illustrations are not drawn to scale in order to illustrate particular features and properties. The principal features of this invention can be employed in various embodiments without departing from the scope of the invention. All parts and percentages are by weight unless otherwise specified.

Definitions

For convenience, certain terms used in the specification and examples are collected here.

"Diffuse" and "diffusing," as defined herein, include light scattering or diffusion by reflection, refraction or diffraction from domains, surfaces, or layers or regions.

"Diffuser region" and "Diffuser Film" and "Diffuser" and "light-scattering region" are referred to herein as optical regions or elements such as films or plates that provide a scattering or diffusion property to one or more light rays. The change in angle of a light ray may be due to refraction, reflection, diffusion, diffraction, re-emission or other properties known to change the direction of incident light.

"Polarizer," as defined herein, includes absorbing or reflecting polarizers. These include dye and iodine based polarizers and reflective polarizers such as DBEF from 3M. Linear or circular polarizers are also included. Reflective polarizers can be based on multi-layer stacks of materials of differing refractive index along one or more axes.

"Polarization-sensitive," "polarization-dependent," and "polarization selective" as referred to herein refer to materials, effects, or properties that may vary depending on the polarization state of the incident electromagnetic radiation. "Polarization-insensitive" and "non-polarization-dependent" and "polarization independent" refer to herein to materials, effects, or properties that are substantially independent of the polarization state of the incident electromagnetic radiation.

"Optically coupled" is defined herein as a condition wherein two regions or layers are coupled such that the intensity of light passing from one region to the other is not substantially reduced by Fresnel interfacial reflection losses due to differences in refractive indices between the regions. "Optically coupling" methods include methods of coupling wherein the two regions coupled together have similar refractive indices or using an optical adhesive with a refractive index substantially near or in-between the regions or layers. Examples of "optically coupling" include lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. In manufacturing, two components may be combined during the forming process, such as extrusion, coating, casting or molding. For example, two layers may be co-extruded together such that they are bonded or cured in contact with each other. In these instances, the layers or regions are referred to as being optically coupled.

"Prismatic" or "Prismatic sheet" or "Prismatic structure" is defined herein as a surface relief structure with a cross-section extending from the plane that has two sides intersecting at an apex angle. Slight deviations from this profile such as slightly rounded intersections of the sides and arcuate or non-smooth surfaces are included herein as "prismatic" structures. These features can be defined by a cross-sectional profile, surface roughness, or by other surface characterization means. Prismatic features typically have triangular shapes when viewed in a cross-section of one or more planes.

"Collimating region," "Collimating Film" and "Collimating structures" are defined here as films or structures wherein more of the light rays exiting the film or structures are directed toward the surface normal of the component, film or substrate plane in the case of structures on a substrate. Collimation properties can be achieved by refractive structures, such as prisms, cones, microlenses, pyramids, hemispherical structures or linear, circular, random, regular, semi-random, or planar arrays of the aforementioned structures.

Used herein, "particles" and "domains" refer to individual regions of one or more materials that are distinctly different than their surroundings. They include organic particles, inorganic particles, dispersed domains, and dispersed particles. They are not limited in shape and may be fibrous, spherical, ellipsoidal, or plate-like in shape.

"Diffraction grating" used herein refers to a repetitive array of diffractive structures that produces a periodic alteration in the phase, amplitude or both of emerging waves. These include interfacial structures wherein the refractive index difference between the two mediums defining the interface is sufficiently large (typically the refractive index (delta n) is greater than 0.001) and the physically defining structure of the interface is sufficient to diffract light. The grating may comprise linear, regular or irregular, ordered, or random elements and these elements may be combined into groups comprising similar elements. The grating may have features such as planes, lines, curves, facets, ridges, cross-sections, etc. that are substantially parallel along one or more axes.

"Blazed gratings" are a type of diffraction grating wherein the geometry of the micro-features has been altered to adjust the energy flow distribution. The shape may be changed from a symmetric profile to one with an asymmetric profile in order to increase the efficiency of diffraction in a first diffractive order. In transmission blazed gratings, the asymmetric profile can direct more of the diffracted light at a specific wavelength into a +1 forward diffracted order. Similarly, in reflective blazed gratings, the asymmetric profile can direct more of the diffracted light at a specific wavelength into a +1 backward diffracted order.

As used herein, the angles when described from the "normal" of a surface, refer to the normal direction to the extended large area (typically planar) surface and not to the normal of microscale or nanoscale surface variations or surface relief patterns in the surface profile which may vary across small dimensions.

The term "polymer" will be understood to include polymers, copolymers (e.g. polymers using two or more different monomers), oligomers and combinations thereof, as well as polymers, oligomers, or copolymers that are useful to form the interpenetrating polymer network ("IPN") or semi-interpenetrating polymer network ("semi-IPN"). The term IPN refers to a broad class of polymer blends in which one polymer is mixed or polymerized in the presence of another polymer or monomer mixture. The polymers can form a variety of molecular phases consisting of co-crosslinked phases, thermoplastic (crystalline phases), mechanically cross-linked phases, e.g. by means of chain entanglement or co-crosslinked networks in which the two different polymer phases have chemical crosslinking between the polymer phases. The term semi-IPN, refers specifically to a blended polymer network where only one component of the polymer mixture is covalently crosslinked to itself. The term co-crosslinked IPN, or co-crosslinked semi-IPN, refers to the special case where both polymer networks can react in such a manner to form a co-crosslinked polymer blend. Specific descriptions can be found in such references as IPNs Around the World-Science and Engineering, by Kim and Sperling Eds, Wiley Science, 1997 Chapter 1.

Embodiments of this invention include optical elements such as improved light redirecting elements comprising light diffracting regions and light scattering regions. Further embodiments include light emitting devices such as backlights, displays and light fixtures comprising an improved light redirecting element. In one embodiment, the angular diffusion of the light scattering region corrects the angular chromatic dispersion of the light diffracting region such that the total output angular color shift is less than 0.01 over an angular range. In further embodiments, the ratio of the angular diffusion of the light scattering region to the angular chromatic dispersion of the light diffractive region is greater than 0.5 in one or more planes. The light diffracting region may be forward diffracting (transmissive) or backward diffracting (reflective) or a combination thereof.

In some embodiments of this invention, a significant portion of light is incident on the light scattering region before reaching the light diffracting region. In additional embodiments of this invention, the light is incident on the light diffracting region before reaching the light scattering region.

FIG. 1 illustrates one embodiment of this invention wherein an improved light re-directing optical element 101 comprises a volumetric anisotropic light scattering region 103 disposed to receive incident light 104 from a first angle $\theta_1$ and increase the angular input profile of the light directed into the light diffracting region 102 optically coupled to the volumetric anisotropic light scattering region 103 to provide increased angular de-saturation of the output light 105 re-directed by the asymmetric diffraction grating 102 into the angular range 105.

Figure 2:
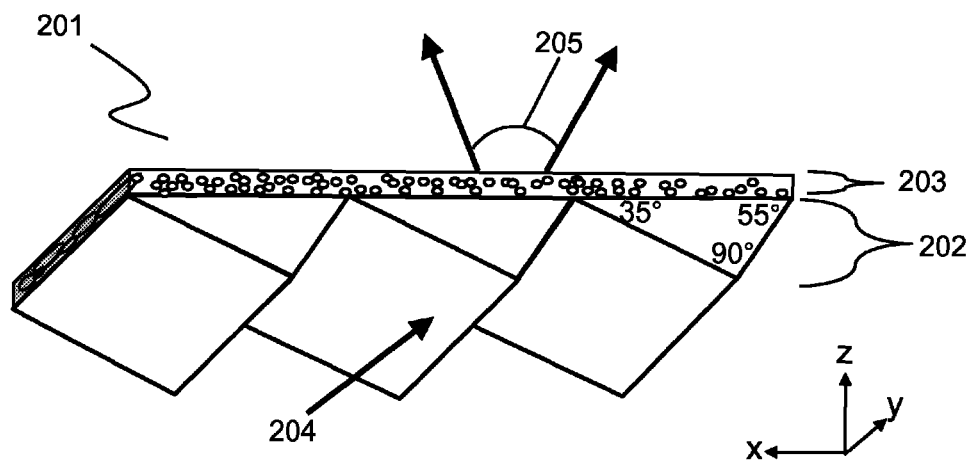
FIG. 2 is a perspective view of one embodiment of this invention of an ILRE wherein light is incident on a light diffracting region which is optically coupled to a light scattering region.

FIG. 2 illustrates another embodiment of this invention, wherein an improved ILRE 201 comprises a volumetric anisotropic light scattering region 203 disposed in the light path following an asymmetric blazed diffraction grating region 202. The asymmetric blazed diffraction grating region 202 is disposed to receive incident light 204 and diffract the light toward a second peak angle different from the incident angle toward the volumetric anisotropic light scattering region 203 (which is optically coupled to the asymmetric blazed diffraction grating region 202) which reduces the reduces the angular color shift in the angular range 205.

In this embodiment, incident light over a predetermined angular range is diffracted by the asymmetric blazed grating. The light is chromatically dispersed due to light of varying wavelengths diffracting into different angles with different diffraction efficiencies based on the principles of diffraction. The angular, wavelength and efficiency properties can be modeled by the grating equation or similar diffraction modeling including rigorous coupled wave theory. In conditions where the range of incident angles is small or restricted over a specific range, the light diffracted by the grating into a first plane can be visibly chromatically dispersed such that different wavelengths (or colors, or deviations from white for example) can be seen when viewing the element from different angles in that plane. A symmetrically scattering region disposed to receive light from the grating will re-spread the light angularly in the first plane and a second plane orthogonal to the first. In some embodiments, the spreading of the light in both orthogonal planes is undesirable and reduces the intensity of the light in the desired direction (such as normal to the element or display if it is used in backlight for a display). The reduction in intensity is due to the increased scattering in the second plane. By combining the asymmetric blazed diffraction grating with a volumetric anisotropic light scattering region in which the primary plane of diffraction is parallel to the major plane of anisotropic scattering, a contribution from each of the dispersed wavelengths is spread into a larger range of angles through the scattering, thus achieving a more uniform color over a range of angles within the first or primary plane of diffraction. This can result in an improved light re-directing optical element with reduced angular color dispersion and increased color and luminance uniformity.

Similarly, a further embodiment of this invention is an improved light redirecting element comprising an anisotropic light scattering region disposed to receive light and anisotropically scatter the incoming light more in a first plane than a second plane. The element further comprises a blazed diffraction grating with asymmetric faces extending in a direction perpendicular to the major scattering plane of the anisotropic light scattering region disposed to receive light from the anisotropic light scattering region. In this embodiment, incident light which is restricted in angular range along at least one axis (such as light confined within an optical light guide) will scatter anisotropically, thus increasing the angular extent of the light which is then incident on the diffraction grating. As a result the angular extent of the light (the angular light distribution) reaching the blazed diffraction grating will be increased and each angular component will average with the other angular components in a specific region. Light at one wavelength, 550 nm for example, will have a larger diffractive angular output in one given region because the angular input is increased. Similar angular broadening will occur with other wavelengths such that the overlapping diffraction profiles will produce angular light output with a reduced color dispersion or angular color shift such that the color variation with angle is reduced.

Location of the Improved Light Redirecting Element

In one embodiment of this invention, the improved light redirecting element (ILRE) of this invention is disposed on a light guide. In this configuration, the angular range and wavelengths of the light incident on the light redirecting element are determined by the incident light output from the light source (such as a CCFL bulb or one or more LED's) and the refractive indexes of the waveguide defining the total internal reflections at the surfaces of the light guide. In one embodiment, the ILRE is located on at least one of the top, bottom, or sides of the light guide.

In a further embodiment of this invention, a light guide comprises the ILRE such that the light diffracting region is disposed between the outer two larger surfaces of a planar (or substantially planar) or wedge-shaped light guide. In a further embodiment, the anisotropic light scattering region is disposed in-between the outer two larger surfaces of a planar (or substantially planar or wedge-shaped) light guide. In another embodiment of this invention, the light diffracting region of the ILRE is disposed on one or more surfaces of the lightguide and is optically coupled to the light scattering region. In one embodiment, the light scattering region is adjacent to the light diffraction region. In another embodiment, the light scattering region is optically coupled to the light diffracting region by both regions being optically coupled to an intermediate light transmissive lightguide region.

In one embodiment of this invention, a display comprises a backlight comprising an ILRE and a spatial light modulator (such as a liquid crystal panel). In a further embodiment of this invention, a display comprises an ILRE disposed between a lightguide and a spatial light modulator. In this embodiment, the light from a light guide is redirected to a substantially smaller angle as measured from the normal of at least one of the planes from the group comprising the output plane of the display, the output plane of the backlight, output plane of the light guide.

In a further embodiment of this invention, the ILRE is disposed between a light source and a light guide. In this embodiment, the light from a light source is redirected into angles such that a significant amount of the light is coupled into the light guide. In one embodiment, light with a wavelength of 532 nm incident normal to one surface of the ILRE is redirected to an angle greater than 42 degrees from the normal of the output plane of the light guide. In this configuration, the ILRE can function as an input coupler with improved efficiency and spectral properties. This configuration can allow light sources such as light emitting diodes to be located beneath a light guide which allows for better spreading of thermal heat from the sources (as opposed to LED's along the edge) due to the ability to increase the separation between LED's. Additionally, the light diffracting region can increase the lateral spread by using predetermined diffraction grating features that direct light into higher angles which transfers a significant amount of the light flux laterally before it reaches a surface of the lightguide region, thus allowing for a thinner light scattering region, such as a diffusion plate, that contributes to the color and luminance uniformity.

An array of ILRE's or an array of blazed diffraction elements in combination with an anisotropic light scattering region can be disposed along one or more of the surfaces of a light guide or layer or region of a backlight. In one embodiment, an array of ILRE's are disposed such that the light is coupled into or out of a light guide in the regions corresponding to where the ILRE is optically coupled to (or part thereof) the light guide. The array may be spatially varying in size, shape, pitch, diffraction efficiency, or other optical or physical property or orientation along one or more axes.

Figure 3:
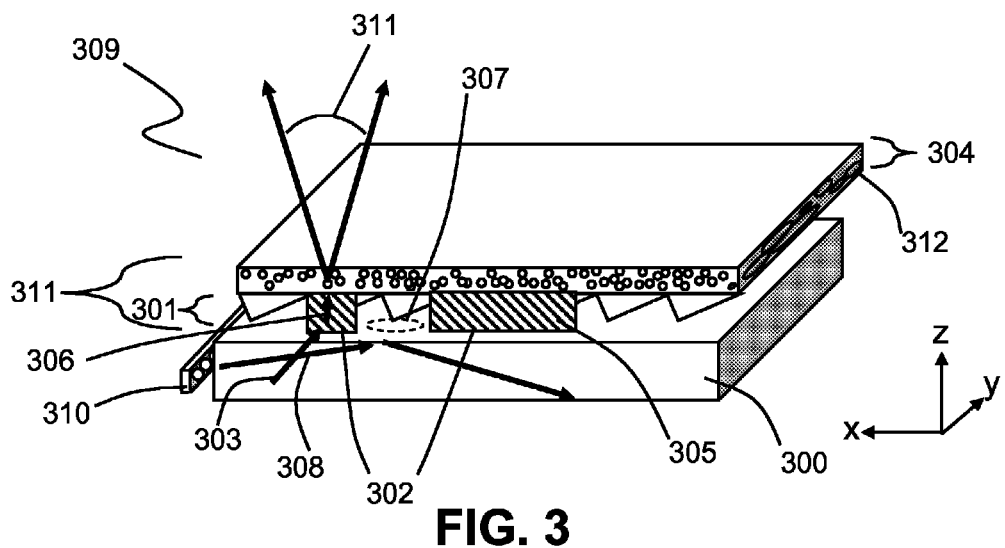
FIG. 3 is a perspective view of one embodiment of this invention of a light emitting device comprising an ILRE.

FIG. 3 illustrates an example of a light emitting device 309 of one embodiment of this invention comprising an ILRE 312 with a volumetric anisotropic light scattering region 304 and a light diffracting region 301 optically coupled to a light guide 300 in distinct, spatially varying regions 302 such that the incident light 303 from an array of LED's 310 is re-directed in the regions 302 where the grating is coupled to the light guide and passes onto the light diffracting region 301 and a volumetric anisotropic light scattering region 304. In this embodiment, the surface relief portion of the grating is facing the light guide and the adhesive 305 functions to bond the ILRE 312 to the light guide 300 at spatially varying regions 302 and optically couple incident light 303 into the ILRE 312 in a spatial pattern. The adhesive 305 can be applied spatially using a screenprinting technique such that where the light diffracting region 301 is in contact with the adhesive 305 and lightguide 300, incident light 303 optically couples into the light diffracting region 301 and is diffracted to light 306 with second angular direction different than the incident angle toward the volumetric anisotropic light scattering region 304 to exit through an angular range 311 with a low angular color shift. In the regions 307 where the light diffracting region 301 is not optically coupled to the light guide, the incident light 308 at an angle larger than the critical angle totally internal reflects and does not directly reach the grating. In a further embodiment of this invention, the light scattering region of an ILRE is optically coupled in a spatially varying pattern of a light transmitting material.

In a further embodiment of this invention, an ILRE is disposed along the input surface of a light guide such that a significant amount of the light from the light source that would not directly reach the upper or lower surfaces (i.e. light that would travel to one of the side surfaces) is redirected toward at least one of the upper (light emitting) surface or lower surfaces. In a further embodiment, an ILRE comprising a diffraction grating with a symmetric profile is disposed along an input edge or light guide input surface such that light is directed to the upper or lower surfaces more efficiently resulting in more light extracted from the light guide than would otherwise due to the light being coupled out directly without the need for the light to travel to various edges where it would be reflected with a loss due to the imperfect reflection properties of reflective films (diffuse or specular reflecting films).

In one embodiment of this invention, the ILRE is a free-standing optical film that can be used in an optical system to re-direct light in a predetermined region and at least one of modifying the angular spread of output light of a predetermined wavelength range and modifying the spread of wavelengths at a predetermined angular output.

In a further embodiment of this invention, a backlight with reduced angular or spatial color dispersion comprises at least one light source designed to directly illuminate light scattering or redirecting components (as opposed to edge-illuminating or indirect illumination) and an ILRE disposed to receive light from a light source and redirect and reduce the angular color shift in one or more regions. In one embodiment of this invention, a backlight with reduced color dispersion comprises an ILRE disposed between an array of light emitting diodes directed towards a light emitting surface. In a separate embodiment, a backlight with improved color dispersion comprises an array of linear fluorescent lamps and an ILRE disposed to diffract and anisotropically scatter light in a plane perpendicular to the array. In a further embodiment, a backlight with reduced spatial or angular color dispersion comprises at least one ILRE and at least one light source disposed to directly illuminate the light emitting area and at least one light source disposed to indirectly illuminate the light emitting area.

The ILRE may be located in a backlight between the light-emitting sources and the display. In one embodiment, the ILRE is located between a linear array of light sources and a liquid crystal cell. In another embodiment, the ILRE is disposed between a light source and a light output surface of a light emitting device. In a further embodiment of this invention, the ILRE is optically coupled to polarizer and the resulting component is optically coupled to an LCD panel.

Improve Light Redirecting Element Size

The dimensions of the ILRE or an included region may extend to be substantially located between the light paths from the light sources to the display. In case of small displays, the ILRE may have a dimension in one direction of 1 cm or less, such as the case of a watch display. In larger displays, a dimension of the ILRE will, in general, be at least as large as one dimension of the final viewing screen. The thickness of the ILRE or a region of it may be from 7 mm to less than 100 microns. In a particular embodiment, an ILRE includes a volumetric anisotropic scattering region that is 200 microns in thickness optically coupled to a substrate that is approximately 1 mm in thickness and comprising a diffraction grating on at least one surface. The capability of using a thin anisotropic scattering region to achieve sufficient diffusion for luminance uniformity allows for lower cost substrates to be used. Since the substrate can be substantially optically clear, low cost substrates may be used and they may have reduced weight, making lighter displays. The thin, asymmetrically diffusing layer also permits the capability of using a thinner substrate and therefore achieving a thinner backlight system.

Improved Light Redirecting Element Configuration

In one embodiment, the ILRE comprises at least one volumetric anisotropic light-scattering region and a diffraction grating. In a further embodiment, the diffraction grating is a blazed diffraction grating. The blazed grating may be a transmissive or reflective grating. The diffraction grating is located in a first region and the anisotropic light scattering dispersed domains are located in a second region. In one embodiment, the diffraction grating is disposed on the anisotropic light scattering region or a material comprising the anisotropic light scattering domains. In further embodiments, the regions are located on both or either surface of a non-scattering region or substrate. Three anisotropic scattering layers may also be used and they may be separated by substantially non-diffusing regions; the axes of the scattering layers may be parallel, orthogonal or at an angle phi with respect to each other. The ILRE may include additional layers or elements to provide collimating properties or other optical, thermal, mechanical, electrical, and environmental properties discussed herein. One or more regions of the ILRE may be optically coupled to a substrate or other component of the ILRE. In one embodiment of this invention, the different regions, layers or materials of the ILRE are substantially free-standing components and not physically nor optically coupled to each other. In another embodiment of this invention, the different regions, layers or materials of the ILRE are physically optically coupled to each other in spatially varying regions. In a further embodiment of this invention, the ILRE comprises a light diffracting region where the light diffracting features are coated with a material with a predetermined refractive index such that the grating region backwardly diffracts a portion of incident light of a first angle and first wavelength. In one embodiment, the coating is a metallization coating. In a further embodiment, the coating is a substantially high refractive index coating.

Orientation of Improved Light Redirecting Element

In one embodiment of this invention, the ILRE is oriented to provide increased uniformity in a backlight or device capable of providing illumination such as a light fixture. In one embodiment of this invention, the ILRE is oriented such that one or more of the diffracting and anisotropic light scattering planes are orthogonal to plane comprising at least one light emitting source. In a further embodiment, the ILRE is oriented such that one or more of the diffracting and anisotropic light scattering planes are parallel to an axis of spatial non-uniformity within a plane comprising at least one light source. The ILRE may be oriented in a display or corresponding backlight such that one or more of the diffracting and anisotropic light scattering planes are oriented at 0°, 90°, 45° or at an angle to the an edge of display. In a further embodiment, the ILRE is oriented at an angle to the light emitting surface.

Optical Properties of the Improved Light Redirecting Element

In this section, the optical properties refer to the ILRE and can also refer to a light emitting device, backlight, display or light fixture comprising the ILRE wherein the light source and arrangement is one selected from the group consisting of fluorescent lamp, CCFL, Flat fluorescent lamp, external electrode fluorescent lamp, hot-cathode fluorescent, light emitting diode, organic light emitting diode, photonic bandgap LED, polarized LED, laser diode, broadband laser diode, edge-lit backlight, direct-lit backlight, combination edge-lit and direct-lit backlight.

Figure 4:
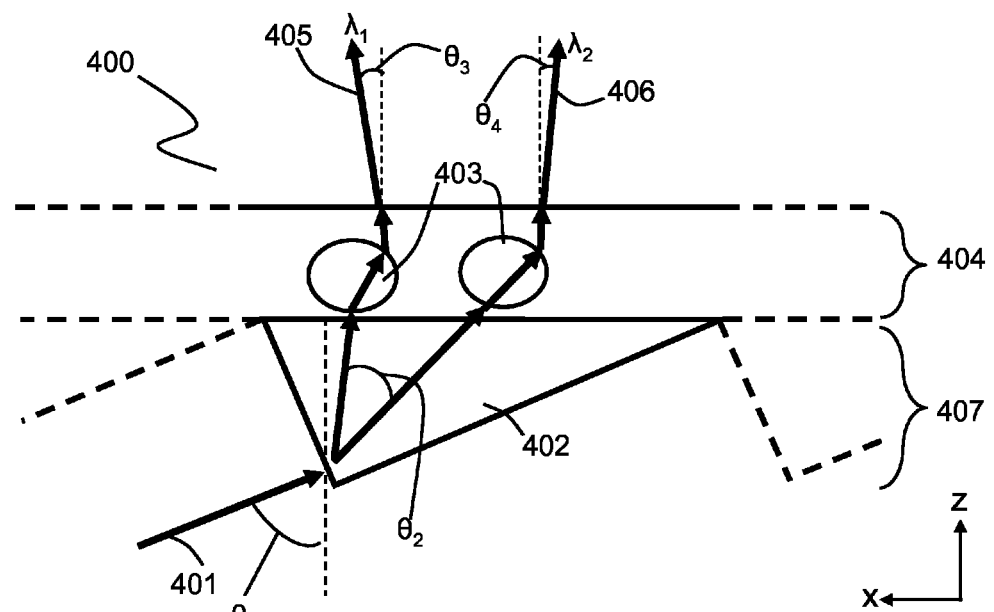
FIG. 4 is a cross-sectional enlarged view of one embodiment of this invention of an ILRE comprising a light diffracting region and light scattering region where light is incident on the light diffracting region.

An example of the optical properties of an ILRE of one embodiment of this invention is illustrated in FIG. 4. Light 401 of comprising more than one wavelengths of light incident on the light diffracting element 402 in the light diffracting region 407 of the ILRE 400 at a first angle $\theta_1$ from the normal of the element is separated angularly into two different light paths 405 and 406 corresponding to two different wavelengths $\lambda_1$ and $\lambda_2$ with a separation angle of $\theta_2$. After the light diffracting region 407, the separated light is incident on the light scattering region 404 comprising dispersed domains 403 and is scattering into second angles $\theta_3$ and $\theta_4$ from the normal determined by the peak intensities of the individual wavelengths that are closer together than the width of the separation angle $\theta_2$ such that $\theta_3+\theta_4<<\theta_2$.

Figure 5:
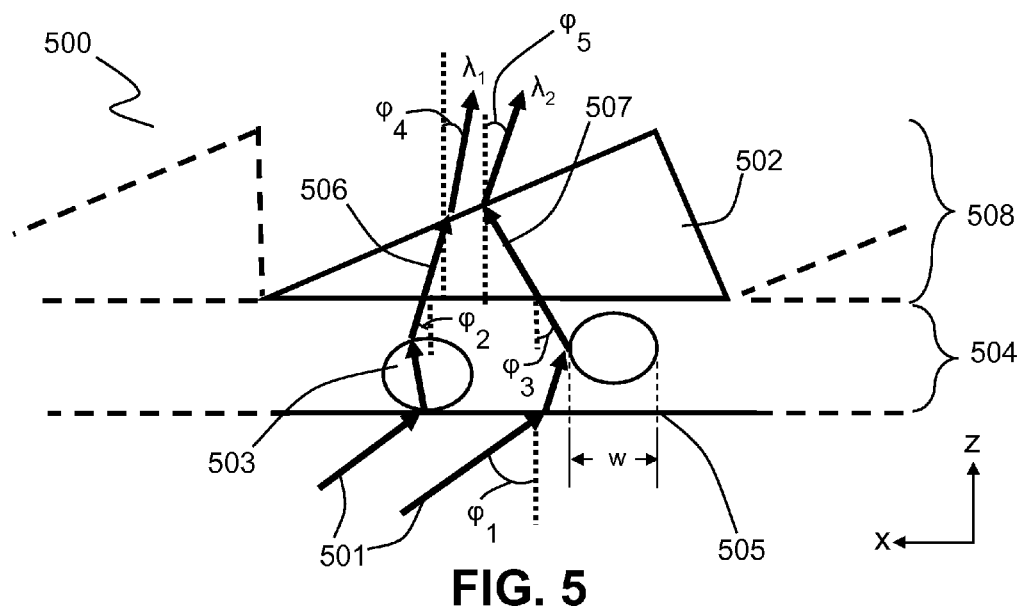
FIG. 5 is a cross-sectional enlarged view of one embodiment of this invention of an ILRE comprising a light diffracting region and light scattering region where light is incident on the light scattering region.

An example of the optical properties of an ILRE of another embodiment of this invention is illustrated in FIG. 5. Light 501 of more than one wavelength incident on an input surface 505 of a light scattering region 504 of an ILRE 500 at an angle of incidence $\phi_1$ is spread angularly due to scattering from the dispersed domains 503 into two light paths 506 and 507 corresponding to two different wavelengths $\lambda_1$ and $\lambda_2$. This light is then incident to the light diffracting region 508 at angles $\phi_2$ and $\phi_3$ from the interface normal determined by the peak intensities of the individual wavelengths. The light diffracting region 508 comprises light diffracting elements 502. The different angles of incidence, $\phi_2$ and $\phi_3$, for the two different wavelengths, $\lambda_1$ and $\lambda_2$, diffract to angles $\phi_4$ and $\phi_5$ with a smaller angular difference than the difference of their corresponding incidence angles such that $\phi_2-\phi_3 > \phi_4-\phi_5$.

The angular extent or range of light reaching the volumetric anisotropic light scattering region, exiting the anisotropic light scattering region, entering the light diffracting region, exiting the light diffracting region, or exiting the ILRE can be measured in terms of the full-width-at-half-maximum of the intensity (or luminance) relative to an angle for a specific wavelength and polarization state. The angular chromatic dispersion for the optical ILRE can be measured by looking at the change in the total perceived color at a specific location as a function of viewing angle. This can be measured by using a luminance and color spot-meter such as a Minolta CS-100 and measuring the color at a range of viewing angles. In one embodiment of this invention, the change in color (which is represented using the 1976 UCS scale color coordinates u' and v') defined as color shift metric $\Delta u'v'$ is less than 0.01 over one of an angular output range selected from the group comprising 10°, 30°, 50°, 70°, 120°, and 150° along at least one viewing axis. When viewing an extended light source with two different spatially separated light emitting regions, the light will reach the viewer's eyes from two different angles. As a result, color variation with angle can also be determined or seen by looking at two different spatial regions from a fixed location. In one embodiment of this invention, the color difference measured from a predetermined direction (or at predetermined location) between two regions of light emitting device, measured by $\Delta u'v'$, is less than 0.004. In another embodiment, the $\Delta u'v'$ is less than 0.01 or 0.05. In one embodiment of this invention, the angular dispersion is reduced and the spatial color uniformity is increased.

The spatial color uniformity can be measured by looking at the color of more than one region of the light emitting area from the same viewing angle. The difference in spatial color uniformity can be measured by the color shift metric $\Delta u'v'$ using a Minolta CS-100 spot-meter and measuring the color at a fixed angle in two regions and calculating the $\Delta u'v'$. In one embodiment of this invention, the color difference between two regions of a light emitting device measured by $\Delta u'v'$ is less than 0.004 measured at an angle of 0°. In another embodiment, the $\Delta u'v'$ is less than 0.01 or 0.05.

By increasing the angular spread of light along at least one direction, the ILRE can also improve the luminance uniformity of a light emitting device. The angular and spatial luminance uniformity can be measured using a Minolta CS-100 spot-meter to measure the backlight or output from an ILRE at different angles or locations, respectively. In one embodiment of this invention, the spatial luminance uniformity measured according to the 9 point measurement standard VESA 306-1 (using uniformity=1-non-uniformity) is greater than 70%. In a further embodiment, the luminance uniformity is greater than one selected from the group consisting of 80%, 85%, 90%, and 95%.

In one embodiment of this invention, the 4 point viewing angular luminance uniformity measured according to VESA 306-1 and VESA 307-1 (using uniformity=100−% non-uniformity) is greater than 70%. In a further embodiment, the angular luminance uniformity is greater than one selected from the group of 80%, 85%, 90%, and 95%.

In another embodiment of this invention, the ILRE does not significantly change the apparent color of the incident light as measured by $\Delta u'v'$ using the color coordinates of the incident light and the exiting light. In one embodiment of this invention of an ILRE, the color shift caused by the ILRE, measured by the $\Delta u'v'$ of the incident and exiting light is less than 0.004 measured at an angle of 0°. In another embodiment, the $\Delta u'v'$ color shift is less than 0.01 or 0.05.

The ILRE may also improve the luminance or color uniformity by spatially redirecting the light. In one embodiment, the ILRE comprises a light diffracting region comprising a spatial arrangement of groups of diffraction gratings wherein each group comprises a diffraction grating comprising an array of elements (such as linear asymmetric gratings with a pitch of 0.57 μm). In one embodiment, the size, orientation and location of these groups are arranged in the ILRE which is optically coupled to a light guide such that the uniformity of the light re-directed out of the light guide is improved. This can allow for the manufacturing of the diffraction grating on a substrate or light scattering film, for example, such that high speed manufacturing can be employed. The ILRE could be subsequently optically coupled to the light guide spatially or uniformly by insert-molding, laminating uniformly, spatially adhering using a screen-printed adhesive, or other methods known in the art. Typically, the density of the surface area of the light redirecting elements increases the further the distance from the source in order to extract more light out of the light guide. The elements (grating group width) and the spacing between the groups can control the spatially arrangement (locations of high intensity or luminance) of light diffracted out of a light guide as illustrated U.S. Pat. No. 5,703,677, the contents of which are incorporated by reference herein. The arrangement of the elements or their optical properties could be determined analogously by using methods known in the art for determining the size, shape, etc. of scattering arrays such as disclosed in U.S. Pat. Nos. 6,994,462, and 6,776,494, or gratings as disclosed in U.S. patent application Ser. No. 11/337,837, the contents of each are incorporated by reference herein.

Physical Properties of the Light Diffracting Region

The ILRE in one embodiment of this invention comprises a diffraction grating. Diffraction gratings can generally be classified into volumetric or surface relief gratings. Volumetric gratings are typically created using one or more object and reference beams of a laser and a photosensitive recording medium. Surface relief gratings can be ruled mechanically or exposed using lasers into a photosensitive medium such as photo-resist where portions of the exposed or non-exposed regions are removed. Other methods for manufacturing diffracting elements such as additive or subtractive photolithography, etching, e-beam writing, etc. are known in the art and can be suitable for manufacturing light diffracting elements within a light diffracting region of an ILRE. Gratings which are formed using laser based interference are often termed holographic gratings or diffractive optical elements. Gratings can be modified by coatings (hi-refractive index coatings such as ZnS, aluminum metallization, etc), replicated into polymers or coatings using stamping, thermoforming, coating, etc. Methods for the formation of diffraction gratings, copying or modifying diffraction gratings, modeling diffraction gratings, optimizing diffraction gratings (for diffraction efficiency, angular bandwidth, polarization sensitivity, polarization reflectivity, wavelength bandwidth of one or more orders, etc.), combining diffraction gratings (crossed, in layers, spatially separated, etc) are known in the art. Examples of these methods and gratings and similar optical elements such as holograms and diffractive optical elements are disclosed in U.S. Pat. Nos. 7,050,233, 6,947,215, 6,991,358, 6,750,996, 6,020,944, 6,347,873, 4,888,260, 5,585,144, 5,513,019, 5,650,865, 5,886,799, 5,291,317, and 5,420,947, the contents of which are incorporated herein by reference.

Photonic bandgap materials can be used in this invention wherein the band gap regions or wavelength at which light is allowed to propagate or diffract can be controlled by the insertion of defects into crystalline (or other structures that have a degree of regularity in one, two or three directions). The bandgaps, their various common structures used in conjunction with optics (optical filters), visible sources (Photonic bandgap based LEDs such as those by Luminous Devices Inc.), the effects of the physical properties on wavelength, angle, polarization, etc. are known in the art for many different photonic bandgap or photonic crystals. Photonic bandgap structures are typically used in optical computing, although the use of the term is expanding into other areas where they are known as guided mode resonant filters. Examples of photonic bandgap materials and guided mode waveguide resonators or filters and their properties are illustrated in U.S. Pat. Nos. 5,216,680, 6,154,480, and 6,661,952 and U.S. patent application Ser. Nos. 10/689,784 (publication number 20040141333), 11/209,905 (publication number 20060043400), and 11/436,707 (publication number 20060262250), the patents and applications incorporated by reference herein. In one embodiment of this invention, a light emitting device comprises a photonic bandgap region within at least one selected from the group of light source, light transmitting region, light diffracting region, light scattering region.

In one embodiment, the grating is linear in one or more directions. In one or more embodiments, the grating has a cross sectional profile selected from at least one of the group consisting of blazed, triangular, hemispherical, conical, tube-like, prism-like, pyramid-like, aspherical, rectangular, square, multi-faceted, faceted with curved faces, faceted with curved and straight faces, symmetric about a line normal to the surface, asymmetric about a line normal to the surface, comprising randomized shapes, comprising rounded corners, comprising high aspect ratio features, comprising low aspect ratio features. The gratings may be crossed or radial and may have graded or non-uniform pitches, aspect ratios, dimensions, edge definition, or diffraction efficiencies or other optical or physical properties. In one embodiment of this invention, the gratings are arranged spatially to selectively diffract light in spatial arrangement to provide increased luminance or color uniformity or to diffract out light from specific wavelength ranges from narrowband sources such as LEDs or OLEDs into desired angles.

In one embodiment of this invention, the grating is formed from materials known to be substantially transmissive to light of visible wavelengths at a suitable thickness. The grating may be formed in materials known to be durable and of sufficient optical quality such as polyester films, acetate films, polycarbonate films, and cellulose films. Other materials suitable for substrates or grating elements are described in the aforementioned patents. In one embodiment, one or more of the structures of the diffraction grating is made from a material used in the anisotropic light scattering region. In a further embodiment, one or more of the structures of the diffraction grating is embossed into a substrate or the continuous phase of the anisotropic light scattering region. Coatings may also be applied and the coatings may also be embossed. Important qualities of the material include light transmission relative to thickness, real and imaginary (absorptive) refractive index in the x, y, or z direction, mechanical durability, flexural modulus, ability to adhere or bond to a coating or substrate, ease of processing, ease of coating, ease of embossing, thermal stability, and other properties known to be important in selecting optical materials optical films or substrates for films.

The material in one or more areas of the grating may be anisotropic. In one embodiment of this invention, the material has a different refractive index in one or more of the x, y, or z directions relative to the other and the anisotropy is selected from at least one of the group of birefringent, form birefringence, photoelastic, uniaxial, strain-induced, and tri-refringent. In a further embodiment, the diffraction grating is formed in a birefringent (or tri-refringent depending upon processing) material such as PEN or PET as described in U.S. Pat. No. 6,590,707, the contents of which are incorporated by reference herein. In one embodiment of this invention, the birefringence is the result of at least one from the group consisting of the crystalline structure, molecular alignment, polymer chain alignment, substantial alignment of structures with non-uniform shapes or structures where the separation of the shapes is non-uniform.

In one embodiment of this invention, the pitch of the grating may be on the order of 5 µm or less. In another embodiment, the pitch is less than one selected from the group of 1,000 nm, 600 nm, 500 nm and 300 nm. In a further embodiment, the grating features are less than 200 nm. When the features of the grating are substantially less than the wavelength of light, the features can create an effective anisotropy or birefringence in the materials such as disclosed in U.S. Pat. No. 6,661,952, the contents of which are incorporated by reference herein.

In another embodiment of this invention, the pitch of the diffraction grating elements vary from group to group within a light diffracting region of an ILRE. Traditional light re-directing features such as white scattering dots are not spaced very close to each other near the light source on an edge-lit lightguide because the light output coupling would be too high resulting in high luminance near the edge and spatial luminance non-uniformity.

In one embodiment of this invention, an ILRE comprises first light diffracting groups comprising first light diffracting elements that have predetermined diffraction efficiencies for a first wavelength bandwidth comprising wavelengths emitted from a first source and second light diffracting groups comprising second light diffracting elements that have predetermined diffraction efficiencies for a second wavelength bandwidth comprising wavelengths emitted from a second source wherein the sources have substantially different spectral outputs and the groups are arranged spatially to illuminate the first and second light diffracting elements. As used herein, a diffractive element is the repeating element or structure in a collection of structures with substantially the same pitch. The collection of substantially continuous repeating elements of an approximately constant pitch (in one or more directions) is termed a light diffracting group. By using first diffractive elements designed to direct the light from one or more first light sources with a first color in proximity to a second group of diffractive elements to designed to direct the light from one or more second light sources with a second color, more of the surface area comprising the elements can utilized than could be utilized with traditional light scattering output coupling patterns or a spatial arrangement of a grating with a single pitch.

The fill factor of the light diffraction region is defined as the percentage ratio of the total area of light diffracting elements divided by the percentage area within the plane of the light diffracting region corresponding to the area of output of the device or element. In one embodiment, the fill factor of the light diffracting region is greater than 70%. In one embodiment of this invention, separate groups of light diffracting elements are designed with the appropriate pitch, profile, and refractive index to forwardly or backwardly diffract red, green, and blue light incident within a waveguide from red, green, and blue light emitting diodes into angles within 30 degrees from the light emitting device output surface normal. The fill factor for the light diffracting region is greater than one selected from the group of 70%, 80%, 90% and 95%.

In a further embodiment of this invention, the ILRE comprises first and second light diffracting groups wherein light of a first wavelength bandwidth incident on the first group is diffracted into a first angle smaller than the critical angle for the ILRE or waveguide region and the light of the first wavelength bandwidth incident on the second group is substantially undiffracted or diffracted into an angle higher than the critical angle for the ILRE or waveguide region such that the light does not escape the ILRE or waveguide.

Figure 8:
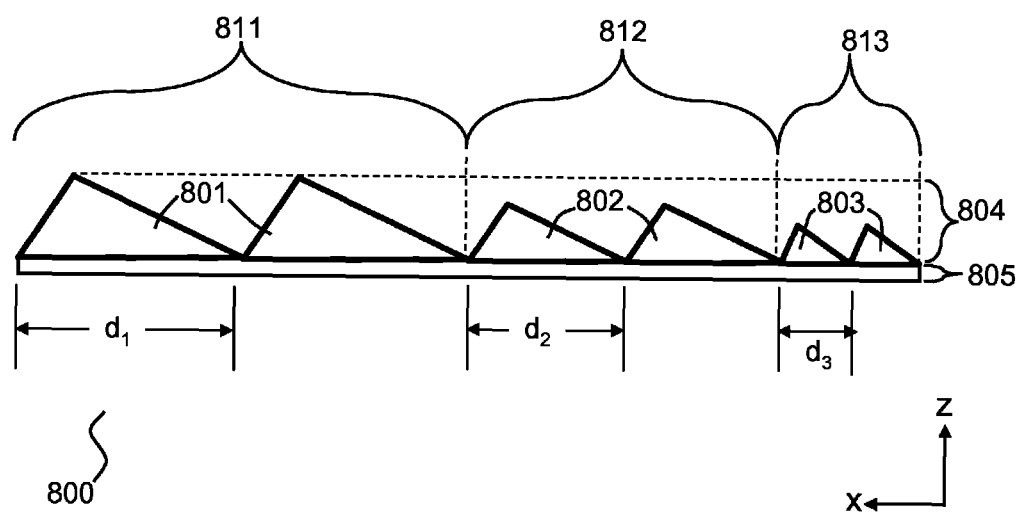
FIG. 8 is a cross-sectional view of one embodiment of this invention of an ILRE comprising a light diffracting region with three predetermined grating pitches.

FIG. 8 illustrates one embodiment of this invention of an ILRE 800 comprising a light diffracting region 804 optically coupled to a light scattering region 805. The light diffracting region comprises a first group 811 of first light diffracting elements 801 with a first pitch of $d_1$. The light diffracting region further comprises a second group 812 of second light diffracting elements 802 with a second pitch of $d_2$. The light diffracting region further comprises a third group 813 of third light diffracting elements 803 with a third pitch of $d_3$. By designing the ILRE with different pitches such that light from different wavelengths will diffract substantially toward the same angle, a light emitting device comprising the ILRE and light with substantially three different wavelength bandwidths such as those corresponding to red, green and blue light, the light can be redirected more efficiently. In a further embodiment, the ILRE has two, four or more than four groups of diffracting elements with different pitches which can be used with different light sources of different spectral colors (such as a bluish-white LED plus an orange colored LED). Other spectral light sources, phosphors, and color combinations possibilities are known in the art of displays, LEDs, OLEDs, and color technology and are suitable for use with the configurations and embodiments disclosed herein.

Figure 9:
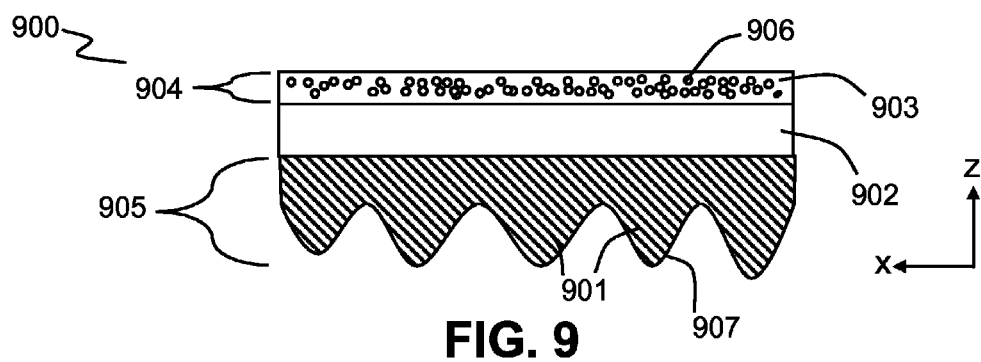
FIG. 9 is a cross-sectional view of one embodiment of this invention of an ILRE comprising a light diffracting region with a smoothly varying profile and a light scattering region.

FIG. 9 is a cross-sectional view of one embodiment of this invention of an ILRE 900 comprising a light diffracting region 905 comprising light diffracting elements 901 with a smoothly varying surface profile 907, a light transmitting region 902, and a light scattering region 904 comprising light scattering dispersed domains 906 in a light transmitting matrix material 903. In one embodiment of this invention, the light transmitting region is a substrate for the diffraction grating. In another embodiment of this invention, the light transmitting is a substantially non-scattering region. In a further embodiment, the light transmitting region is one selected from the group of support, substrate, capping, protection, or barrier region for the light scattering region. In a further embodiment of this invention, the light transmitting region is an adhesive that optically couples the light scattering region into the light diffracting region. Diffraction gratings with smoothly varying features such as a grating with a sinusoidal shaped profile can direct more light into the lower diffraction orders than stepped rectangular gratings.

Figure 10:
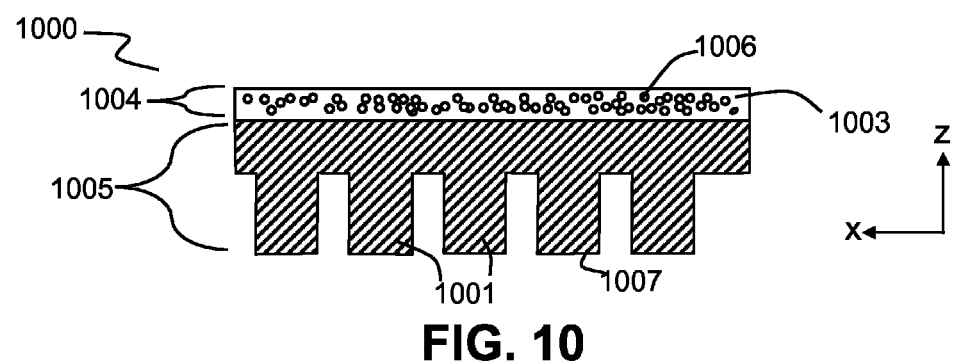
FIG. 10 is a cross-sectional view of one embodiment of this invention of an ILRE comprising a light diffracting region with a rectangular profile and a light scattering region.

FIG. 10 is a cross-sectional view of one embodiment of this invention of an ILRE 1000 comprising a light diffracting region 1005 comprising light diffracting elements 1001 with a rectangular surface profile 1007 and a light scattering region 1004 comprising light scattering dispersed domains 1006 in a light transmitting material 1003. Diffraction gratings with rectangular surface profiles can be precisely manufactured using lithographic or other techniques. In one embodiment of this invention, the light diffracting region comprises substantially rectangular step gratings in a step-pyramid profile. Step-gratings can simulate triangular or other cross-sections achieving similar diffractive properties by sectioning the profile into discrete steps.

Figure 11:
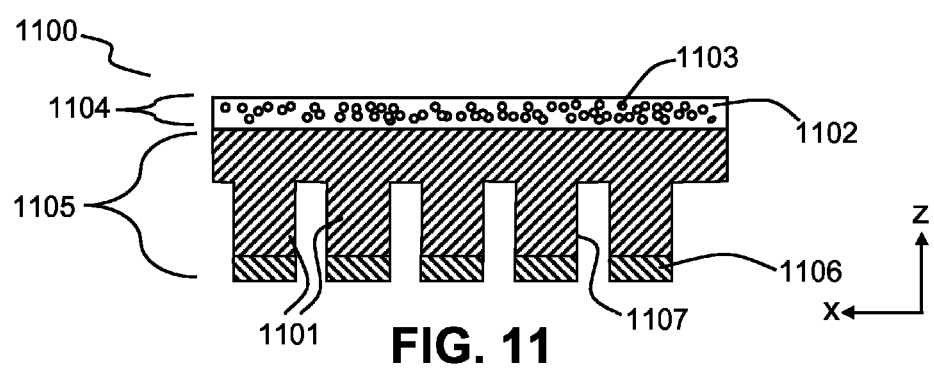
FIG. 11 is a cross-sectional view of one embodiment of this invention of an ILRE comprising a light diffracting region with a rectangular profile with a second refractive index layer and a light scattering region.

FIG. 11 is a cross-sectional view of one embodiment of this invention of an ILRE 1100 comprising a polarization selective light diffracting region 1105 comprising light diffracting elements 1101 with a rectangular surface profile 1107 and a light scattering region 1104 comprising light scattering dispersed domains 1103 in a light transmitting material 1102. The light diffracting elements comprise a high refractive index coating 1106 disposed on the outer portions of the elements. Gratings with coatings on the elements can function as polarization selective gratings. Examples of gratings which selectively reflect or diffract light within a specific polarization range are disclosed in U.S. Pat. No. 6,947,215.

Figure 12:
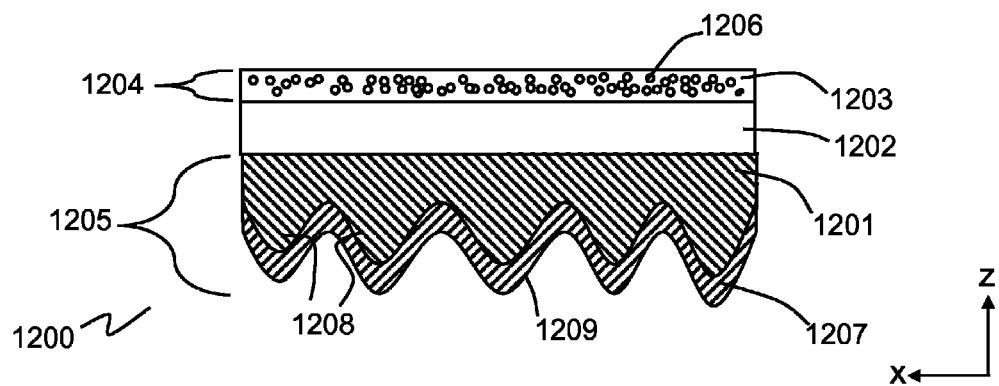
FIG. 12 is a cross-sectional view of one embodiment of this invention of an ILRE comprising a backward diffracting region with a smoothly varying profile, a light reflecting region, and a light scattering region.

FIG. 12 is a cross-sectional view of one embodiment of this invention of an ILRE 1200 comprising a backward diffracting region 1205 with a smoothly varying surface profile 1209 and a reflective region 1207, a light scattering region 1204, and light transmitting region 1202 optically coupling the light scattering region 1204, a surface profiled light transmitting diffractive region 1201. The light scattering region 1204 comprises dispersed domains 1206 in a light transmitting material 1203. The light diffracting elements comprise the light reflecting region 1208 which conformally cover a surface profiled light transmitting diffractive region 1201, forming the light diffracting elements 1208. In a further embodiment of this invention, the light reflecting region is not conformal to the surface profiled light transmitting diffractive region 1207 and is substantially planar. The light reflecting regions can essential re-direct forward diffracted light back through the transmissive grating elements and when coupled with a light transmitting diffractive region create a backward light diffracting region. In further embodiments, the light reflecting region is a non-absorptive or non-metallic region that has a high refractive index such that a significant amount of light is reflected from the interface of the light reflecting region with the element.

Figure 15:
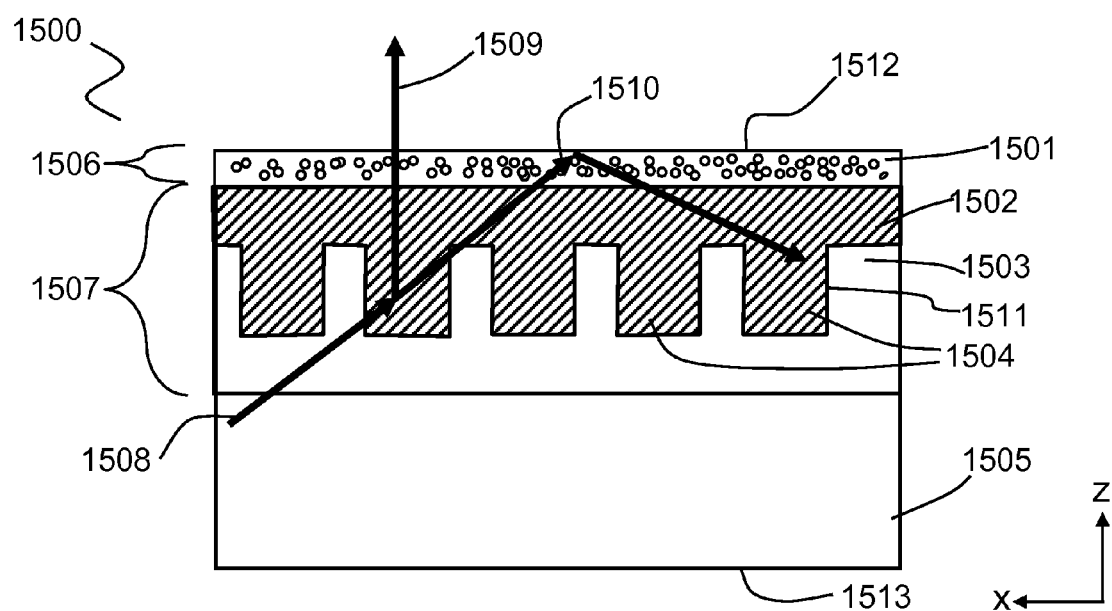
FIG. 15 is a cross-sectional view of one embodiment of this invention of an ILRE comprising a polarization sensitive light diffracting region and a light scattering region.

FIG. 15 is a cross-sectional view of one embodiment of this invention of an ILRE 1500 comprising a polarization selective light diffracting region 1507 comprising light diffracting elements 1504 formed at the interface 1511 of a first light transmitting material 1502 of a first refractive index and a second light transmitting material 1503 of a second refractive index different from the first light transmitting material 1502. The ILRE 1500 further comprises a light scattering region 1501 and a light transmitting region 1505 optically coupled to the second light transmitting material 1503. A portion 1509 of the light 1508 of a first polarization state incident from the light transmitting region 1505 onto the light diffracting elements 1504 is diffracted into the first transmitted order such that the diffracted light 1509 exits the lightguide formed from the outer surface 1512 of the light scattering region 1501 and the outer surface 1513 of the light transmitting region.

Figure 16:
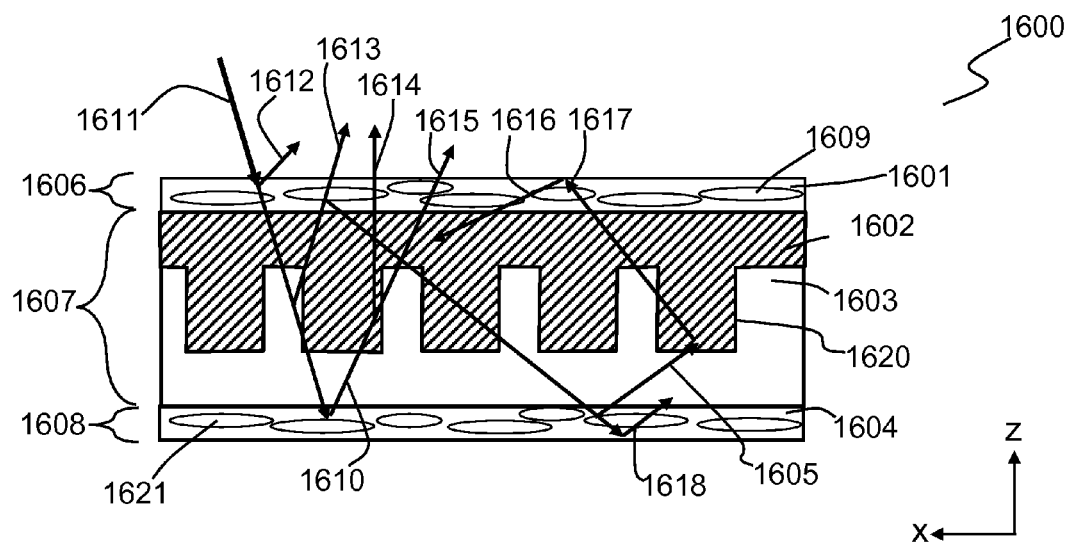
FIG. 16 is a cross-sectional view of one embodiment of this invention of an ILRE comprising a light diffracting region and a two light scattering region.

FIG. 16 is a cross-sectional view of one embodiment of this invention of an ILRE 1600 comprising a polarization selective light diffracting region 1607 comprising light diffracting elements formed at the interface 1620 of a first light transmitting material 1602 of a first refractive index and a second light transmitting material 1603 of a second refractive index different from the first light transmitting material 1602. The ILRE 1600 further comprises a first volumetric anisotropic light scattering region 1606 and a second volumetric anisotropic light scattering region 1608 disposed on opposite sides of and optically coupled to the polarization selective light diffracting region 1607. The volumetric anisotropic light scattering regions 1606 and 1608 comprise asymmetric dispersed domains 1609 and 1621, respectively, oriented in the x-direction within light transmitting materials 1601 and 1604, respectively. A first portion 1612 of the light 1611 incident on the ILRE 1600 is reflected from the light scattering region 1606. A portion 1610 of the incident light 1611 which is transmitted through the first volumetric anisotropic light scattering region 1606 passes through the polarization selective light diffracting region 1607 and is reflected by the second volumetric anisotropic light scattering region 1608. A first portion 1615 of the light 1610 reflected from the second volumetric anisotropic light scattering region 1608 passes through the polarization selective light diffracting region 1607 and the first volumetric anisotropic light scattering region 1606 and exits the ILRE 1600. A second portion 1614 of the light 1610 reflected from the second volumetric anisotropic light scattering region 1608 is diffracted by the polarization selective light diffracting region 1607 and passes through the first volumetric anisotropic light scattering region 1606 and exits the ILRE 1600.

A first portion 1613 of the light diffracted from the polarization selective light diffracting region 1607 passes through the first volumetric anisotropic light scattering region 1606 and exits the ILRE 1600. A second portion 1605 of the incident light 1611 diffracted from the polarization selective light diffracting region 1607 reflects from the first volumetric anisotropic light scattering region 1606, passes through the polarization selective light diffracting region 1607 and is reflected by the second volumetric anisotropic light scattering region 1608. Similarly, a third portion 1618 of the incident light 1611 diffracted from the polarization selective light diffracting region 1607 reflects from the first volumetric anisotropic light scattering region 1606, passes through the polarization selective light diffracting region 1607 and is reflected by the air-material interface formed by the light transmitting material 1604 and is directed back into the second volumetric anisotropic light scattering region 1608 and the polarization selective light diffracting region 1607. A portion 1617 of the light 1605 is further diffracted by the polarization selective light diffracting region 1607 and totally internally reflects from the air-light transmitting material 1601 interface.

One can see from this example that the multiple reflectively scattering and transmitting regions, and the polarization selective light diffracting region and the outer boundary surfaces of the ILRE can essentially form waveguides within a waveguide region. A first interface between the first light transmitting material 1602 and the light transmitting material 1601 of the first volumetric anisotropic light scattering region 1606, a second interface between the first light transmitting material 1602 and the second light transmitting material 1603, and a third interface between the second light transmitting material and the light transmitting material 1604 of the second volumetric anisotropic light scattering region 1608 together form three possible waveguide-like conditions for comprising a portion of light traveling between the regions. When the interfaces between the dispersed domains 1609 and 1621 and the air-light transmitting material 1601 interface and the air-light transmitting material 1604 interface are added, many more possible waveguide-like conditions are created by reflections between any two interfaces.

These multiple waveguides can serve a function of laterally spreading the light (in the x-direction for example) before it exits the ILRE which provides increased lateral uniformity. Additionally, the multiple reflections causing the light to change angles can reduce the color shift from the ILRE or a light emitting device comprising it. In further embodiments of this invention, one or more of the refractive index of one of the materials making up a domain or region, the profile of the grating and each interface, number of interfaces, or the size or shape of the domains can be controlled to provide more than three effective waveguide conditions providing increased spatial or angular luminance uniformity. In a similar embodiment of this invention, the light diffracting region is not substantially polarization sensitive.

In one embodiment of this invention, an ILRE comprises a light transmitting region and a light diffracting region comprising grating elements of a substantially constant pitch designed to diffract light from a blue or UV light emitting source toward a light scattering region at a second angle. By leveraging the capability of the gratings to work precisely at narrow wavelength bandwidths such as with a blue, UV, or blue and UV emitting source, the light incident on a light scattering region comprising a phosphor layer or photoluminescent polarizer can be controlled more efficiently and precisely.

In one embodiment of this invention, the grating is a linear blazed grating with a pitch of 0.57 μm with an apex angle of 90 degrees and other angles of 55 degrees and 35 degrees as shown in FIG. 1.

In another embodiment of this invention, the cross-sectional dimensional width in a first direction of a light scattering domain within the light scattering region is greater than four times the pitch of at least one light diffracting element within the light diffracting region. For example, the cross sectional width, W, in a first direction, x, as shown in FIG. 5 is greater than four times the pitch, d, (where the pitch of a grating is as illustrated in FIG. 1).

In another embodiment of this invention, the cross-sectional dimensional width in a first direction of a light scattering domain within the light scattering region is greater than eight times the pitch of at least one light diffracting element within the light diffracting region.

Optical Properties of the Grating

In one embodiment of this invention a diffraction grating is disposed on the surface of a film optically coupled to a light guide wherein the grating is designed to have a diffraction efficiency greater than 70% across a substantial portion of the visible spectrum at one or more incident angles defined by those sustained with the waveguide. In one embodiment, the waveguide is a an acrylic substrate and the grating is a blazed diffraction grating designed to diffract light within the light guide which is greater than approximately 42 degrees from the normal of the surface to an angle less than 42 degrees from the normal. In a further embodiment, the grating is designed to diffract a first portion of incident light at a wavelength of 550 nm from a first angle within the light guide to a peak angle, Φ, such that −10°<Φ<+10° as measured from the ILRE output surface normal (or light emitting device output surface normal). In another embodiment, the grating is designed to diffract incident light at a wavelength of 550 nm from a first angle within the light guide to a peak angle, Φ, such that −5°<Φ<+5° as measured from the exiting plane. In this embodiment, the light can be re-directed toward the direction normal to the surface such that when incorporated with a backlight or display, the luminance in the direction normal to the display is increased.

The grating may also be designed to efficiently work with prismatic films to direct light efficiently to the normal direction. In one embodiment, the grating is designed to diffract incident light at a wavelength of 550 nm from a first angle within the light guide to a peak angle, $\Phi_2$, such that at least one of the conditions of −40°<$\Phi_2$<−20° or +20°<$\Phi_2$<+40° as measured from the normal to the light guide output plane. In a further embodiment, the grating is designed to diffract incident light at a wavelength of 550 nm from a first angle within the light guide to a peak angle, $\Phi_3$, such that at least one of the conditions of −35°<$\Phi_3$<−25° or +25°<$\Phi_3$<+35° as measured from the exiting plane. In a further embodiment, a backlight comprising the ILRE which comprises one of the aforementioned gratings further comprises a collimation film such as prismatic film with a substantially 90 degree apex angle oriented such that a substantial portion of the light received from the grating is diffracted to a peak angle within 10 degrees from the normal to the backlight.

The optical performance of a grating can be broken down into number of measurable optical parameters. Parameters include the number of diffractive orders (forward and backward diffractive orders) and the efficiency in each order for each angle of incidence at each wavelength and each polarization state (s, p, TE, TM, and combinations or angles in-between depending on terminology and reference). The angle into which the incident light diffracts can also vary depending on the angle, wavelength, polarization state of the incident light. The wavelength sensitivity describes the wavelength bandwidth measured as the Full-Width-at-Half-Maximum (FWHM) in nanometers of the diffraction efficiency curve relative to the wavelength of incident light at a specific angle and polarization state. The angular sensitivity describes the angular bandwidth measured as the FWHM in degrees of the diffraction efficiency curve relative to the angle of incident light at a specific wavelength and polarization state. The polarization sensitivity describes the polarization bandwidth measured as the FWHM in degrees of deviation from a specific polarization angle of the diffraction efficiency curve relative to the angle of incident light at a specific wavelength and incident angle.

When a plane wave is incident on a diffraction grating with the grating lines or features constant along the y-axis and the grating is substantially located in the x-y plane, one can describe the polarization in terms of the incident plane wave (k vector) and the two angles alpha and beta are used to define the polarization state. If beta=0 the illumination is linearly polarized. For transverse electric (TE) polarization, the principal electromagnetic field is normal to the plane of incidence which is defined by a k vector and the z axis. For transverse magnetic (TM) polarization, the principle electromagnetic field is in the plane of incidence. Beta determines the magnitude of the secondary electric field which is perpendicular to the principle electromagnetic field and the k vector, and is 90 degrees out of phase in time. If the principal and secondary electromagnetic fields have equal magnitudes, they are said to be circularly polarized.

In one embodiment of this invention, the diffraction efficiency is predetermined to be less than 90% such that the recycled (non-diffracted then totally internally reflected light or backward diffracted light) contributes to the uniformity of the light emitting system. In one embodiment of this invention, the efficiency of the group of gratings in one or more locations is reduced to allow for color and or luminance uniformity to be increased. In one embodiment, the diffraction efficiency of the first diffracted order grating for s-polarized light of a wavelength of 532 nm incident at 70 degrees is less than 50%. In another embodiment, the diffraction efficiency is less than at least one selected from the group of 40%, 30%, 20%, and 10%. In a further embodiment of this invention, the diffraction efficiency of the grating is graded spatially such that light is recycled to be extracted further along the light guide. The diffraction efficiency and the spatial arrangement (and size, shape, separation, pitch, density, etc.) of the grating elements can be combined to create an improved, high efficiency light redirecting element that provides luminance and color uniformity within a predetermined spatial region and angular range.

In one embodiment of this invention, an efficient diffraction grating can be used and the size, shape and fill-factor of the grating on a light guide surface can be adjusted to yield an ILRE with increased color and luminance uniformity. In one embodiment of this invention, the grating has a diffraction efficiency in the first forward diffracted order of greater than 60% for a first polarization angle of s-polarized light at 550 nm incident at 70°. In a further embodiment, the grating has a diffraction efficiency of at least one of 70%, 80%, and 90%.

The number of diffractive orders can vary depending on the design. In one embodiment of this invention, the number of diffractive orders with diffraction efficiency over 2% (s-polarized 550 nm light incident at 70 degrees) is 3 including the 0 forward and 0 backward diffracted orders. In a further embodiment, the number of diffractive orders is 4 or more. In one embodiment, the first forward diffracted order and the first backward diffractive order contribute to light re-direction and light recycling (for uniformity), respectively. In one embodiment of this invention, the sum of the diffraction efficiencies of the forward diffracted orders is greater than 60% and the sum of the backward diffracted orders is less than 40%. In a further embodiment of this invention, the sum of the diffraction efficiencies of the forward diffracted orders is less than 60% and the sum of the backward diffracted orders is greater than 40%.

The shape (such as cross-sectional profile) of the diffractive structures can contribute to the amount of light diffracted into an order. In one embodiment of this invention, the grating is blazed such that the cross-sectional profile of one or more periods of the grating is an asymmetric triangle where the length of two faces are not equal. A blazed grating can increase the diffraction efficiency of a diffracted order, thus permitting more light to be re-directed toward a design angle (such as normal to an exiting surface or toward an appropriate input angle of a further light re-directing element).

Figure 14:
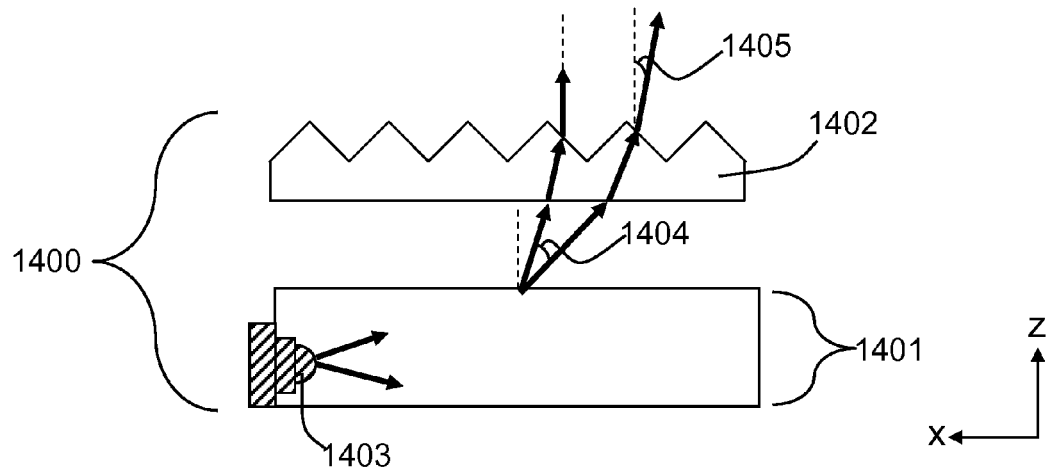
FIG. 14 is a cross-sectional view of one embodiment of this invention of a light emitting device comprising an ILRE and a prismatic light redirecting film.

In one embodiment of this invention, the grating has a substantially symmetric profile such that incident light from two directions within or from a light guide with light sources on opposite ends diffracts with similar diffraction efficiencies into equal but oppositely signed angles. In another embodiment of this invention, the grating is a symmetric triangular grating such that s-polarized 550 nm light incident on the grating from −70° is diffracted to a peak angle within the range of −20° and 40° and light incident at +70° is diffracted to a peak angle within the range of +20° and +40° to the emitting surface normal. In a further embodiment, an ILRE comprises this symmetric triangular grating and an anisotropic light scattering region and the ILRE is combined with a light collimating film with an apex angle of approximately 90 degrees in a backlight such that the peak angle of light from the combination of the ILRE and collimating film is refracted into a direction within 10 degrees from the backlight normal by the prismatic collimating film in a light emitting device. FIG. 14 illustrates an example of a light emitting device 1400 of one embodiment of this invention comprising a light source 1403, a prismatic collimating film 1402 and an ILRE 1401. The light from the light source emitted from the ILRE into an angular range 1404 is substantially redirected into a smaller angle 1405 closer to the light emitting device 1400 output normal by the prismatic collimating film 1402.

In a further embodiment of the invention, the grating is a symmetric triangular grating such that s-polarized 550 nm light incident on the grating from −70° and +70° is diffracted to a peak angle within the range of −20° and +20° to the emitting surface normal.

In a further embodiment of this invention, the grating is designed to be efficient in a wavelength bandwidth less than that of visible wavelengths, thus less than about 300 nm. In a further embodiment of this invention, the grating has a first order forward diffraction efficiency of greater than 50% for s-polarized light with a peak wavelength selected within the range of 350 nm to 500 nm and a diffraction efficiency less than 50% for s-polarized light of wavelengths greater than 600 nm. In another embodiment of this invention, the diffraction grating is designed to have a first order forward diffraction efficiency of greater than 50% for s-polarized light with a peak wavelength selected within the range of 350 nm to 500 nm.

In one embodiment, the diffraction grating is designed to re-direct blue, UV, or UV and blue light toward a remote phosphor layer. In a further embodiment, light from blue LED's is directed into the edge of a light transmitting region. In a further embodiment of this invention, the light guide has a spatial array of diffraction gratings on the top surface and a reflective material (such as aluminized PET, white reflective PET film, ESR multi-layer reflective film from 3M, PTFE film, etc) underneath. The light traveling through the light guide is coupled out of the light guide in a spatial array (or one large array) such that the resulting output of the system is substantially uniform. The blue or UV light is directed toward a phosphor or fluorescent material such that the conversion of a portion of the incident light is substantially uniform, creating a white emitting surface with a luminance uniformity greater than 80% and a spatial color uniformity Δu'v'<0.01. In one embodiment, the thickness, shape, size or spatial covering of the phosphor/fluorescing material combined with the output from the grating results in a luminance uniformity greater than 70%. In this embodiment, the system has improved efficiency due to the remote phosphor in that the light that is re-emitted by the phosphor and bounced backward is reflected back toward the phosphor from the reflective film beneath (or on) the light guide. By designing the grating to have an efficiency within a smaller wavelength range, the grating can be made more simple and at a lower cost with increased design flexibility and choice of materials and construction due to the fact that the bandwidth does not need to be very high. In one embodiment of this invention, the grating is a guided-mode resonance grating.

In one embodiment of this invention, the grating is designed to have a FWHM first order forward diffraction efficiency wavelength bandwidth of greater than 300 nm measured with s-polarized light incident at an angle selected from the range of 50 to 80 degrees. In a further embodiment, the FWHM wavelength bandwidth is greater than at least one of the group of 200 nm, 150 nm, 100 nm, 50 nm, and 25 nm.

In one embodiment of this invention, the grating is designed to have a FWHM first order forward diffraction efficiency angular bandwidth of greater than 30° measured with s-polarized light incident at an angle selected from the range of 50 to 80 degrees when incident from a light transmitting region. In a further embodiment, the FWHM first order forward diffraction efficiency angular bandwidth is greater than at least one of the group consisting of 10°, 20°, and 40°. In an additional embodiment of this invention, the grating is designed to have a FWHM first order diffraction efficiency angular bandwidth of greater than 50° measured with s-polarized light incident at 45 degrees within a light transmitting material.

In one embodiment of this invention, the grating is designed to have a FWHM first order forward diffraction efficiency polarization (alpha) bandwidth of greater than 30° measured with s-polarized light incident at an angle selected from the range of 50 to 80 degrees from the normal. In a further embodiment, the FWHM first order diffraction efficiency polarization (alpha) bandwidth is greater than at least one of the group of 60°, 90°, 120°, 150°, and 170°. In the embodiments with high polarization bandwidths, the grating efficiently diffracts light of at least a broad range of s-polarized light. In a further embodiment, the grating reflects a broad range of p-polarized light.

In one embodiment of this invention, the grating is designed to have a FWHM zero order forward diffraction efficiency polarization (alpha) bandwidth of greater than 30° measured with s-polarized light incident at an angle selected from the range of 50 to 80 degrees from the normal. In a further embodiment, the FWHM zero order diffraction efficiency polarization (alpha) bandwidth is greater than at least one of the group consisting of 60°, 90°, 120°, 150°, and 170°. In the embodiments with high polarization bandwidths, the grating efficiently diffracts light of at least a broad range of s-polarized light. In a further embodiment, the grating reflects a broad range of p-polarized light.

In one embodiment of this invention, the grating is designed to have a FWHM first order backward diffraction efficiency polarization (alpha) bandwidth of greater than 30° measured with s-polarized light incident at an angle selected from the range of 50 to 80 degrees from the normal. In a further embodiment, the FWHM first order backward diffraction efficiency polarization (alpha) bandwidth is greater than at least one of the group consisting of 60°, 90°, 120°, 150°, and 170°. In the embodiments with high polarization bandwidths, the grating efficiently diffracts light of at least a broad range of s-polarized light. In a further embodiment, the grating reflects a broad range of s-polarized light.

In one embodiment of this invention, the grating is designed to have a FWHM zero order backward diffraction efficiency polarization (alpha) bandwidth of greater than 30° measured with s-polarized light incident at an angle selected from the range of 50 to 80 degrees from the normal. In a further embodiment, the FWHM zero order backward diffraction efficiency polarization (alpha) bandwidth is greater than at least one of the group consisting of 60°, 90°, 120°, 150°, and 170°. In the embodiments with high polarization bandwidths, the grating efficiently diffracts light of at least a broad range of s-polarized light. In a further embodiment, the grating reflects a broad range of s-polarized light.

In one embodiment of this invention, the grating has a diffraction efficiency greater than 40% in one of the orders selected from at least one of the group of +1 forward diffraction efficiency, −1 forward diffraction efficiency, 0 order forward diffraction efficiency, +1 backward diffraction efficiency, −1 backward diffraction efficiency, 0 order backward diffraction efficiency.

The birefringence of one or more of the grating material, grating substrate material, matrix material, matrix substrate material or other film may be greater than 0.1 such that a significant amount of polarization selectivity occurs due to the difference in the critical angle for different polarization states when this optically anisotropic material is optically coupled to or forms part of the light guide. An example of this polarization selectivity is found in U.S. Pat. No. 6,795,244, the contents are incorporated herein by reference.

Multiple Diffraction Gratings

One or more diffraction elements or gratings may be used in conjunction with each other or designed to work with different inputs of light or from different angles or different spatial regions. The gratings may have different physical properties to diffract light with one or more properties such as wavelength range, angular input ranges, or input polarization ranges differently or in conjunction with each other. The gratings may be designed to create allowable modes such as resonance gratings to permit one of the aforementioned ranges to selectively transmit or reflect. In one embodiment, two crossed gratings are used to provide increased diffraction or guided-mode resonance for a larger band than one of the single gratings where the band is at least one selected from a group consisting of wavelength band, angular band, polarization band. In a further embodiment of this invention, orthogonal gratings are used in an ILRE to increase polarization bandwidth. Other types and examples of crossed gratings suitable for one or more light diffracting regions in one or embodiments of this invention are shown in U.S. Pat. Nos. 6,947,215 and 6,661,952, the contents of each are incorporated by reference herein.

More than one diffraction grating can be used in order to compensate for the angular chromatic dispersion of a single grating or to cancel or average the dispersion from a second light source or refractive structure such a prismatic film. The gratings or refractive elements may be separated or optically coupled. The diffractive elements or refractive elements can be designed such that the output dispersion from the first diffractive element is compensated by the second element. Examples of dispersion compensation for refractive and diffractive elements are known in the art of refractive and diffractive optics. Examples of dispersion compensation are shown in U.S. Pat. Nos. 5,161,057 and 5,420,947, the contents are incorporated herein by reference. In one embodiment of this invention, the white light incident to the first diffractive element of an ILRE from a first peak angle, gamma1 (with angular bandwidth, epsilon1) to the normal is dispersed between the first and second element and the resulting white light is output from the second element at a peak angle gamma2 (with angular bandwidth, epsilon2) wherein at least one of the conditions selected from the group gamma1 is not equal to gamma2, epsilon1 is approximately equal to epsilon2, epsilon2>epsilon1, is true. The pitch, feature size, shape, number of facets, apex angle, curve shape, refractive index in the x, y, or z direction, may be designed to create the diffractive or refractive properties of each element based on the input and output range of angles for each element to yield a combination of at least two elements with low total chromatic or angular dispersion and a net effect of light redirection. Examples of the different shapes and profiles of refractive and diffractive structures utilized in optical films are described in U.S. Pat. Nos. 6,354,709, 4,984,144, 6,862,141 and U.S. patent application Ser. No. 11/184,022 (Publication number 20060204720A1), the contents of the patents and patent application are incorporated by reference herein. In another embodiment of this invention, an anisotropic light scattering region is disposed on at least one of the group of the input side of the first element, the output side of the second element, and in-between the two elements.

Location of the Grating

In one embodiment of this invention, an ILRE comprises a diffractive region wherein the diffractive region is disposed in an optical path between the light source and the light emitting surface. The light diffracting region may comprise a grating that is located above or below an anisotropic light scattering region in an ILRE. The grating may be formed through a molding process in the creation of the light guide (such as injection molded light guide) or through the optical coupling of one or more embossed diffraction films to the light guide or light scattering film or region. In one embodiment of this invention, the grating is embossed into a ZnS coating on an anisotropic light scattering PET film and subsequently laminated or insert molded to a light guide. In this embodiment, the grating is designed such that the input medium to the grating is the light guide (or acrylic adhesive) and the light diffracts forward within the PET material. The light diffracting region may have air voids or it may be planarized with additional coatings.

In a further embodiment of this invention an ILRE comprising a grating is optically coupled to a light guide wherein the surface comprising the diffractive features is on the opposite side than the light guide. In this embodiment, the film can be optically coupled to the full surface of the light guide.

In another embodiment of this invention, an optical adhesive is screen printed onto the diffractive features in predetermined regions. An anisotropic light scattering film is optically coupled to the grating in the regions with adhesive such that the diffraction efficiency in the region with the adhesives is substantially less. In this embodiment, the anisotropic light scattering region can be designed to only scatter incident light substantially in the plane orthogonal to the direction of travel of light in the light guide such that waveguide conditions are substantially maintained in those areas with the adhesive. Incident light from within the light guide is diffracted into light traveling at a second angle in the areas around the adhesive such that the waveguide condition is not satisfied. Various diffraction gratings, varying the a parameter of the grating such as pitch, height, shape, spacing, linewidth across the surface of a lightguide or film, arrays of gratings, and other optical elements and refractive films, features and anisoptropic materials may be used to control the angular or spatial color and luminance and other optical properties. Examples are included in U.S. Pat. Nos. 5,703,677 and 6,996,296, which are incorporated by reference herein.

In one embodiment of this invention, the light diffracting region is a backward diffracting grating disposed on the opposite side of the light guide as the exiting surface. In this embodiment, the reflective grating may be a stamped or embossed grating with at least one array of features. The array elements (or groups of arrays) may vary in size, spacing, and shape spatially or it may have a feature that vary such as pitch, feature height, spacing, refractive index, feature shape, etc such that the optical properties vary across the light guide such that the resulting combination with the non-uniform intensity distribution of light spatially from the edge-lit configuration creates a backlight with a luminance uniformity greater than 70% and spatial color shift across the light emitting surface of less than 0.05.

In one embodiment of this invention, a backlight with improved uniformity comprises an ILRE wherein a diffraction grating is used as at least one of an input coupler or output coupler; and the grating, combination of gratings, combination of a grating and anisotropic light scattering region, combination of two or more gratings and light scattering region provide increased backlight color uniformity, luminance uniformity and reduced angular color shift. In one embodiment of this invention, diffraction gratings are disposed on the bottom surface of a light guide directly above LEDs near at least one edge of a backlight. The diffraction gratings can increase the light coupling into the light guide or control the angular light input of the light within the region optically coupled to the gratings. Designs, and methods for employing a light diffracting region that can be used in an embodiment of this invention are disclosed in U.S. Pat. Nos. 5,420,947 and "White LED light coupling into light guides with diffraction gratings," by Siitonen et al, Applied Optics Vol. 45, No. 12, Apr. 20, 2006, "Coupling of light rom an LED into a thin light guide by diffractive gratings," by Siitonen et al, Applied Optics, Vol. 43, No. 30, Oct. 20, 2004, "Double-groove, two depth grating coupler for light guides," by Laakkonen et al, J. Opt. Soc. Am. A, Vol. 23, no. 12, December 2006, "Efficient coupling into polymer waveguides by gratings," by Waldhausl, et al, Applied Optics, Vol. 36, No. 36, Dec. 20, 1997, the contents of each are incorporated by reference herein.

In one embodiment of this invention, an ILRE comprises a light diffracting region with a grating that couples incident light into light at an angle such that more light flux is captured into the light guide than would be captured were the LED directed into the edge. Alternatively, by input coupling the light with a diffraction grating, the LED may be mounted to the flat surface of the supporting board or substrate beneath the flat light guide, thus providing a smaller bezel or frame surrounding a backlight or resulting display. In one embodiment, a multitude of backlights or displays can be tiled together using input light coupling by diffraction from LED's disposed beneath the light guides due to the reduced or non-existent bezel or frame, thus providing larger displays with thin or no seams. In one embodiment of this invention, the region on the opposite side of the light guide from the LED comprises a thin reflective element selected from the group of specular reflective film or tape, voided white reflector film, anisotropic diffuser region optically coupled to a specular reflector, anisotropic adhesive optically coupled to a specular reflector. This reflective element can redirect non-diffracted light (0 order transmitted light) such that it is not out-coupled at a high intensity near the LED. By using an anisotropic light scattering region in the reflective element, the light can be spread in a direction perpendicular to the direction of travel along the light guide in order to increase the uniformity without directing light into shallower angles that escape the light guide near the LED. In a further embodiment, the output coupling grating is designed to achromatically out-couple the light from the light guide when used in combination with the input coupling grating. In another embodiment, the light guide or a portion thereof comprises at least one anisotropic light scattering region to increase the luminance and color uniformity along one direction in the output plane. When the LED is directed toward a large face of the waveguide, the input grating may be designed to be a transmission grating (on the same side of the light guide as the LED) or a reflection type (on the opposite side of the light guide as the LED) and designed to operate on one or more of the 0 orders, +1 order, −1 order, +2 order, and −2 order. Similarly, the output grating can be designed to be a transmission grating (on the same side of the light guide as the primary backlight output plane) or a reflection type (on the opposite side of the light guide as the primary backlight output plane) and designed to operate on one or more of the 0 orders, +1 order, −1 order, +2 order, and −2 order. Methods of coupling light into and out of light guides using gratings is known in the art of light guides for backlights, and optical communication (as shown by example in U.S. Pat. No. 5,420,947, the contents incorporated by reference herein), however, optical system efficiencies, uniformities and improved optical properties can be achieved by the use of light scattering regions in predetermined regions with predetermined light scattering properties (such as anisotropic light scattering properties with particular angular FWHM intensities in orthogonal planes of the diffusion profile) in conjunction with gratings of predetermined optical and physical properties.

Light-Scattering Regions

The ILRE may include more than one light-scattering region or layers. One or more of the diffusing (scattering) regions may have a symmetric or asymmetric diffusion profile in the forward (transmission) or backward (reflection) directions. The ILRE may contain volumetric and surface-relief-based scattering regions that may be asymmetric or symmetric. The scattering regions or layers may be optically coupled or separated by another material or an air gap. In one embodiment of this invention, a rigid, substantially transparent material separates two light scattering regions. In another embodiment of this invention, the asymmetrically scattering regions are aligned in an ILRE such that the luminance uniformity of a backlight is greater than 70%. In another embodiment, the spatial luminance profile of a backlight using a linear or grid array of light sources is made substantially uniform through the use of one or more asymmetrically diffusing regions within an ILRE.

In one embodiment of this invention, the use of a volumetric anisotropic light scattering region allows the scattering region to be optically coupled to the light guide such that it will still support waveguide conditions. An anisotropic surface relief scattering region on the surface of the light guide or a surface of a component optically coupled to the light guide will substantially scatter light in that region out of the light guide, thus not permitting spatially uniform out-coupling in the case of scattering over a significant portion of the light guide surface. Additionally, anisotropic scattering surface relief structures are difficult to manufacture in large sizes due to complex holographic recording techniques required.

The anisotropic scattering region may be non-polarization dependent anisotropic light scattering (NPDALS) or polarization dependent anisotropic light scattering (PDALS). The amount of diffusion in the x-z and y-z planes for the NPDALS or PDALS regions affects the luminance uniformity and the potential viewing angle of the light emitting device or backlight and display. In addition, the wavelength dispersion from the grating can be reduced along one axis. By increasing the amount of diffusion in one plane preferentially over that in the other plane, the viewing angle is asymmetrically increased. For example, with more diffusion in the x-z plane than the y-z plane, the viewing angle of the display (related to the luminance and display contrast) can be increased in the x direction. The diffusion asymmetry introduced through one or more of the anisotropic light-scattering regions of the ILRE can allow for greater control over the viewing angle, color shift, color uniformity, luminance uniformity, and angular intensity profile of the display and the optical efficiency of the backlight and display system. In another embodiment, the amount of diffusion (measured as FWHM of the angular intensity profile) varies in the plane of the diffusing layer. In another embodiment, the amount of diffusion varies in the plane perpendicular to the plane of the layer (z direction). In some embodiments, the amount of diffusion is higher in the regions in close proximity of one or more of the light sources.

In a further embodiment of this invention, a waveguide comprises at least one anisotropic light scattering region which angularly pre-conditions the light in order to locally increase the range of input angles incident upon one region of a diffraction grating. By locally increasing the angular spread of the input light, the output light from the grating will have a wider angular bandwidth for a given wavelength since the input range of angles is increased for a given wavelength.

The angular properties of the anisotropic light scattering region and the angular properties of the diffraction grating are preferably linked to provide sufficient angular color uniformity and high optical efficiency. An anisotropic light scattering region with a very high scattering angle such as FWHM of >130°, when used in combination with a diffraction grating will generally increase the angular color uniformity, however the luminance at the design angle will be reduced to further the angular spread of light and the reduced transmission associated with large angle diffusers. When the angular FWHM of the anisotropic diffuser is too small, the angular color shift of the ILRE is not sufficiently uniform. The anisotropic diffusion needed for sufficiently uniform color output (low color shift) can be related to the angular chromatic dispersion by a comparative ratio. For zero degree illumination analysis, this ratio of the angular diffusion to the angular chromatic dispersion is measured by dividing the FWHM of the diffusion profile of the anisotropic light scattering region measured with collimated light at 532 nm in the plane of diffusion corresponding to the plane of diffraction to the diffuser by the angular difference between the peak angle of the diffraction of the 436 nm and 656 nm wavelengths when illuminated with substantially collimated light (FWHM <3° or divergence <3°), with both measured with illumination normal to the surface. In one embodiment of this invention, the ratio of the angular diffusion to the chromatic dispersion is greater than or equal to 0.5. In a further embodiment of this invention, the ratio of the angular diffusion to the chromatic dispersion is greater than or equal to at least one selected from the group of 1, 1.5, 2, 4, and 6.

In another embodiment, the predetermined angular diffusion angles are based on analysis of the non-normal illumination properties of the grating or the anisotropic light scattering region. For illumination analysis at an angle θ, the ratio of the angular diffusion to the angular chromatic dispersion is measured by dividing the FWHM of the diffusion profile of the anisotropic light scattering region measured with collimated light at 532 nm in the plane of diffusion corresponding to the plane of diffraction with light incident at an angle θ by the angular difference between the peak angle of the diffraction of 436 nm and 656 nm when illuminated with substantially collimated white light (FWHM <3° or divergence <3°), wherein the grating is illuminated at an angle such that light of a wavelength of 532 nm is diffracted into an angle θ. By matching the center angle (or angle corresponding to 532 nm for ease of measurement using diode lasers) of output diffraction with the incidence angle for measurement of diffusion at 532 nm, the correlation is more optimized. In one embodiment of this invention, the ILRE comprises a light diffracting region comprising a light diffracting element that diffracts light with a wavelength selected from the wavelength range of 400 nm to 700 nm. In one embodiment of this invention, the ratio of the angular diffusion to the chromatic dispersion with 0 illumination analysis is greater than or equal to 1. In a further embodiment of this invention, the ratio of the angular diffusion to the chromatic dispersion with theta illumination analysis is greater than or equal to at least one selected from the group of 1.5, 2, 4, and 6.

In one embodiment of this invention, the anisotropic light scattering region is substantially polarization maintaining. By designing the anisotropic light scattering region to be polarization maintaining, the efficient polarization selective properties of the diffraction grating help create an optically efficient system. The ability to maintain the polarization of light can be measured by the linear depolarization ratio defined as the ratio of the light transmitted from a first polarization state to a second polarization state orthogonal to the first within a specified angular acceptance. One method of measuring this property includes aligning a linear absorptive polarizer such that its axis is parallel to the axis where polarized light is not desired, measuring the first transmittance into a specific angular cone from incident light through the polarizer, rotating the linear polarizer by 90 degrees and measuring a second transmittance and calculating the depolarization ratio by dividing the first transmittance by the second transmittance.

In one embodiment of this invention, the anisotropic light scattering region has depolarization ratio of less than 10% for light within an acceptance cone of 10 degrees from the peak luminance output angle when illuminated with s-polarized white light. In a further embodiment, the anisotropic light scattering region has depolarization ratio of less than at least one selected from the group of 8%, 6%, 4%, 2%, 1%, and 0.5% for light within a measurement acceptance cone of 10 degrees from the peak luminance output angle when illuminated with substantially collimated s-polarized white light.

In one embodiment of this invention, the anisotropic light scattering region has depolarization ratio of less than 10% for light within an acceptance cone of 10 degrees from the peak output angle for light at 550 nm. In a further embodiment, the anisotropic light scattering region has depolarization ratio of less than at least one selected from the group of 8%, 6%, 4%, 2%, 1%, and 0.5% for light within an acceptance cone of 10 degrees from the peak output angle for light at 550 nm.

The materials, manufacturing process and design of the grating and anisotropic light scattering region can be designed to minimize the depolarization ratio. In one embodiment of this invention, substantially amorphous materials are used for the matrix and or the dispersed phase domains such as polycarbonate, PETG, and polysulphone (PSU). In a further embodiment of this invention, crystalline or semicrystalline materials may be used which have a substantially equivalent refractive index in two or more orthogonal directions. An example of this type of material is polymethyl pentene (PMP). By using a material where the refractive index is substantially equivalent in two or more axes with an amorphous material processed to minimize birefringence, a very low depolarization ratio can be obtained.

In another embodiment of this invention, the birefringence of the dispersed domain in the anisotropic light scattering region is designed to match the birefringence of the matrix material where upon alignment (and any flow or form birefringence from processing), the $\Delta n$ in the x and y in-plane axes are substantially equal. In a further embodiment, the difference in the birefringence $|\Delta n(x)-\Delta n(y)|$ is less than 0.01 and the depolarization ratio is less than 5%.

The ILRE may include more than one anisotropic light-scattering region or layers. In one embodiment of this invention, a light emitting device comprises a ILRE with a first input surface disposed to receive light and an first output surface disposed to output light wherein the ILRE collimates the light within a first plane and the light emitting device further comprises a light scattering element such as an anisotropic light scattering element disposed in the optical path after the first light output surface with a larger angular FWHM diffusion profile in the first plane than in a second plane orthogonal to the first. The anisotropic diffuser can be provided with a range of angles to provide a customizable light output profile. In one embodiment of this invention, a light emitting device with an angular FWHM of less than 10 degrees in at least one output plane and an anisotropic light scattering film are provided as a kit wherein the combination of the two provides a pre-determined light output profile.

In a further embodiment of this invention, the volumetric anisotropic light scattering diffuser region has an anisotropy ratio, AR, defined by the ratio of the first angular width at half maximum diffusion intensity in a first output plane of $FWHM_1$ and a second angular width at half maximum diffusion intensity in a second output plane perpendicular to the first output plane of $FWHM_2$ such that AR>2, or preferably AR>5, or more preferably AR>10. In one embodiment of this invention, a light emitting device comprises an ILRE comprising a volumetric anisotropic light scattering region wherein AR>2, and the angular FWHM output of light from the light emitting device is less than 60 degrees in a first output plane.

One or more of the diffusing (scattering) regions may have an asymmetric diffusion profile in the forward (transmission) or backward (reflection) directions. The ILRE may contain volumetric and surface-relief-based scattering regions that may be asymmetric or symmetric. The scattering regions or layers may be optically coupled or separated by another material or an air gap. In one embodiment of this invention, substantially transparent material separates two diffusing regions. In another embodiment of this invention, the asymmetrically diffusive regions are aligned such that the luminance uniformity of a light emitting device is improved. In another embodiment, the spatial luminance profile of a light emitting device using a linear or grid array of light sources is made substantially uniform through the use of one or more asymmetrically diffusing regions or the ILRE of one embodiment of this invention.

The use of a volumetric anisotropic light scattering region in the light emitting device comprising an ILRE allows the scattering region to be optically coupled to the lightguide such that it will still support waveguide conditions. An anisotropic surface relief scattering region on the surface of the lightguide or a surface of a component optically coupled to the lightguide will substantially scatter light in that region out of the lightguide, thus not permitting spatially uniform outcoupling in the case of scattering over a significant portion of the lightguide surface. Additionally, anisotropic scattering surface relief structures are difficult to manufacture in large sizes due to complex holographic recording techniques required.

In one embodiment of this invention, the ILRE comprises an anisotropic light scattering region wherein asymmetrically shaped dispersed phase domains of one polymer within another matrix polymer contribute to the anisotropic light scattering. Light emitting devices such as light fixtures with polarized light output can reduce the glare off of surfaces.

The birefringence of one or more of the substrates, elements or dispersed phase domains may be greater than 0.1 such that a significant amount of polarization selectivity occurs due to the difference in the critical angle for different polarization states when this optically anisotropic material is optically coupled to or forms part of the lightguide. An example of this polarization selectivity is found in U.S. Pat. No. 6,795,244, the contents are incorporated herein by reference.

In one embodiment of this invention, a method for manufacturing an ILRE comprises the process of extrusion lamination, injection molding, or other secondary process wherein at least one material comprises dispersed phase domains. These domains may be asymmetrically shaped, symmetrically shaped, oriented along at least one axis. In one embodiment, these domains comprise at least one of an immiscible polymer, cross-linked particles, glass microspheres, hollow glass microspheres, polymer fibers, inorganic fibers, glass fibers, dispersed polymer beads, particles, core-shell particles, and other materials and additives known to be usable in optical components. In one embodiment of this invention, the ILRE comprises polymer photonic crystal fiber (PCF) such as disclosed in US Patent Application Publication No. 20060194046A1, the entirety of the application is incorporated herein by reference. An ILRE or light emitting device comprising an ILRE that comprises a PCF can provide increased luminance through polarization recycling. In another embodiment of this invention, the ILRE includes fibers comprising co-continuous phases such as disclosed in US Patent Application Publication No. 20060193593, the entirety of the application is incorporated herein by reference. An ILRE or light emitting device comprising a co-continuous phase based composition can provide increased luminance through polarization recycling. In one embodiment of this invention, the ILRE comprises composite polymer fibers such as those disclosed in US Patent Application Publication No. 20060193582, the entirety of the application is incorporated herein by reference. An ILRE or light emitting device comprising a polymer fiber based composite can provide increased luminance through polarization recycling or increased flexural modulus. In a further embodiment of this invention, the ILRE comprises inorganic fibers such as those disclosed in US Patent Application Publication No. 20060257679 the entirety of the application is incorporated herein by reference. An ILRE or light emitting device comprising an inorganic fiber based composite can provide increased luminance through polarization recycling or increased flexural modulus. In a further embodiment, the ILRE comprises a polymer weave such as described in US Patent Application Publication No. 20060194487, the entirety of the application is incorporated herein by reference. An ILRE or light emitting device comprising a polymer weave based composite can provide increased luminance through polarization recycling or increased flexural modulus.

In another embodiment of this invention, the light scattering region is a photoluminescent polarizer which emits substantially polarized light of a second wavelength different from the excitation wavelength. In one embodiment of this invention, an ILRE comprises a photoluminescent polarizer that scatters (angularly change the light) and converts the wavelength of a portion of the incident light through re-emission. Photoluminescent polarizers such as those described in PCT application publication number WO 01/07525 A2 filed by Christoph Weder and Paul Smith on Jul. 21, 2000 and PCT application publication number WO 99/39222 filed by Christoph Weder et al on Aug. 5, 1999, the contents of each are incorporated by reference herein, can be used in one or more embodiments of this invention along with other photoluminescent polarizer technologies known to those in the field.

Alignment of Major Diffusing Axis in Anisotropic Light Scattering Region

The alignment of the major axis of diffusion in one or more of the anisotropic light-scattering regions may be aligned parallel, perpendicular or at an angle theta with respect to a light source, array of light sources, or edge of the backlight or light emitting surface. In one embodiment, the axis of stronger diffusion is aligned perpendicular to the length of a linear light source in a backlight.

Domain Shape

The dispersed domains within one or more light scattering regions may be fibrous, spheroidal, ellipsoidal, cylindrical, spherical, other non-symmetric shape, or a combination of one or more of these shapes. The shape of the domains may be engineered such that substantially more diffusion occurs in the x-z plane than that in the y-z plane. The shape of the domains or domains may vary spatially along one or more of the x, y, or z directions. The variation may be regular, semi-random, or random.

Domain Alignment

The domains within a diffusing layer may be aligned at an angle normal, parallel, or an angle theta with respect to an edge of the diffusing layer, another array of elements such as a linear array of gratings or light refracting prisms, or a linear light source or array of light sources. In one embodiment, the domains in a diffusing region are substantially aligned along one axis that is parallel to a linear array of light sources.

Domain Location

The domains may be contained within the volume of a continuous-phase material or they may be protruding (or directly beneath a partially conformable protrusion) from the surface of the continuous-phase material.

Domain Concentration

The domains described herein in one or more light-diffusing regions may be in a low or high concentration. When the diffusion layer is thick, a lower concentration of domains is needed for a given level of haze or FWHM angular diffusion width. When the light-diffusing layer is thin, a higher concentration of domains or a greater difference in refractive index is needed for a high amount of scattering. The concentration of the dispersed domains may be from less than 1% by weight to 50% by weight. In certain conditions, a concentration of domains higher than 50% by volume may be achieved by careful selection of materials and manufacturing techniques. A higher concentration permits a thinner diffusive layer and as a result, a thinner backlight and display when the morphology is controlled. The concentration may also vary spatially along one or more of the x, y, or z directions. The variation may be regular, semi-random, or random.

Index of Refraction

The index of refraction of one or more light transmitting materials in the ILRE may be low, medium, or high in one or more of the x, y, or z directions. High refractive index materials are typically those with the refractive index above 1.56 in the x, y, or z direction. Low refractive index materials are those with the refractive index below 1.47 in the x, y, or z direction. In one embodiment of this invention, the refractive index in the x direction, $n_{L1x}$, of the first light transmitting material is less than 1.47. In another embodiment of this invention, the refractive index of the second light transmitting material in the x direction, $n_{H2x}$, is larger than 1.56. In one embodiment of this invention, the refractive index in the x direction, $n_{H3x}$, of the third light transmitting material greater than 1.56.

The difference in refractive index between the domains and the matrix in one or more of the NPDALS, PDALS or other light scattering regions may be very small or large in one or more of the x, y, or z directions. If the refractive index difference is small, then a higher concentration of domains may be required to achieve sufficient diffusion in one or more directions. If the refractive index difference is large, then fewer domains (lower concentration) are typically required to achieve sufficient diffusion and luminance uniformity. The difference in refractive index between the domains and the matrix may be zero or larger than zero in one or more of the x, y, or z directions.

The refractive index of the individual polymeric domains is one factor that contributes to the degree of light scattering by the film. Combinations of low- and high-refractive-index materials result in larger diffusion angles. In cases where birefringent materials are used, the refractive indexes in the x, y, and z directions can each affect the amount of diffusion or reflection in the processed material. In some applications, one may use specific polymers for specific qualities such as thermal, mechanical, or low-cost, however, the refractive index difference between the materials (in the x, y, or z directions, or some combination thereof) may not be suitable to generate the desired amount of diffusion or other optical characteristic such as reflection. In these cases, it is known in the field to use small domains, typically less than 1 micron in size to increase or decrease the average bulk refractive index. Preferably, light does not directly scatter from these added domains, and the addition of these domains does not substantially increase the absorption or backscatter.

During production of the ILRE or one of its regions, the refractive index of the domains or the matrix or both may change along one or more axes due to crystallization, stress- or strain-induced birefringence or other molecular or polymer-chain alignment technique.

Additive materials can increase or decrease the average refractive index based on the amount of the materials, size of the material, and the refractive index of the polymer to which they are added, and the effective refractive index of the material. Such additives can include: aerogels, sol-gel materials, silica, kaolin, alumina, fine domains of $MgF_2$ (its index of refraction is 1.38), $SiO_2$ (its index of refraction is 1.46), $AlF_3$ (its index of refraction is 1.33-1.39), $CaF_2$ (its index of refraction is 1.44), LiF (its index of refraction is 1.36-1.37), NaF (its index of refraction is 1.32-1.34) and $ThF_4$ (its index of refraction is 1.45-1.5) or the like can be considered, as discussed in U.S. Pat. No. 6,773,801, the contents incorporated by reference. Alternatively, fine domains having a high index of refraction, may be used such as fine particles of titania ($TiO_2$) or zirconia ($ZrO_2$) or other metal oxides.

By substantially matching the refractive index of the optical film continuous phase material with the light transmitting material of one region of an ILRE, the optical efficiency is improved due to the reflection intensity reduction from the interface. In one embodiment, the refractive index of the continuous phase material substantially matches the refractive index of the light transmitting region along at least one axis. In one embodiment, the difference between the refractive index of the optical film continuous phase material and the light transmitting material along a first axis is less than 0.05.

Low Refractive Index Region

In one embodiment of this invention, an ILRE comprises a region comprising a low refractive index material as the first, second, third or fourth light transmitting material. In a further embodiment, a low refractive index region is disposed between two high refractive index regions. The term "low refractive index", for the purposes of the present invention, shall generally mean a material, when applied as a layer, substrate, film, coating, injection molded region, or deposition forms a region having a refractive index along the x axis of less than about 1.49, and more preferably less than about 1.47. In a further embodiment, the low refractive index in the x direction is less than one of 1.46, 1.43 or 1.4. In one embodiment of this invention, the low refractive index material comprises a fluoropolymer such as perfluoroalkoxy (PFA), a copolymer of a fluoropolymer, a polymer of tetrafluoroethylene, hexafluoropropylene and vinylidene fluoride (THV), polymethylpentene, fluorinated elastomers (FKM), perfluoro elastomers (FFKM), tetrafluoro ethylene/propylene rubbers (FEPM), an aerogel, a polymer cross-linked aerogel.

Fluoropolymer materials used in the low refractive index region may be amorphous fluoropolymers comprising interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers contemplated by this invention are, for example, VDF-chlorotrifluoroethylene copolymers. One such VDF-chlorotrifluoroethylene copolymer is commercially known as Kel-F™ 3700, available from 3M Company. As used herein, amorphous fluoropolymers are materials that contain essentially no crystallinity or possess no significant melting point as determined for example by differential scanning caloriometry (DSC). For the purpose of this discussion, a copolymer is defined as a polymeric material resulting from the simultaneous polymerization of two or more dissimilar monomers and a homopolymer is a polymeric material resulting from the polymerization of a single monomer.

In another embodiment of this invention, the fluoropolymers are homo and copolymers based on fluorinated monomers such as TFE or VDF which do contain a crystalline melting point such as polyvinylidene fluoride (PVDF, available commercially from 3M company as Dyneon™ PVDF) or thermoplastic copolymers of TFE such as those based on the crystalline microstructure of TFE-HFP-VDF. Examples of such polymers are those available from 3M under the trade name Dyneon™ Fluoroplastics THV™ 200.

Low refractive index materials suitable for use in the present invention include those which are suitable for use in applications such as anti-reflection coatings or for cladding on optical fibers. In addition, other fluoroplastic materials are also contemplated by the present invention. For example, PVDF-containing fluoroplastic materials having very low molar levels of HFP are also contemplated by the present invention and are sold under the trade name Dyneon™ PVDF 6010 or 3100, available from Dyneon LLC, of St. Paul, Minn.; and Kynar™ 740, 2800, 9301, available from Elf Atochem North America Inc. Furthermore, other fluoroplastic materials are contemplated wherein the microstructure can also contain additional non-fluorinated monomers such as ethylene, propylene, and butylene. Examples of such microstructures having non-fluorinated monomers commercially available include Dyneon™ ETFE and THE fluoroplastics.

In one embodiment of the invention, the low refractive index material comprises a fluoroelastomer composition (amorphous). One example of a commercially available elastomeric compound of this type is available from Dyneon LLC, St. Paul Minn., under the trade name Dyneon™ Fluoroelastomer FC 2145.

Additional fluoroelastomeric compositions useful in the present invention are elastomeric TFE containing terpolymers. One example of a commercially available elastomeric compound of this type is available from Dyneon LLC, St. Paul, Minn., and is sold under the trade name Dyneon™ Fluoroelastomer FT 2430. Other examples of fluoroelastomers used in an embodiment of this invention include propylene-containing fluoroelastomers, also known as base resistant elastomers ("BRE") which are commercially available from Dyneon under the trade name Dyneon™ BRE 7200, available from 3M Company of St. Paul, Minn. Other examples of TFE-propylene copolymers can also be used and are commercially available under the tradename Aflas™, available from Asahi Glass Company of Charlotte, N.C.

Other examples of fluoropolymers and low refractive index materials may be used in a further embodiment of this invention such as those described US Patent Application Publication No.'s 20060148996, 20080158675, and 20020146555 the contents of each are incorporated by reference herein.

In one embodiment of this invention, the low refractive index region is a transparent silicone elastomer of a two-liquid RTV type (Sylgard™ 184, available from Dow Corning, Midland, Mich.) and having a refractive index of 1.430, or a silicone elastomer of a two-liquid RTV type (SE1740, available from Toray-Daw) which has a refractive index of 1.403.

In one embodiment of this invention, the low refractive index material or light transmitting material may be polymer, homopolymer, copolymer, blend or polymer alloy of PHFPO (Poly(hexafluoropropylene oxide), Hydroxypropyl cellulose, Poly(tetrafluoroethylene-co-hexafluoropropylene), FEP (Fluorinated Ethylene Propylene), Poly(pentadecafluorooctyl acrylate), Poly(tetrafluoro-3-(heptafluoropropoxy)propyl acrylate), Poly(tetrafluoro-3-(pentafluoroethoxy)propyl acrylate), PTFE [Poly(tetrafluoroethylene)], Poly(undecafluorohexyl acrylate), PFA(Perfluoroalkoxy), ETFE(Ethylene Tetrafluoroethylene), Poly(nonafluoropentyl acrylate), Poly(tetrafluoro-3-(trifluoromethoxy)propyl acrylate), Poly(pentafluorovinyl propionate), Poly(heptafluorobutyl acrylate), Poly(trifluorovinyl acetate), Poly(octafluoropentyl acrylate), Poly(methyl 3,3,3-trifluoropropyl siloxane), Poly(pentafluoropropyl acrylate), Poly(2-heptafluorobutoxy)ethyl acrylate), PCTFE(Poly(chlorotrifluoroethylene)), Poly(2,2,3,4,4-hexafluorobutyl acrylate), Poly(methyl hydro siloxane), Poly(dimethyl siloxane), Poly(trifluoroethyl acrylate), Poly (2-(1,1,2,2-tetrafluoroethoxy)ethyl acrylate), Poly (trifluoroisopropyl methacrylate), Poly(2,2,2-trifluoro-1-methylethyl methacrylate), Poly(2-trifluoroethoxyethyl acrylate), PVDF(Poly(vinylidene fluoride)), ECTFE(Ethylene Chlorotrifluorotheylene), Poly(trifluoroethyl methacrylate), Poly(methyl octadecyl siloxane), Poly(methyl hexyl siloxane), Poly(methyl octyl siloxane), Poly(isobutyl methacrylate), Poly(vinyl isobutyl ether), Poly(methyl hexadecyl siloxane), PEO(Poly(ethylene oxide)), PPDX (Poly(propylene oxide), Poly(3-butoxypropylene oxide), Poly(3-hexoxypropylene oxide), Poly(ethylene glycol), Poly(vinyl n-pentyl ether), Poly(vinyl n-hexyl ether), Poly(4-fluoro-2-trifluoromethylstyrene), Poly(vinyl octyl ether), Poly(vinyl n-octyl acrylate), Poly(vinyl 2-ethylhexyl ether), Poly(vinyl n-decyl ether), Poly(2-methoxyethyl acrylate), Poly(acryloxypropyl methyl siloxane), PMP Poly(4-methyl-1-pentene), Poly(3-methoxypropylene oxide, Poly(t-butyl methacrylate), Poly(vinyl n-dodecyl ether), Poly(3-ethoxypropyl acrylate), Poly(vinyl propionate), Poly(vinyl acetate), Poly(vinyl propionate), Poly(vinyl methyl ether), Poly(ethyl acrylate), Poly (vinyl methyl ether)(isotactic), Poly(3-methoxypropyl acrylate), Poly(1-octadecene), Poly(2-ethoxyethyl acrylate), Poly (isopropyl acrylate), Poly(1-decene), Poly(propylene)(atactic), Poly(lauryl methacrylate), Poly(vinyl sec-butyl ether) (isotactic), Poly(n-butyl acrylate), Poly(dodecyl methacrylate), Poly(ethylene succinate), Poly(tetradecyl methacrylate), Poly(hexadecyl methacrylate), Cellulose acetate butyrate, Cellulose acetate, Poly(vinyl formate), Ethylene/vinyl acetate copolymer-40% vinyl acetate, Poly(2-fluoroethyl methacrylate), Poly(octyl methyl silane), Ethyl cellulose, Poly(methyl acrylate), Poly(dicyanopropyl siloxane), Poly(oxymethylene), Poly(sec-butyl methacrylate), Poly(dimethylsiloxane-co-alpha-methylstyrene), Poly(1,1,1,3,3,3-hexafluoroisopropyl acrylate), Poly(2,2,3,3,4,4,4-heptafluorobutyl acrylate), Poly(2,2,3,3,4,4,4-heptafluorobutyl methacrylate), Poly(2,2,3,3,3-pentafluoropropyl acrylate), Poly(1,1,1,3,3,3-hexafluoroisopropyl methacrylate), Poly(2,2,3,4,4,4-hexafluorobutyl acrylate), Poly(2,2,3,4,4,4-hexafluorobutyl methacrylate), Poly(2,2,3,3,3-pentafluoropropyl methacrylate), Poly(2,2,2-trifluoroethyl acrylate), Poly(2,2,3,3-tetrafluoropropyl acrylate), Poly(2,2,3,3-tetrafluoropropyl methacrylate), or Poly(2,2,2-trifluoroethyl methacrylate).

High Refractive Index Region

Light transmitting materials with a high refractive index can include thermoplastics, thermoset, or radiation cured polymers. Polycarbonate, polysulfone, polyethersulfone, polyphenylsulfone, polyvinylidene chloride, polyvinyl chloride, PEN, Polystyrene, PET and other materials are known to have high refractive indexes. In one embodiment of this invention, an ILRE comprises a light transmitting material that is radiation curable. In one embodiment of this invention, an ILRE comprises a high refractive index material as disclosed in U.S. Pat. Nos. 6,107,364; 6,355,754; 6,359,170; 6,533,959; 6,541,591; 6,953,623; or U.S. Patent Application Publication No. 20060241220, the contents of each are incorporated by reference herein.

Light Scattering Region Location

The ILRE or a light emitting device comprising the ILRE may comprise one or more light scattering regions which may be anisotropic, isotropic, or substantially symmetrically scattering. The scattering region may be volumetric or surface relief based. On or more of the light scattering regions may be located within the first light transmitting material, second light transmitting material, third light transmitting material, fourth light transmitting material; within a region near light collimating features, within region near inverted light collimating features, within a substrate, within a light reflecting region, within the light transmitting region, within or adhered to the waveguide, between the ILRE and the light emitting device light output surface, between the ILRE and the waveguide or between the waveguide and one or more light emitting sources such as LED's. The light scattering region may be optically coupled to one or more elements, regions or layers of the ILRE or one or more elements of the light emitting device. In one embodiment of this invention, the light scattering material is optically coupled to one or more components of the ILRE or the light emitting device using a low refractive index adhesive or polymer. In a further embodiment of this invention, an ILRE comprises an anisotropic light scattering film optically coupled using a pressure sensitive adhesive to the apex region of a film comprising convex light collimating surface relief features such that the anisotropic light scattering film provides a substantially planar output surface that is more resistant to scratches. In a further embodiment of this invention, the contact angle between the surface relief features (such as lens arrays) and a polymer or adhesive layer is less than 20 degrees. In a further embodiment, the contact angle is less than 10 degrees. In a further embodiment, the contact angle is less than 5 degrees. In one embodiment, the loss of the refractive power at the apex of the light collimating surface relief features where the pressure sensitive adhesive effectively index matches out the interface increases the FWHM angular intensity output in a plane perpendicular to the plane of collimation for the light collimating features by less than one selected from the group of 2 degrees, 5 degrees, 10 degrees, or 20 degrees relative to the anisotropic light scattering film separated from the light collimating surface feature component by an air gap.

In a further embodiment, of this invention the anisotropic light scattering region is position such that it is substantially beneath the light emitting diode output surface relative to the light output surface. In one embodiment, the volumetric anisotropic light scattering film is disposed to receive light directly from a point on the light emitting source surface at an incidence angle in the light transmitting material of less than 20 degrees from a normal to the first light output surface. In a further embodiment, the anisotropic light scattering film is disposed to receive light directly from the light source output surface at an incidence angle in the light transmitting material parallel to the normal to the first output surface.

Surface Relief Structure

One or more surfaces of the ILRE may contain a non-smooth surface. The surface profile may contain protrusions or pits that may range from 1 nm to 3 mm in the x, y, or z directions. The profile or individual features may have periodic, random, semi-random, or other uniform or non-uniform structure. The surface features may be designed to provide diffractive, scattering or refracting properties to the ILRE, such as collimation, anti-blocking, refraction, symmetric diffusion, asymmetric diffusion or diffraction. In one embodiment of this invention, the surface features are a linear array of prismatic structures that provide collimation properties. In another embodiment, the surface-relief features comprise hemispherical protrusions that prevent wet-out or provide anti-blocking properties or light-collimating properties.

One or more surfaces or interfaces of the ILRE may contain a non-planar surface relief feature. As used herein, a surface relief feature or structure may include the interfacial boundary between two or more materials. In one embodiment of this invention a surface relief feature is formed in a first light transmitting material which is subsequently substantially planarized by a second light transmitting material. In this embodiment, the resulting ILRE is substantially planar, however, due to the difference in refractive index of the first and second light transmitting materials, the interface, which was previously the outer surface relief feature of the first light transmitting material, is now a surface relief feature formed at the interface between the first and second light transmitting materials and can provide light re-direction functions such as diffraction, diffusion, collimation or angular spreading of light. The resulting ILRE in this embodiment can be substantially planar, yet have light redirecting surface relief features within the volume.

Surface relief features that re-direct light can be called light redirecting features and include refractive, reflective or scattering features such a lenses, prisms, hemispherical, defined optical shapes with functionality, or arrays or patterns of these features. In one embodiment of this invention, a ILRE or light emitting device comprising a ILRE has improved optical or mechanical performance by comprising a light redirecting feature, a layer configuration, an additive, material, light source, or article with optical properties as described in US Patent Application Publication Nos. 20070201246, 20060056166, 2006/0227546, or 20060290253, the entirety of each are incorporated herein by reference. In a further embodiment of this invention, the method of manufacturing an ILRE comprises a step or process described in the aforementioned patent applications.

In one embodiment of this invention, an ILRE comprises a surface relief feature or prismatic structure or lens structure with refractive or diffractive properties as described in U.S.

Pat. Nos. 6,354,709, 4,984,144, 6,862,141 and U.S. Patent Application Publication No. 20060204720, the contents of the patents and patent application are incorporated by reference herein.

In one embodiment of this invention, a ILRE or light emitting device comprising a ILRE comprises at least one optical film or surface relief or optical or mechanical feature of a film selected from the group of BEF, BEF II, BEF III, TBEF, BEF-RP, BEFII 90/24, BEF II 90/50, DBEF-MF1-650, DBEF-MF2-470, BEFRP2-RC, TBEF2 T 62i 90/24, TBEF2 M 65i 90/24, NBEF, NBEF M, Thick RBEF, WBEF-520, WBEF-818, OLF-KR-1, and 3637T OLF Transport sold by 3M, PORTGRAM V7 sold by Dai Nippon Printing Co., Ltd., LUMTHRU that sold by Sumitomo Chemical Co., Ltd. and ESTINAWAVE W518 and W425 DI sold by Sekisui Chemical Co., Ltd.

In one embodiment of this invention, a ILRE or light emitting device comprising a ILRE comprises a surface relief structure which comprises a non-symmetrical prismatic structure such as those found on Image Directing Film (IDF or IDFII) or Transmissive Right Angle Film (TRAF or TRAFII) sold by 3M.

In a further embodiment of this invention, a ILRE (or light emitting device comprising a ILRE) comprises a surface relief structure in the form of a "reverse prism film" such as sold by Mitsubishi Rayon Co., Ltd. under the trade names of DIA ART H150, H210, P150 and P210, or comprises a surface relief structure as disclosed in the embodiments within U.S. Pat. Nos. 6,545,827, 6,151,169, 6,746,130, and 5,126,882, the contents of which are incorporated by reference herein.

In one embodiment of this invention, the surface relief features or interfaces between materials in one region or surface of an ILRE substantially collimate incident light. In another embodiment of this invention, the regularity of a surface feature, such as an array of prisms, is modified in order to introduce diffusion, color mixing, reduce moiré interference, increased angular spread, provide anti-blocking properties, or to reduce damage to other films by adding particles to the surface or in the volume, changing the height, depth, shape, pitch, regularity of pitch, degree of randomness of a feature, or curvature of surfaces on one or more sides in one or more directions of the ILRE or surface of the ILRE or surface relief feature. In one embodiment of this invention, the depth of the prism features is changed and introduces curvature into the surface of the prisms. In one embodiment of this invention, a coating of beads is applied to the surface feature or the opposite side of the ILRE.

Light Collimating Surface Features

One or more surfaces or interfaces of the ILRE may include surface profiles that provide collimation properties. The collimation properties direct light rays incident from large angles into angles closer to the direction substantially perpendicular to the ILRE (smaller angles) within one or more planes such as the x-z plane or the y-z plane. The features may be in the form of a array of prisms, an array of pyramids, an array of cones, an array of hemispheres, an array of lenses, or other feature that is known to direct more light into the direction normal to the surface of the light emitting device. The array of features may be regular, irregular, random, ordered, semi-random or other arrangement where light can be collimated through refraction, reflection, total internal reflection, diffraction, or scattering.

In one embodiment of this invention, light collimating surface features are convex in shape wherein a convex surface is a surface of a material wherein a line drawn between two points along the smallest feature on the surface of the material pass through the material. In one embodiment of this invention, light collimating surface features are convex in shape wherein the convex surface is a surface profile curving or bulging outward material that collimates light through refraction.

In one embodiment of this invention, the light output from a light emitting device comprising an ILRE that comprises an optical film or light collimating film is more collimated relative to the device without the ILRE.

Light Redirection Features

In another embodiment of this invention, the surface relief features are light redirection features that increase the off-axis intensity at an angle larger from the optical axis within one or more planes. In a further embodiment of this invention, the incident light passing through light redirection features is directed through a total angle larger than one selected from the group consisting of 10 degrees, 30 degrees, 45 degrees, 60 degrees, 90 degrees, 120 degrees, or 160 degrees. In one embodiment of this invention, the light redirection features are not symmetrical in a first plane substantially parallel to the incident light.

Surface Relief Feature Transmission

In one embodiment of this invention, an ILRE comprises more than one surface-relief feature. In one embodiment, the surface relief feature is within the volume of the ILRE at the interface between two materials and a second surface relief feature is on an outer surface of the ILRE. In a further embodiment, the optical efficiency of the system is increased through the use of surface relief features to the increased coupling into the film due to reflected light from the surface reaching a second portion of the surface and being able to pass through. In one embodiment, the transmission of the ILRE comprising a surface relief region is greater than one selected from the group consisting of 80%, 85%, 90%, 94%, 96% as measured according to ASTM D1003 with the light incident on the relief surface. In one embodiment, the transmission of the ILRE comprising a surface relief region and a volumetric anisotropic region is greater than one selected from the group consisting of 70%, 80%, 85%, 90%, 94%, and 96% as measured according to ASTM D1003 with the light incident on the relief surface.

Pitch of Surface Relief Features

A surface relief feature wherein the feature has a substantially constant pitch or regularity among a feature can interfere with a substantially constant pitch or regularity among a feature of another surface relief feature creating lines or patterns of luminance non-uniformity. In one embodiment of this invention, the moiré pattern viewable on an ILRE or between the ILRE and a second film or element in a light emitting device is alleviated by effectively randomizing the pitch, height, shape or spacing between the apex or valleys of at least one of the elements. In one embodiment of this invention, the moiré contrast can be reduced producing a random or predetermined variation on the pitch or slop angle of a refracting or TIR element as described in reference to brightness enhancing films in U.S. Pat. Nos. 5,919,551, 6,354,709, 5,771,328, 7,092,163, and 6,862,141, the contents of which are incorporated by reference herein. In one embodiment of this invention, the luminance contrast due to moiré is less than 30%, 20%, 10%, or 5%.

Additional ILRE Properties

The ILRE of this invention may contain materials, additives, components, blends, coatings, treatments, layers or regions that provide additional optical, mechanical, environmental, thermal or electrical benefits. The properties of the ILRE or a region of the ILRE may include one or more of the following:

| | |
|---|---|
| Optical: | increased optical throughput, increased/decreased diffusion along one or more axis, reduced or increased birefringence, increased luminance uniformity, improved color stability, reduced haze. |
| Mechanical/ Physical: | increase rigidity, reduced thickness, reduced weight, increased scratch resistance, reduced/increased pencil hardness, anti-blocking features, |
| Environment: | reduced warpage, increased light resistance, increased moisture resistance, increased light resistance, increased ultraviolet absorption, |
| Thermal: | increased thermal resistance, increased softening temperature. |
| Electrical: | decreased surface resistance |

Other properties that are known in the industry to improve the performance of a optical body, film, sheet, or plate may also be incorporated into one of these regions.

ILRE Composition

The ILRE of this invention includes one or more light-scattering regions of a matrix material including dispersed domains. In another embodiment, the light-scattering region may include a region of light-scattering surface features that exhibit asymmetric scattering properties. In another embodiment, one or more of the scattering regions may be an adhesive joining two or more components of the backlight system. The ILRE may also include a substrate that may be substantially optically transparent. The materials chosen for the substrate, dispersed, or continuous phases may be one or more polymeric or inorganic materials.

Such polymers include, but are not limited to acrylics, styrenics, olefins, polycarbonates, polyesters, cellulosics, and the like. Specific examples include poly(methyl methacrylate) and copolymers thereof, polystyrene and copolymers thereof, poly(styrene-co-acrylonitrile), polyethylene and copolymers thereof, polypropylene and copolymers thereof, poly(ethylene-propylene) copolymers, poly(vinyl acetate) and copolymers thereof, poly(vinyl alcohol) and copolymers thereof, bisphenol-A polycarbonate and copolymers thereof, poly(ethylene terephthalate) and copolymers thereof; poly (ethylene 2,6-naphthalenedicarboxylate) and copolymers thereof, polyarylates, polyamide copolymers, poly(vinyl chloride), cellulose acetate, cellulose acetate butyrate, cellulose acetate propionate, polyetherimide and copolymers thereof, polyethersulfone and copolymers thereof, polysulfone and copolymers thereof, and polysiloxanes.

Numerous methacrylate and acrylate resins are suitable for one or more phases of the present invention. The methacrylates include but are not limited to polymethacrylates such as poly(methyl methacrylate), poly(ethyl methacrylate), poly (propyl methacrylate), poly(butyl methacrylate), poly(isobutyl methacrylate), methyl methacrylate-methacrylic acid copolymer, methyl methacrylate-acrylate copolymers, and methyl methacrylate-styrene copolymers (e.g., MS resins). Suitable methacrylic resins include poly(alkyl methacrylate)s and copolymers thereof. In particular embodiments, methacrylic resins include poly(methyl methacrylate) and copolymers thereof. The acrylates include but are not limited to poly(methyl acrylate), poly(ethyl acrylate), and poly(butyl acrylate), and copolymers thereof.

A variety of styrenic resins are suitable for polymeric phases of the present invention. Such resins include vinyl aromatic polymers, such as syndiotactic polystyrene. Syndiotactic vinyl aromatic polymers useful in the present invention include poly(styrene), poly(alkyl styrene)s, poly (aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly (phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, suitable styrene resin polymers include polystyrene, polyp-methyl styrene), poly(m-methyl styrene), polyp-tertiary butyl styrene), poly(p-chlorostyrene), poly(m-chloro styrene), polyp-fluoro styrene), and copolymers of styrene and p-methyl styrene. In particular embodiments, styrenic resins include polystyrene and copolymers thereof.

Particular polyester and copolyester resins are suitable for phases of the present invention. Such resins include poly (ethylene terephthalate) and copolymers thereof, poly(ethylene 2,6-naphthalenedicarboxylate) and copolymers thereof, poly(1,4-cyclohexandimethylene terephthalate) and copolymers thereof, and copolymers of poly(butylene terephthalate). The acid component of the resin can comprise terephthalic acid, isophthalic acid, 2,6-naphthalenedicarboxylic acid or a mixture of said acids. The polyesters and copolyesters can be modified by minor amounts of other acids or a mixture of acids (or equivalents esters) including, but not limited to, phthalic acid, 4,4'-stilbene dicarboxylic acid, 2,6-naphthalenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid and trans-1,4-cyclohexanedicarboxylic acid. The glycol component of the resin can comprise ethylene glycol, 1,4-cyclohexanedimethanol, butylene glycol, or a mixture of said glycols. The copolyesters can also be modified by minor amounts of other glycols or a mixture of glycols including, but not limited to, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4,4-tetramethyl-1,3-cyclobutanediol, diethylene glycol, bisphenol A and hydroquinone. Suitable polyester resins include copolyesters formed by the reaction of a mixture of terephthalic acid and isophthalic acid or their equivalent esters with a mixture of 1,4-cyclohexanedimethanol and ethylene glycol. In particular embodiments, the polyester resins include copolyesters formed by the reaction of terephthalic acid or its equivalent ester with a mixture of 1,4-cyclohexanedimethanol and ethylene glycol.

Certain polycarbonate and copolycarbonate resins are suitable for phases of the present invention. Polycarbonate resins are typically obtained by reacting a diphenol with a carbonate precursor by solution polymerization or melt polymerization. The diphenol is preferably 2,2-bis(4-hydroxyphenyl)propane (so-called "bisphenol A"), but other diphenols may be used as part or all of the diphenol. Examples of the other diphenol include 1,1-bis(4-hydroxyphenyl)ethane, 1,1-bis(4-hydroxyphenyl)cyclohexane, 2,2-bis(4-hydroxy-3,5-dimethylphenyl-)propane, 2,2-bis(4-hydroxy-3-methylphenyl)propane, bis(4-hydroxyphenyl)sulfideandbis(4-hydroxyphenyl)sulfone. The polycarbonate resin can be a resin which comprises bisphenol A in an amount of 50 mol % or more, particularly 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Particularly suitable are phosgene and diphenyl carbonate.

A number of poly(alkylene) polymers are suitable for phases of the present invention. Such polyalkylene polymers include polyethylene, polypropylene, polybutylene, polyisobutylene, poly(4-methyl)pentene), copolymers thereof, chlorinated variations thereof, and fluorinated variations thereof.

Particular cellulosic resins are suitable for phases of the present invention. Such resins include cellulose acetate, cellulose acetate butyrate, cellulose acetate propionate, cellulose propionate, ethyl cellulose, cellulose nitrate. Cellulosic resins including a variety of plasticizers such as diethyl phthalate are also within the scope of the present invention.

The ILRE in one embodiment of this invention includes one or more light-transmitting regions. The light transmitting region may also scatter light as a light scattering region. In a further embodiment, the ILRE comprises a light scattering region comprising matrix material (continuous phase) including dispersed domains (dispersed phase). In one embodiment of this invention, the light transmitting material is a continuous phase material. In another embodiment of this invention, the light transmitting material is a dispersed phase material. In another embodiment, the light transmitting or light-scattering region may include a region of light-scattering surface features that exhibit asymmetric scattering properties. In another embodiment, one or more of the light transmitting or light scattering regions may be an adhesive joining two or more components of the light emitting device system. The ILRE may also include a substrate, carrier, capping layer, protective layer or light transmitting material one on or more surfaces that may be substantially optically transparent. In one embodiment of this invention, the material chosen for the light transmitting material, such as the continuous phase material, dispersed phase material, substrate, carrier, capping layer, or protective layer comprises one or more polymeric or inorganic materials.

In one embodiment of this invention, the light transmitting material comprises polymers which include, but are not limited to acrylics, styrenics, olefins, polycarbonates, polyesters, cellulosics, and the like. Specific examples include poly(m-ethyl methacrylate) and copolymers thereof, polystyrene and copolymers thereof, poly(styrene-co-acrylonitrile), polyethylene and copolymers thereof, polypropylene and copolymers thereof, poly(ethylene-propylene) copolymers, poly(vinyl acetate) and copolymers thereof, poly(vinyl alcohol) and copolymers thereof, bisphenol-A polycarbonate and copolymers thereof, poly(ethylene terephthalate) and copolymers thereof; poly(ethylene 2,6-naphthalenedicarboxylate) and copolymers thereof, polyarylates, polyamide copolymers, poly(vinyl chloride), cellulose acetate, cellulose acetate butyrate, cellulose acetate propionate, polyetherimide and copolymers thereof, polyethersulfone and copolymers thereof, polysulfone and copolymers thereof, and polysiloxanes.

Numerous methacrylate and acrylate resins are suitable for one or more phases of the present invention. The methacrylates include but are not limited to polymethacrylates such as poly(methyl methacrylate), poly(ethyl methacrylate), poly(propyl methacrylate), poly(butyl methacrylate), poly(isobutyl methacrylate), methyl methacrylate-methacrylic acid copolymer, methyl methacrylate-acrylate copolymers, and methyl methacrylate-styrene copolymers (e.g., MS resins). Suitable methacrylic resins include poly(alkyl methacrylate)s and copolymers thereof. In particular embodiments, methacrylic resins include poly(methyl methacrylate) and copolymers thereof. The acrylates include but are not limited to poly(methyl acrylate), poly(ethyl acrylate), and poly(butyl acrylate), and copolymers thereof.

A variety of styrenic resins are suitable for polymeric phases of the present invention. Such resins include vinyl aromatic polymers, such as syndiotactic polystyrene. Syndiotactic vinyl aromatic polymers useful in the present invention include poly(styrene), poly(alkyl styrene)s, poly (aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, suitable styrene resin polymers include polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene. In particular embodiments, styrenic resins include polystyrene and copolymers thereof.

Particular polyester and copolyester resins are suitable for phases of the present invention. Such resins include poly(ethylene terephthalate) and copolymers thereof, poly(ethylene 2,6-naphthalenedicarboxylate) and copolymers thereof, poly(1,4-cyclohexandimethylene terephthalate) and copolymers thereof, and copolymers of poly(butylene terephthalate). The acid component of the resin can comprise terephthalic acid, isophthalic acid, 2,6-naphthalenedicarboxylic acid or a mixture of said acids. The polyesters and copolyesters can be modified by minor amounts of other acids or a mixture of acids (or equivalents esters) including, but not limited to, phthalic acid, 4,4'-stilbene dicarboxylic acid, 2,6-naphthalenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid and trans-1,4-cyclohexanedicarboxylic acid. The glycol component of the resin can comprise ethylene glycol, 1,4-cyclohexanedimethanol, butylene glycol, or a mixture of said glycols. The copolyesters can also be modified by minor amounts of other glycols or a mixture of glycols including, but not limited to, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4,4-tetramethyl-1,3-cyclobutanediol, diethylene glycol, bisphenol A and hydroquinone. Suitable polyester resins include copolyesters formed by the reaction of a mixture of terephthalic acid and isophthalic acid or their equivalent esters with a mixture of 1,4-cyclohexanedimethanol and ethylene glycol. In particular embodiments, the polyester resins include copolyesters formed by the reaction of terephthalic acid or its equivalent ester with a mixture of 1,4-cyclohexanedimethanol and ethylene glycol.

Certain polycarbonate and copolycarbonate resins are suitable for materials of the present invention. Polycarbonate resins are typically obtained by reacting a diphenol with a carbonate precursor by solution polymerization or melt polymerization. The diphenol is preferably 2,2-bis(4-hydroxyphenyl)propane (so-called "bisphenol A"), but other diphenols may be used as part or all of the diphenol. Examples of the other diphenol include 1,1-bis(4-hydroxyphenyl)ethane, 1,1-bis(4-hydroxyphenyl)cyclohexane, 2,2-bis(4-hydroxy-3,5-dimethylphenyl-)propane, 2,2-bis(4-hydroxy-3-methylphenyl)propane, bis(4-hydroxyphenyl)sulfideandbis(4-hydroxyphenyl)sulfone. The polycarbonate resin can be a resin which comprises bisphenol A in an amount of 50 mol % or more, particularly 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Particularly suitable are phosgene and diphenyl carbonate.

A number of poly(alkylene) polymers are suitable for phases of the present invention. Such polyalkylene polymers include polyethylene, polypropylene, polybutylene, polyisobutylene, poly(4-methyl)pentene), copolymers thereof, chlorinated variations thereof, and fluorinated variations thereof.

Particular cellulosic resins are suitable for phases of the present invention. Such resins include cellulose acetate, cellulose acetate butyrate, cellulose acetate propionate, cellulose propionate, ethyl cellulose, cellulose nitrate. Cellulosic resins including a variety of plasticizers such as diethyl phthalate are also within the scope of the present invention. Other materials known to be used in optical elements described in this disclosure, patent or patent application references incorporated herein, or known to those in the optical films for displays or lighting industries may also be used as the light transmitting material in accordance with an embodiment of this invention.

ILRE Additives

Additives, components, blends, coatings, treatments, layers or regions may be combined on or within the aforementioned regions to provide additional properties. These may be inorganic or organic materials. They may be chosen to provide increased rigidity to enable support of additional films or backlight components. They may be chosen to provide increased thermal resistance so that the plate or film does not warp. They may be chosen to increase moisture resistance, such that the plate does not warp or degrade other properties when exposed to high levels of humidity. These materials may be designed to provide improved optical performance by reducing wet-out when in contact with other components in the backlight. Additives may be used to absorb ultra-violet radiation to increase light resistance of the product. They may be chosen to increase, decrease, or match the scratch resistance of other components in the display or backlight system. They may be chosen to decrease the surface or volumetric resistance of the ILRE or region of the ILRE to achieve anti-static properties.

The additives may be components of one or more layers of the ILRE. The additives may be coatings that are added onto a surface or functional layers that are a combined during the manufacturing process. The additives may be dispersed throughout the volume of a layer or coating or they could be applied to a surface.

Anti-Static Additives

Anti-static monomers or inert additives may be added to one or more regions or domains of the ILRE. Reactive and inert anti-static additives are well known and well enumerated in the literature. High temperature quaternary amines or conductive polymers may be used. As an anti-static agent, stearyl alcohol, behenyl alcohol, and other long-chain alkyl alcohols, glyceryl monostearate, pentaerythritol monostearate, and other fatty acid esters of polyhydric alcohols, etc., may be used. In particular embodiments, stearyl alcohol and behenyl alcohol are used.

Anti-Reflection Coatings

The ILRE or a light emitting device made in accordance with one embodiment of this invention may include one or more anti-reflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the ILRE or light emitting devices of one embodiment of the present invention through appropriate surface treatment, such as coating or sputter etching. In some embodiments of the present invention, it is desired to maximize the transmission and/or minimize the specular reflection for certain polarizations of light. In these embodiments, the ILRE may comprise two or more layers in which at least one layer comprises an anti-reflection system in close contact with a layer providing the continuous and disperse phases. Such an anti-reflection system acts to reduce the specular reflection of the incident light and to increase the amount of incident light that enters the portion of the body comprising the continuous and disperse layers. Such a function can be accomplished by a variety of means well known in the art. Examples are quarter wave anti-reflection layers, two or more layer anti-reflective stack, graded index layers, and graded density layers. Such anti-reflection functions can also be used on the transmitted light side of the ILRE to increase transmitted light if desired.

Anti-Fogging Properties

The ILRE or a light emitting device comprising an ILRE may also be provided with a film or coating which imparts anti-fogging properties. In some cases, an anti-reflection layer as described above will serve the dual purpose of imparting both anti-reflection and anti-fogging properties to the ILRE or device. Various anti-fogging agents are known to the art which are suitable for use with the present invention. Typically, however, these materials will comprise substances, such as fatty acid esters, which impart hydrophobic properties to the ILRE surface and which promote the formation of a continuous, less opaque film of water. Several inventors have reported coatings that reduce the tendency for surfaces to "fog". For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkylbenzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994]41,335 discloses a clouding and drip preventive composition comprising colloidal alumina, colloidal silica and an anionic surfactant. U.S. Pat. No. 4,478,909 (Taniguchi et al) discloses a cured anti-fogging coating film which comprises polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings comprising surfactants are described in U.S. Pat. Nos. 2,803,552;

3,022,178; and 3,897,356. World Patent No. PCT 96/18,691 (Scholtz et al) discloses means by which coatings may impart both anti-fog and anti-reflective properties.

UV Stability

The ILRE or light emitting device comprising the ILRE of one embodiment of the present invention may also be protected from UV radiation through the use of UV stabilized films or coatings. Suitable UV stabilized materials and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such materials or coatings will be particularly important when the ILRE or light emitting device of one embodiment of this invention is used in outdoor applications or in luminaires where the source emits significant amount of light in the UV region of the spectrum.

Antioxidants

The ILRE and light emitting devices comprising an ILRE in one or more embodiments of this invention may also include antioxidants such as, for example, 4,4'-thiobis-(6-t-butyl-m-cresol), 2,2'-methylenebis-(4-methyl-6-t-butyl-butylphenol), octadecyl-3,5-di-t-butyl-4-hydroxyhydrocinnamate, bis-(2,4-di-t-butylphenyl) pentaerythritol diphosphite, Irganox™ 1093 (1979)(((3,5-bis(1,1-dimethylethyl)-4-hydroxyphenyl) methyl)-dioctadecyl ester phosphonic acid), Irganox™ 1098 (N,N'-1,6-hexanediylbis(3,5-bis(1,1-dimethyl)-4-hydroxy-benzenepropanamide), Naugaard™ 445 (aryl amine), Irganox™ L 57 (alkylated diphenylamine), Irganox™ L 115 (sulfur containing bisphenol), Irganox™ LO 6 (alkylated phenyl-delta-napthylamine), Ethanox 398 (fluorophosphonite), and 2,2'-ethylidenebis(4,6-di-t-butylphenyl) fluorophosnite. A group of antioxidants that are especially preferred are sterically hindered phenols, including butylated hydroxytoluene (BHT), Vitamin E (di-alpha-tocopherol), Irganox™ 1425WL (calcium bis-(O-ethyl(3,5-di-t-butyl-4-hydroxybenzyl))phosphonate), Irganox™ 1010 (tetrakis(methylene(3,5,di-t-butyl-4-hydroxyhydrocinnamate))methane), Irganox™ 1076 (octadecyl 3,5-di-tert-butyl-4-hydroxyhydrocinnamate), Ethanox™ 702 (hindered bis phenolic), Etanox 330 (high molecular weight hindered phenolic), and Ethanox™ 703 (hindered phenolic amine).

Inks, Dyes or Pigments

The ILRE and light emitting devices comprising an ILRE in one or more embodiments of this invention may also be treated with inks, dyes, or pigments to alter their appearance or to customize them for specific applications. Thus, for example, the films may be treated with inks or other printed indicia such as those used to display product identification, advertisements, warnings, decoration, or other information. Various techniques can be used to print on the film, such as screen printing, letterpress, offset, flexographic printing, stipple printing, laser printing, and so forth, and various types of ink can be used, including one and two component inks, oxidatively drying and UV-drying inks, dissolved inks, dispersed inks, and 100% ink systems. The appearance of the ILRE or light emitting device may also be altered by coloring the device such as by laminating a dyed film to the ILRE, applying a pigmented coating to the surface of the optical device, or including a pigment in one or more of the materials used to make the ILRE. Both visible and near IR dyes and pigments are contemplated in the present invention, and include, for example, optical brighteners such as dyes that absorb in the UV and fluoresce in the visible region of the color spectrum. Other additional layers that may be added to alter the appearance of the ILRE include, for example, opacifying (black) layers, diffusing layers, holographic images or holographic diffusers, and metal layers. Each of these may be applied directly to one or both surfaces of the ILRE, or may be a component of a second film or foil construction that is laminated to the ILRE. Alternately, some components such as opacifying or diffusing agents, or colored pigments, may be included in an adhesive layer which is used to laminate the ILRE to another surface.

Metal Coatings

The ILRE and light emitting devices comprising an ILRE in one or more embodiments of this invention are provided with metal coatings. Thus, for example, a metallic layer may be applied directly to an optical region or element of an ILRE or component to be used with an ILRE in a light emitting device by pyrolysis, powder coating, vapor deposition, cathode sputtering, ion plating, and the like. Metal foils or rigid metal plates may also be laminated to the optical film, or separate polymeric films or glass or plastic sheets may be first metallized using the aforementioned techniques and then laminated to the optical films and devices of the present invention. In one embodiment of this invention, an ILRE comprises a diffractive element comprising an aluminized PET film.

Dichroic Dyes

Dichroic dyes are a particularly useful additive for many of the applications to which the ILRE and light emitting devices comprising an ILRE in one or more embodiments of this invention and light emitting devices of the present invention are directed, due to their ability to absorb light of a particular polarization when they are molecularly aligned within the material. When used in a ILRE or light emitting device, the dichroic dye causes the material to absorb one polarization of light more than another. Suitable dichroic dyes for use in the present invention include Congo Red (sodium diphenyl-bis-a-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN. Still other dichroic dyes, and methods of making them, are discussed in the Kirk Othmer Encyclopedia of Chemical Technology, Vol. 8, pp. 652-661 (4th Ed. 1993), and in the references cited therein. Dychroic dyes in combination with certain polymer systems exhibit the ability to polarize light to varying degrees. Polyvinyl alcohol and certain dichroic dyes may be used to make films with the ability to polarize light. Other polymers, such as polyethylene terephthalate or polyamides, such as nylon-6, do not exhibit as strong an ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light. Combinations of a dichroic dye with a multilayer optical polarizer are described in U.S. patent application Ser. No. 08/402,042 entitled "Optical Polarizer" filed Mar. 10, 1995; in U.S. Pat. No. 6,123,811 (Kausch et al.) entitled "Dichroic Polarizing Film and Optical Polarizers Containing the Film" filed Jan. 13, 1998; and in U.S. Pat. No. 6,111,697 (Merrill et al.) entitled "Optical Device with a Dichroic Polarizer and a Multilayer Optical Film" filed Jan. 13, 1998.

In addition to the films, coatings, and additives noted above, the light transmitting materials of the ILRE in the present invention may also comprise other materials or additives as are known to the art. Such materials include binders, coatings, fillers, compatibilizers, surfactants, antimicrobial agents, foaming agents, reinforcers, heat stabilizers, impact modifiers, plasticizers, viscosity modifiers, and other such materials.

The ILREs and light emitting devices made in accordance with the present invention may be subjected to various treatments which modify the surfaces of these materials, or any portion thereof, as by rendering them more conducive to subsequent treatments such as coating, dying, metallizing, or lamination. This may be accomplished through treatment with primers, such as PVDC, PMMA, epoxies, and aziridines, or through physical priming treatments such as corona, flame, plasma, flash lamp, sputter-etching, e-beam treatments, or amorphizing the surface layer to remove crystallinity, such as with a hot can.

Adhesives

Adhesives such as pressure-sensitive or UV-cured adhesives may also be used between one or more layers to achieve optical coupling. Materials known to those in the field of optical films, plates, diffuser plates, films, backlights, light fixtures and other light emitting devices to provide optical, thermal, mechanical, environmental, electrical and other benefits may be used in the volume or on a surface, coating, or layer of the ILRE or one of its regions. The adhesive layer may also contain symmetric, asymmetric, or a combination of symmetric and asymmetric domains in order to achieve desired light-scattering properties within the diffusion layer.

The ILREs and optical devices made in accordance with the invention may also be provided with one or more adhesives to laminate the ILRE or components of the ILRE of the present invention to another film, surface, or substrate or to another component to manufacture the ILRE. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above. Additionally, the adhesives can contain additives such as tackifiers, plasticizers, fillers, antioxidants, stabilizers, pigments, diffusing particles, curatives, and solvents. In some applications, as where the ILRE of the one embodiment of the invention is used in an low adhesion adhering condition, it may be desirable to treat the ILRE with low adhesion backside (LAB) coatings or films such as those based on urethane, silicone or fluorocarbon chemistry. ILREs treated in this manner on one or more surfaces will exhibit proper release properties towards pressure sensitive adhesives (PSAs), thereby enabling them to be treated with adhesive and wound into rolls. When a laminating adhesive is used to adhere an ILRE of the present invention to another surface, the adhesive composition and thickness are preferably selected so as not to interfere with the optical properties of the ILRE. For example, when laminating additional layers to an ILRE comprising a polarizer or mirror wherein a high degree of transmission is desired, the laminating adhesive should be optically clear in the wavelength region that the polarizer or mirror is designed to be transparent in.

Slip Agents

It is well known in the art of polymer optical films to include small amounts of fine particulate materials, often referred to as "slip agents," to provide such surface roughness or texture. The use of slip agents can be incorporated into the inventive optical films. However, the inclusion of slip agent particulates can introduce a small amount of haze and can decrease the optical transmission of the film. In accordance with the present invention, Newton's Rings can be effectively prevented, without the use of slip agents, if surface roughness or texture is provided by contacting the cast web with a micro-embossing roll during film casting. Preferably, the micro-embossing roll will serve as a nip roll to the casting wheel. Alternatively, the casting wheel itself may be micro-textured to provide a similar effect. Further, both a micro-embossing casting wheel and a micro-embossing nip roll may be used together to provide a film that is micro-embossed on both sides.

The optical films of the present invention may comprise a slip agent that is incorporated into the film or added as a separate coating in order to improve roll formation and convertibility of the film. In most applications, slip agents will be added to only one side of the film, ideally the side facing the rigid substrate in order to minimize haze. The ILREs of the present invention may be given good slip properties by treating them with low friction coatings or slip agents, such as polymer beads coated onto the surface. Alternately, the morphology of the surfaces of these materials may be modified, as through manipulation of extrusion conditions, to impart a slippery surface to the film; methods by which surface morphology may be so modified are described in U.S. Pat. No. 5,759,467 (Carter et al.).

Lubricants

Various lubricants may also be used during the processing (e.g., extrusion) of the ILRE or a component thereof such as a film. Suitable lubricants for use in the present invention include calcium stearate, zinc stearate, copper stearate, cobalt stearate, molybdenum neodocanoate, and ruthenium (III) acetylacetonate. In addition, the ILRE or film may undergo subsequent processing steps such as converting, wherein the film may be slit into rolls or finished sheets for a particular use, or the film may be slit or converted into strips, fibers, or flakes such as are used for glitter. Depending on the end-use application, additional coatings or layers as described above may be added either prior to or after a converting operation.

Conductive Coatings

The ILREs and light emitting devices of the present invention may also be provided with one or more conductive layers. Such conductive layers may comprise metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

Barrier Properties

The ILREs and light emitting devices of the present invention may also be provided with one or more barrier films or coatings that alter the transmitting properties of the optical film towards certain liquids or gases. Thus, for example, the devices and ILREs of the present invention may be provided with films or coatings that inhibit the transmission of water vapor, organic solvents, $O_2$, or $CO_2$ through the film. Barrier coatings will be particularly desirable in high humidity environments, where components of the film or device would be subject to distortion due to moisture permeation.

Flame Retardants

The ILREs and light emitting devices of the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

Abrasion Resistance

The ILREs and light emitting devices of the present invention may also be provided with abrasion-resistant or hard coatings, which will frequently be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

Shatter Resistance

The ILREs and light emitting devices of the present invention may also be provided with shatter resistant films and coatings. Films and coatings suitable for this purpose are described, for example, in publications EP 592284 and EP 591055, and are available commercially from 3M Company, St. Paul, Minn.

Anti-Static Additives

Anti-static monomers or inert additives may be added to one or more regions or domains of the ILRE. Reactive and inert anti-static additives are well known and well enumerated in the literature. High temperature quaternary amines or conductive polymers may be used. As an anti-static agent, stearyl alcohol, behenyl alcohol, and other long-chain alkyl alcohols, glyceryl monostearate, pentaerythritol monostearate, and other fatty acid esters of polyhydric alcohols, etc., may be used. In particular embodiments, stearyl alcohol and behenyl alcohol are used.

The ILREs and light emitting devices of the present invention may also be provided with antistatic coatings or films. Such coatings or films include, for example, $V_2O_5$ and salts of sulfonic acid polymers, carbon or other conductive metal layers.

Improved Optical Properties

In one embodiment of this invention, the optical properties of the ILRE are improved over that of an individual film, component, or region within the ILRE. In one embodiment, the percent transmission as measured by ASTM D1003 is improved while substantially maintaining the morphology or shape of the light manipulating features. In a further example, the spherulite crystal size is reduced or eliminated by a secondary thermal process operation such as extrusion casting or insert-molding. In one embodiment, one or more of the components of the film or ILRE is raised above its melting temperature and cooled at a sufficiently fast rate such that the percent haze produced is reduced or the percent transmission is increased. In one embodiment, the haze decreases by at least 2 percent. In a further embodiment, the transmission increases by at least 2 percent as measured according to ASTM D1003.

In one embodiment, the percent transmission of the ILRE is increased by at least 2 percent over that of the individual components due to the loss of two air-component interfaces. In specular systems, the transmission loss in the air-polymer or air-glass interface is about 4%. However in systems with forward and backward light scattering properties, this loss may be less. This also depends on the surface profile of the film or component.

The ILRE of one embodiment of this invention may be used to increase the luminance uniformity or angular light distribution of a light emitting device such as a light fixture, information display, or illuminator.

In one embodiment of this invention, the film or component has protrusions or surface relief with at least one feature size greater than 2 μm along one axis that is effectively indexed matched out in the secondary processing operation forming the ILRE.

In a further embodiment of this invention, the air-polymer or air-component interface is transferred to the air-ILRE interface and the spatial luminance uniformity as used in the system is greater than 70%.

In one embodiment of this invention the light scattering properties of the ILRE are substantially different than that of the individual regions or components evaluated separated or not optically coupled. In another embodiment, the light scattering properties of the light scattering region are modified due to the secondary process forming the ILRE. The secondary process forming the ILRE can alter the size, shape, orientation, refractive index, of the dispersed domains or the spherulite diameter (or number of spherulites) along at least one axis within the optical film. The properties of the process affecting these parameters can include temperature, pressure, shear, polymer flow, rheological properties of the materials, heating rate, cooling rate, interfacial adhesion or tension between the secondary component and the optical film. In one embodiment of this invention, the secondary process reaches a high temperature of substantially the glass transition temperature of at least one of the matrix and dispersed phase domain materials. In a further embodiment of this invention, the secondary process reaches a high temperature of substantially the melt temperature of at least one of the matrix and dispersed phase domain materials.

In one embodiment of this invention, the dispersed domains of the anisotropic optical film are asymmetrically shaped before the secondary process and are more symmetrically shaped after the process. In one embodiment, the domain asymmetry ratio, DAR, is decreased. In a further embodiment, the anisotropic ratio, AR, is decreased. In one embodiment, during the secondary processing of the film, the matrix and domain are above their glass transition temperature and the domains and matrix are at a high enough temperature such that the surface tension pulls the domain shape toward a less asymmetric or toward a spherical domain.

In one embodiment of this invention, the dispersed domains of the anisotropic optical film are symmetrically shaped before the secondary process and are more asymmetrically shaped after the process in one or more regions of the ILRE. In one embodiment, the domain asymmetry ratio, DAR, is increased. In a further embodiment, the anisotropy ratio, AR, is increased. In one embodiment, during the secondary processing of the film, the matrix and domain are above their glass transition temperature and the shear imparted on the domain by the matrix is sufficient to distort the shape of the domain to a more asymmetric or non-spherical domain.

In a further embodiment of this invention, the AR of the ILRE or one or more light scattering regions within the ILRE is at most one of the group consisting of 80%, 50%, 10%, or 5% of the value of the film before the secondary processing. In another embodiment, a substantially symmetric forward light scattering ILRE is formed from the secondary processing of a film with substantially asymmetric forward light scattering properties. In a further embodiment, the AR ratio is decreased and the light transmission is increased. In another embodiment of this invention, average dimension along one axis of the dispersed phase domain increases. In a further embodiment of this invention, average dimension of the dispersed phase domain along one axis in the plane of the film increases such that it is greater than 1.5 µm. In a further embodiment of this invention, the AR of the ILRE is at least one of the group consisting of 110%, 200%, 500%, or 1000% of the value of the film before the secondary processing. In another embodiment, a substantially symmetric forward light scattering ILRE is formed from the secondary processing of a film with substantially asymmetric forward light scattering properties.

In one embodiment of this invention, the ILRE comprises asymmetric dispersed phase domains aligned in substantially radial directions from a central region. In one embodiment of this invention, a region comprising domains of a light transmitting material is exposed to radial shear forces from an injection molding apparatus such that the domains are elongated and/or aligned in a radial direction from a central region. In a further embodiment of this invention, a light emitting device comprises a ILRE comprising light scattering domains aligned in a radial direction within a plane of the ILRE such that the illuminance from the device at a first distance, k, at 0 degrees from the optical axis of the light illuminating the ILRE is less than the illuminance at 5 degrees, 10 degrees, 20 degrees or 30 degrees along a first output plane. Typically, optical elements comprising light scattering features have optical output profiles wherein the illuminance falls off gradually from 0 degrees to the optical axis of light incident on the optical element. By using an ILRE with domains aligned in a radial direction in a plane of the ILRE, a significant portion of incident light at an angle near the optical axis is scattered to angles further from the optical axis, causing the illuminance to be less near zero degrees to the optical axis of the light incident on the ILRE. In a further embodiment of this invention, a ILRE comprises light scattering domains aligned in a radial direction within a plane of the ILRE wherein the ILRE is substantially circular in shape such as a disc. In a further embodiment of this invention, an ILRE comprises light scattering domains aligned in a radial direction within the light output surface. In another embodiment of this invention, an ILRE comprises light scattering domains aligned in a radial direction within a curved or hemispherical light output surface.

In one embodiment of this invention an enhanced ILRE is formed by the combination of the optical properties of the film and the optical properties of the materials and design used in the secondary processing. The resulting ILRE may have improved optical properties over the optical film. In one embodiment of this invention the optical film has at least one light manipulating property from the group consisting of symmetric or asymmetric light scattering, refracting, reflecting or other properties described herein and the secondary process adds a second light manipulating property through the process, design, and materials used in the secondary process.

In one embodiment of this invention, the ILRE provides one or more of the following optical functions: absorptive polarizer, reflective polarizer, scattering polarizer, substantially symmetrically scattering diffuser, anisotropically scattering diffuser, forward scattering diffuser, backward scattering diffuser, collimating element, light redirecting element, refracting element, spatial light homogenizer, increased axial luminance, increased spatial luminance uniformity along at least one axis, reduced speckle from coherent sources, non-depolarizing transmission, non-depolarizing reflection, increased angular luminance uniformity, increased forward specular transmission.

Improved Mechanical Properties

The ILRE of this invention has improved rigidity along at least one axis. In one embodiment, the anisotropic light scattering region has a flexural modulus along a first in-plane axis FM1 and a flexural modulus along a second axis orthogonal to the first FM2 such that FM1>FM2. In a further embodiment, FM1>(2×FM2) or FM1>(4×FM2) or FM1>(10×FM2). In some applications it is desirable to have a flexural modulus greater along one axis than the other. Such applications include curved lenses for light fixtures, circular lenses, light tubes and applications requiring non-planar light manipulating surfaces. The mechanical properties of the ILRE may be anisotropic along with the light scattering properties. Typically, it is difficult to achieve uniform anisotropic light scattering properties in thick extrusion or thick injection molding applications. By optically coupling the anisotropic region to a substantially thicker non-scattering region, the optical properties can be maintained or improved while also increasing the average flexural modulus along one axis or two orthogonal axes. In one embodiment, the asymmetry of the flexural modulus can be maintained by using a thick material with a low flexural modulus material such that FM1>FM2. In a further embodiment, the flexural modulus of the ILRE is higher than a similar thickness non-ILRE material. In one embodiment, a ILRE of a thickness d3 is formed by optically coupling two anisotropic light scattering films of thickness d4 and d5 to opposite sides of a substantially non-scattering region of a first material of thickness d6 such that the flexural modulus FM3 of the ILRE has a higher flexural modulus than a sheet of the non-scattering region of the first material of thickness d7 wherein d7=d3. In one embodiment, the substantially non-scattering material is an ILRE comprising of two materials wherein the refractive index is substantially matched with the resulting ILRE having a high flexural modulus. In one embodiment, the non-scattering material is a blend of a polycarbonate, a PCCD and a glass fiber material such that the refractive index of the miscible blend of the PC-PCCD substantially matches the refractive index of the glass fiber. Other combinations of materials and compositions with improved mechanical properties and optical properties including PCCD based materials are disclosed in U.S. Pat. No. 7,119,140 and US Patent App. Publication No. 20060287429, the entirety of each are incorporated herein by reference. These materials have a high flexural modulus and can be optical coupled through insert molding, extrusion lamination or other methods to one or more anisotropic light scattering regions to provide an ILRE with improved flexural modulus and optical properties such as spatial luminance uniformity.

In one embodiment of this invention, the ILRE provides increased toughness relative to that of a non-ILRE formed from the material of the substantially non-scattering region. In one embodiment, two anisotropic light scattering films with polycarbonate continuous phases are extrusion laminated to a polystyrene sheet to provide improved toughness over that of a polystyrene sheet of similar thickness.

In another embodiment of this invention, the strength of the bond between the light scattering region and the substantially non-scattering region is increased through the use of compatibilizers, adhesion promoters, tie-layers, corona treatments, or other materials or processes commonly used to increase the bond strength between two materials.

In a further embodiment of this invention, the anisotropic light scattering region is formed in a material capable of being bonded to glass. In one embodiment of this invention, the light scattering region is in a PVB material and is optically bonded to at least one glass layer. In one embodiment, the anisotropic light scattering region can be formed in an extrusion coating process onto the glass or an extrusion lamination process.

Improved Thermal Properties

In one embodiment of this invention, the ILRE comprises an anisotropic light scattering region with a continuous phase material of heat deflection temperature, HDT1, and a substantially non-scattering region of heat deflection temperature, HDT2, such that the heat deflection temperature of the ILRE, HDT3, is greater than HDT1. In a further embodiment of this invention, HDT3>(1.1×HDT1) or HDT3>(1.2×HDT1) or HDT3>(1.5×HDT1).

In one embodiment of this invention, the ILRE comprises an anisotropic light scattering region with a continuous phase material of glass transition temperature $T_{g1}$ and a substantially non-scattering region of glass transition temperature $T_{g2}$ such that the glass transition temperature of the ILRE $T_{g3}$ is greater than $T_{g1}$. In a further embodiment of this invention, $T_{g3}>(1.1\times T_{g1})$ or $T_{g3}>(1.2\times T_{g1})$ or $T_{g3}>(1.5\times T_{g1})$.

In one embodiment of this invention, a ILRE comprises an anisotropic light scattering region and a substantially non-scattering region with improved thermal insulation or conduction properties.

In one embodiment of this invention, an ILRE with improved optical and thermal properties comprises an anisotropic light scattering region optically coupled to a thicker substantially non-scattering region wherein the dispersed domains within the anisotropic light scattering region provide increased thermal conduction or insulation along one or more axes while the continuous phase material is optically coupled to the non-scattering region. This optical coupling may include bonding by insert molding, extrusion lamination, thermal bonding or adhesive lamination.

One or more of the dispersed phase or the matrix may be thermally insulating such that the thermal resistance of the combination is greater than that of the matrix material alone. The thermal properties may be anisotropic such that thermal insulation or conduction is higher along one axis relative to an orthogonal axis. The dispersed phase material may be a material with high thermal conduction properties such that the oriented light scattering region also preferentially conducts heat along one direction of the ILRE. In one embodiment of this invention, the heat is preferentially conducted along an axis substantially normal to the surface of the light scattering region.

The dispersed domains may include materials with high thermal resistance and sufficient optical properties to provide predetermined optical scattering properties.

The dispersed domains may provide optical scattering of electromagnetic radiation outside of the visible spectrum. In one embodiment, the ILRE anisotropically scatters infrared light while conducting the heat along one or more axis of the ILRE. The ILRE may also scatter ultra-violet radiation.

The dispersed phase domains may contain dies or other materials that are birefringent or that anisotropically absorb light of one polarization state. These materials are commonly used in dye-type, dichroic and other polarizers and are known in the field.

In one embodiment, the light scattering region is coupled to a glass substrate. This could be coupled through lamination, autoclave, or other techniques such as used to incorporate laminates to glass substrates. In one embodiment, the asymmetrically shaped domains increase the flexural modulus such that an ILRE comprising glass materials has a combined higher modulus or improved shatter-resistant properties due to the preferential absorption of compression waves along one or more axis. In a further embodiment, the matrix material is a PVB.

The matrix material may also be an adhesive to promote further bonding of another component or material. Examples of light scattering properties, materials, and adhesives are included in U.S. Pat. No. 6,727,313, the contents of which are included by reference herein.

In one embodiment of this invention, the dispersed domains anisotropically conduct electricity along one or more axes. In one embodiment of this invention, the ILRE can be combined with one or more of the group consisting of electrical connectors, light sources, driver electronics, conductors and other electrical components used in an electronic device, display or light emitting device.

Improved Physical Properties

In one embodiment of this invention, the dispersed phase component has a substantially lower density than the matrix or the light transmitting material. The combination of the optical properties and the reduced weight can provide an enhanced ILRE.

In one embodiment, the dispersed domains are voids comprising of a gas or air such that the ILRE has a weight less than that of an ILRE comprising of substantially the same volume of the light transmitting material.

In one embodiment, the rigidity and impact resistance of the ILRE is increased relative to that of an ILRE comprising of substantially the same volume of the light transmitting material. In a further embodiment, at least one of the flexural modulus, environmental stability, UV absorption, tensile strength, or scratch resistance of the ILRE is increased relative to that of a component comprising substantially the same volume of one of the light transmitting materials.

One or more of the optical, physical, thermal, mechanical and other properties disclosed herein may be combined to provide an enhanced ILRE.

In one embodiment of this invention, the light transmitting material is a support-structure of molten plastic that can be injection-molded, or extrusion-cast through a die onto a plastic in-volume diffusion film. In one embodiment, the temperature of the molten plastic is well above the resin's melting point during this process, allowing the resin to flow smoothly over the face of the plastic film, before solidifying into the desired shape. Pressure is applied by either a molding ram (injection equipment) or a nip-roll (with continuous extrusion-casting of a sheet) to promote bonding of the materials. In another embodiment, to ensure adhesion of the resin and the diffusion film, the film surface in contact with the resin forms a chemical or mechanical bond.

In one embodiment, during the molding/casting process, the diffusion film exceeds its glass-transition temperature as the molten resin is forced against it, and conforms to the metal mold (or casting nip-roll) on the opposite side. This process could damage or destroy any film surface features that existed on the film previously. In another embodiment, the in-volume microlenses, dispersed domains (including dispersed phase domains) in the diffusion film survive high-temperature processing with little or no change in shape, despite the softening—and subsequent re-hardening of the polymer matrix material or light transmitting material.

In one embodiment of this invention, one or more of the aforementioned functionalities or properties of an optical component is improved in a secondary process including at least one of the steps of extrusion, co-extrusion, casting, extrusion casting, molding, injection molding, rotation molding; insert molding, in-mold labeling, in-mold decoration, thermoforming, coating.

In another embodiment of this invention, an ILRE is created wherein the property or functionality is improved relative to the original component. In one embodiment, the property is improved relative to the sum of the individual properties of the ILRE.

Method of Manufacturing the ILRE

The optical regions of the ILRE of this invention can include plates, sheets, coatings, and films of a variety of thicknesses; these structures may be manufactured using means such as film casting, sheet casting, profile extrusion, blown film extrusion, co-extrusion, injection molding, etc in accordance with embodiments of this invention. The ILRE may be used as an individual element or it may be combined with other materials or effects to provide an enhanced ILRE or backlight or display. The ILRE can be combined with other elements or contain features that improve the optical performance in terms of diffuse or specular transmission or reflection, gain, haze, clarity, backscatter, angular modification of the exiting light profile (reflecting or transmitting) in one or more directions, angular modification of the exiting (reflecting or transmitting) profile for at least one polarization state in one or more directions, percent of polarization preserved, and spectral transmission or absorption properties.

There are a number of different mechanisms for producing asymmetric diffusion profiles in the volume of the region. These include creating asymmetric region by aligning domains through stretching a material or stretching a material to cause domains to become symmetric in shape. Other methods of alignment such as extrusion and other methods known in the industry can be used. Examples of methods suitable for creating anisotropic light scattering regions include stretching dispersed phase particles by stretching as in U.S. Pat. Nos. 5,932,342 and 5,867,316 and surface relief anisotropic scattering regions including holographic and other techniques such as those described in U.S. patent application Ser. Nos. 11/337,837 (publication number 20060181903), 11/125,913 (publication number 20060255486), 11/125,581 (publication number 20060257679), 10/443,204 (publication number 20040234724) and U.S. Pat. Nos. 6,991,358, 6,862,141 and 6,347,873, and anisotropic adhesives as in U.S. Pat. No. 6,727,313 and materials that scatter differently based on the angle of incidence as in Lumisty film produced by Sumitomo Chemical Co. and U.S. Pat. No. 6,424,395 (a distinctly different form of optical anisotropy than the types of optical anisotropic diffusion regions mentioned in U.S. Pat. Nos. 5,867,316 and 5,932,342 whose diffusion angles can have highly asymmetric cross-sectional diffusion profiles but whose profiles remain substantially constant centered about a the incident diffusion profile substantially independent of the illumination angle), the contents of these patents and applications are incorporated by reference.

In another embodiment of this invention, a surface relief or grating structure that asymmetrically scatters or diffracts incident light is created on one or more surfaces of a ILRE through film casting, sheet casting, profile extrusion, blown film extrusion, co-extrusion, injection molding. In one embodiment, the refractive index of the non-scattering light transmitting region of an ILRE is substantially isotropic. In one embodiment, the ILRE comprises a diffraction grating embossed into an anisotropic mono-axially stretched PET such that the diffractive properties of the grating are polarization state dependent. In a further embodiment, the PET comprises at least one asymmetrically shaped light scattering material in a matrix of material. In a further embodiment, PEN is used for its higher birefringence than PET. In one embodiment, light of a wavelength of 550 nm which is s-polarized along the x axis that is incident to the grating at an angle selected from the range of 50 to 80 degrees from the normal is diffracted to an angle with a peak within the range of $-45°$ to $+45°$ of the normal to the grating. In a further embodiment, the light is diffracted to an angle with a peak within the range selected from the group of $-30°$ to $+30°$, $-20°$ to $+20°$, $-10°$ to $+10°$, $-5°$ to $+5°$.

The ILRE can incorporate additional features or materials to provide additional optical qualities. Examples of features include an embossment on one or more surfaces of the substrate or diffuser with a regular, random, semi-random surface feature. This surface feature can be a diffractive, holographic, prismatic, microlens or other structure, as described above. Additives can be used within the material to improve a number of performance requirements, including optical, mechanical, thermal, and environmental resistance.

In one embodiment of this invention, a method of manufacturing an article comprises providing a mold for injection molding, providing a light source comprising a light emitting diode with a first light emitting source surface, providing an ILRE comprising a first volumetric anisotropic light scattering diffuser film comprising a first light scattering region comprising asymmetrically shaped domains and a light diffracting region, placing the light source in a first predetermined location and first angular orientation in the mold, placing the ILRE a in a second predetermined location and second angular orientation in the mold, injecting a light transmitting thermoplastic material or light transmitting liquid polymer precursor material into the mold such that the light transmitting material is optically coupled to the ILRE. In one embodiment of this invention, the article is an ILRE. In a further embodiment, the ILRE is a component of an illuminating device such as a light fixture or backlight for a liquid crystal display.

In one embodiment of this invention the method of manufacturing an article comprises placing a second volumetric anisotropic light scattering diffuser film comprising asymmetrically shaped domains in a third predetermined location and third angular orientation in the mold before injecting material into the mold.

In a further embodiment of this invention, the mold further comprises a light collimating feature disposed to reduce the angular extent of the light incident on the light redirecting features within the light transmitting material within a plane perpendicular to the first output surface and parallel to the optical axis.

In a further embodiment of this invention, the method of manufacturing an article further comprises positioning the light source such that the light transmitting material is optically coupled to the output surface of the light source. In one embodiment of this invention, the mold comprises a patterned surface with light extracting surface features or light diffracting features disposed thereon.

In one embodiment of this invention, the method of manufacturing an article further comprises orienting the anisotropic light scattering diffuser film comprising asymmetric domains such that the asymmetric domains are aligned with their longer dimension substantially parallel to the first optical axis of the first light source.

In a further embodiment, the light source comprises an array of light emitting diodes with a first light source array axis. In one embodiment of this invention, the anisotropic diffuser film is oriented in the mold with its asymmetric domains substantially aligned with light source array axis.

In a further embodiment of this invention, a method of manufacturing a ILRE comprises aligning the light source such that its optical axis is substantially parallel to the first light output surface and the volumetric anisotropic light scattering film is oriented in the mold with the asymmetric domains aligned with their longer dimension substantially parallel to the first optical axis of the first light source wherein the mold comprises the inverted profile of the desired light diffracting elements or the volumetric light scattering film comprises light diffracting regions on at least one surface.

In one embodiment of this invention, the light source is positioned such that the optical axis passes through a non-scattering region of the volumetric anisotropic light scattering diffuser film. In a further embodiment of this invention, the anisotropic light scattering diffuser film comprises a second light scattering region separated from the first light scattering region by a substantially non-scattering region.

In one embodiment of this invention, the ILRE includes more than one light scattering region that is co-extruded or co-laminated or extrusion laminated on one or more sides of a component, light scattering film or region or light transmitting region. In a further embodiment of this invention, a method of manufacturing an ILRE comprises extruding the first light transmitting material onto a substrate or carrier film. A substrate as used herein includes light transmitting materials, light scattering materials and other layers or regions suitable for coating, extruding, laminating onto. A carrier film includes substrates wherein the coating, material, layer or article is combined with the carrier film and the carrier film may be removed.

In another embodiment of this invention, a surface relief structure that asymmetrically scatters incident light is created on one or more surfaces of a ILRE through film casting, sheet casting, profile extrusion, blown film extrusion, co-extrusion, injection molding. In one embodiment, the refractive index of the non-scattering region is substantially isotropic.

The ILRE can incorporate additional features or materials to provide additional optical qualities. Examples of features include an embossment on one or more surfaces of the substrate or diffuser with a regular, random, semi-random surface feature. This surface feature can be a diffractive, holographic, prismatic, microlens, kinoform, or other structure, as described above. Additives can be used within the material to improve a number of performance requirements, including optical, mechanical, thermal, and environmental resistance.

Extrusion-casting one or more light transmitting materials can produce a sheet laminate in a continuous process. This laminate can be thermoformed into non-flat shapes in a later process.

In one embodiment of this invention, the dispersed domains in the volume of the light scattering region of the ILRE are not damaged or deformed during high-temperature and high-pressure processing such as the addition of plastic resin structure by injection-molding or extrusion-casting. In one embodiment, the domains hold their shape during processing due to the matrix material of the light diffusing film holding its shape. In another embodiment of this invention, the domains hold their shape during processing due to their high melt temperature. In one embodiment of this invention, the melt temperature of the dispersed domain is less than the temperature of the light transmitting material used in the injection molding or extrusion process and the melting temperature of the matrix material of the light diffusing film is higher than the temperature used in the injection molding or extrusion process. In another embodiment of this invention, the glass transition temperature of the dispersed domain is less than the temperature of the light transmitting material used in the injection molding or extrusion process and the glass transition temperature of the matrix material of the light diffusing film is higher than the temperature used in the injection molding or extrusion process. In a further embodiment of this invention, the Vicat softening temperature of the dispersed domain is less than the temperature of the light transmitting material used in the injection molding or extrusion process and the Vicat softening temperature of the matrix material of the light diffusing film is higher than the temperature used in the injection molding or extrusion process. As used herein, the Vicat softening temperature refers to the ASTM D1525 (50 Newton) Vicat softening temperature.

In one embodiment of this invention, the diffusion film is wrapped around the corners of the molded structure. In a further embodiment of this invention, a method for manufacturing an ILRE comprises injection molding or extruding a light transmitting material such that it wraps around or encapsulates a light diffusing film, a light redirecting film, a light diffracting film, or ILRE of one embodiment of this invention.

The ILRE used in the light fixture or backlight of one embodiment of this invention may be manufactured by extrusion or casting techniques and may be embossed, stamped, or compression molded or otherwise processed wherein a light transmitting material within the ILRE comprises asymmetric particles substantially aligned in one direction. The ILRE, diffuser film, plate, or lens may be used with one or more light sources, reflectors, collimating films or symmetric or asymmetric scattering films to produce a light fixture. Embodiments of the invention fabricated as film or ILRE can be laminated or otherwise attached to plates, reflectors, or primary or secondary lens components used in light fixtures and solid state light fixtures. In this manner an article of one embodiment of this invention can be converted into a transmitting plate, reflector, or molded lens component.

One embodiment of this invention is an ILRE formed by a secondary process creating at least one additional light manipulating property such as the addition of light redirecting surface relief features.

In one embodiment of this invention, an ILRE comprises an anisotropic light scattering component on one side of a thicker, substantially non-scattering region with at least one additional light scattering region optically coupled to the non-scattering region. In a further embodiment, the ILRE comprises two anisotropic light scattering films are optically coupled to a thicker substantially non-scattering region. This can be achieved by insert molding two films or extrusion laminating on a sheet with two film feeds. In a further embodiment, a light scattering component comprising a polycarbonate continuous phase region is optically coupled to polystyrene region by extrusion laminating to the polystyrene sheet during the extrusion process. An adhesive promoter or adhesive such as a compatibilizer may be used. In this example, the refractive indexes of the polycarbonate and polystyrene are substantially indexed matched along a first axis. In this example, the ILRE has an increased shatter resistance or impact strength over the polystyrene due to the polycarbonate matrix film bonded to the polystyrene. In a further embodiment, an ILRE comprises two anisotropic light scattering films insert-molded on opposite sides of a PMMA region. In one embodiment of this invention, an ILRE has an impact resistance greater than that of a similar volume, size, and shape article comprising substantially only one of the individual materials from which the ILRE is comprised. In one embodiment of this invention, a ILRE has an impact resistance (Izod Notched) of greater than 6 J/cm, greater than 8 J/cm, or greater than 10 J/cm.

In one embodiment of this invention, a method of making an ILRE comprises extruding a first light transmitting material as an embossed film. This first light transmitting material may be a low refractive index material such as the fluoropolymer FEP. The surface relief features are embossed or otherwise formed in the surface of the first light transmitting material and may be in the form of an array, random arrangement, or semi-random arrangement. In one embodiment the features are a linear array oriented such that the features are oriented parallel to the machine direction in a film extrusion process. In another embodiment the features are a linear array oriented such that the features are oriented perpendicular to the machine direction in a film extrusion process. In another embodiment the features are a two-dimensional array of curved features. In a further embodiment, the surface relief features are inverted light collimating features.

In one embodiment of this invention, a method of making an ILRE comprises extruding a first light transmitting material as an embossed film wherein both surfaces are embossed during the extrusion of the first light transmitting material into a first film. In a further embodiment of this invention, a method of making an ILRE comprises co-extruding a first light transmitting material and a second light transmitting material into a film wherein both surfaces are embossed during the extrusion process, such as when they are at a temperature above their Vicat softening temperature.

In one embodiment of this invention, a method of making an ILRE comprises extruding a first light transmitting material as an embossed film and subsequently feeding this film into a second extrusion process wherein a second light transmitting material is extruded onto, embossed, and bonded to the first light transmitting material.

Injection Molding Process

Methods, techniques, and materials suitable for injection molding of optical films or components are known in the art and include those referenced in U.S. Pat. No. 7,270,465 by Keh et al, U.S. Pat. No. 6,490,093 by Guest, and US Patent Application Publication No. US20070110948, the entire contents of each are incorporated herein by reference.

In one embodiment of this invention, an ILRE comprises a first diffuser surface in optical contact with the light transmitting material wherein the first diffuser surface substantially comprises a first diffuser film material with a melt temperature $T_{m1}$ and the light transmitting material has a second melt temperature $T_{m2}$ such that $T_{m1}-T_{m2}>20$ degrees Celsius. In another embodiment of this invention, $T_{m1}-T_{m2}$ is greater than 40 degrees Celsius. In a further embodiment, $T_{m1}-T_{m2}$ is greater than 60 degrees Celsius.

In one embodiment of this invention, the method of manufacturing the ILRE is a 2-shot injection molding process. In one embodiment, a first light transmitting material of a melt temperature $T_{m3}$ is injection molded into a mold comprising the light source. In a further embodiment, a surface of the mold is removed and a second light transmitting material of a melt temperature $T_{m4}$ is injected into the mold such that the first light transmitting material is optically coupled to the second light transmitting material and $Tm3-T_{m4}$ is greater than 20 degrees Celsius. In a further embodiment of this invention, $T_{m3}-T_{m4}$ is greater than 40 degrees Celsius. In another embodiment, $T_{m3}-T_{m4}$ is greater than 60 degrees Celsius. In one embodiment of this invention, the light transmitting material comprising at least one of light redirection features, light diffracting features, or a light diffusing film is protected from thermal damage during operation of the light emitting device by a thermal buffer material of a second light transmitting material with a higher melt temperature that is optically coupled and bonded to the first light transmitting material. In one embodiment, a high temperature material such as a polycarbonate or fluoropolymer can be injection molded and optically coupled to the LED light emitting surface and material with a lower injection molding temperature such as PMMA can be used to generate the light redirecting features or optically couple to the light diffusing film such that the film does not melt nor need to be made of a high temperature material. In one embodiment, a first light transmitting polymer material is injection molded onto the light source to optically couple the light from the light source and to spread the heat during operation of the device from the light source into a larger surface area before making contact with a second light transmitting material. In this manner the heat is spread into a larger area and the material used for the second light transmitting material can have a melt temperature, glass transition temperature or Vicat softening temperature less than were it optically coupled direct to the light source (such as an LED or it's encapsulant). In one embodiment, optically coupling a first light transmitting material to the light source emitting surface transmits more light than having an air gap in-between since there is not a material-air interface upon which light will reflect.

Mold or Tool

A vacuum plate can be incorporated into the mold to securely hold the diffusion film during the insert-molding process. This ensures a flat surface or conformal surface for the incoming molten resin, and prevents the film from distorting or tearing during the injection molding processing. Also, the vacuum plate provides some cooling to the adjacent film surface, to moderate the temperature rise during molding. This minimizes the risk—and subsequent yield loss—from diffusion film distortion in the lamination. In one embodiment, the back surface of the film is actively or passively cooled to reduce thermal degradation upon contact with the molten polymer. In one embodiment, at least one of a thermal transfer device such as a heat sink, heat pipe, fan, thermoelectric cooler, or Synjet module (Nuventix Inc.), circulation or open loop liquid cooling is used to lower the temperature of the film to below that of either room temperature, 20° F. below room temperature, or more than 30° F. below room temperature. In a further embodiment, the thermal transfer device is injection molded onto the ILRE or optical component comprising an ILRE such that it can be used in the application to dissipate heat.

The mold surface that contacts the diffusion film during processing can have physical features which will be transferred to the film surface during molding such as a prism structure to collimate light or a light diffracting grating to redirect light.

The mold may contain light redirecting features that may be concave, convex, prismatic or other structure that when the inverse is formed into a light transmitting material, the light incident to the structure from a pre-determined angular range is collimated, extracted from the lightguide, diffused or scattered from the waveguid, etc.

Extrusion Process

In one embodiment of this invention, a method of manufacturing an article comprises: a) providing a first light transmitting material of refractive index $n_{L1x}$ in a first axis x; b) extruding the first light transmitting material into a first film comprising a first surface and a second surface; c) embossing the first surface of the first film to achieve a first plurality of light diffracting structures on the first surface; d) extruding a second light transmitting material of refractive index $n_{H2x}$ in the first axis x onto the first surface of the first film forming a substantially planar third surface; e) extruding a third light transmitting material of refractive index $n_{H3x}$ in the first axis x onto the second surface of the first film; f) embossing the third light transmitting material to achieve a fourth surface comprising a plurality of light collimating surface features.

In one embodiment of this invention, the method of manufacturing a ILRE comprises thermally embossing one or more surfaces of the ILRE, an intermediate film or layer or light transmitting material.

In one embodiment of this invention, the method of manufacturing an ILRE comprises extrusion wherein $n_{H2x}>1.56$ and $n_{L1x}<1.47$. In one embodiment of this invention, the high refractive index of the second light transmitting material and the low refractive index of the first light transmitting material form a light diffracting region, or surface relief feature.

In one embodiment of this invention, the method of manufacturing an ILRE comprises extruding the second light transmitting material and the third light transmitting material substantially at the same time. In one embodiment, the second and third materials are co-extruded on the same manufacturing line such that the heated polymers are extruded onto the first film and optically coupled to the first film or embossed before they cool to room temperature. In another embodiment of this invention, the method of manufacturing an ILRE comprises extruding the second light transmitting material wherein the third light transmitting material and the second light transmitting material are substantially the same material.

In a further embodiment of this invention, the optical coupling and embossing of the third light transmitting material occur substantially at the same time. In a further embodiment of this invention, the optical coupling and embossing of the third light transmitting material occur in substantially same region of a manufacturing line. For example, the third light transmitted material may be a thermoplastic material extruded from a die onto the first light transmitting material, onto an embossing roll, or onto both wherein the embossing roll forms surface features while pressing the thermoplastic material onto the first light transmitting material before the thermoplastic has cooled to its Vicat softening temperature or melt temperature.

In one embodiment of this invention, the method of manufacturing an ILRE comprises UV embossing, vacuum forming, stamping, bulk casting, machining or thermally embossing a light transmitting material as disclosed in U.S. Pat. Nos. 5,056,892; 4,906,070; 5,183,597; 6,096,247; 6,808,658; 6,445,504; 5,126,882; 6,110,401; 7,092,163; 6,585,920, 6,469,830; 6,896,755 or U.S. Patent Application Publication Nos. 20060204720; 20070275215; 20060142448; or 20020154406; the contents of each are incorporated by reference herein.

Other methods suitable for embossing or otherwise forming surface relief structures are known in the field of optical film production including stamping and holographic or diffractive structures and may be used in accordance with an embodiment of this invention In one embodiment of this invention, the method of manufacturing an ILRE comprises embossing the first surface of the first light transmitting material using a radiation cured embossing process wherein the first light transmitting material is a radiation curable polymer.

In one embodiment of this invention, the method of manufacturing an ILRE comprises embossing the second light transmitting material using a radiation cured embossing process wherein the second light transmitting material is a radiation curable polymer. In one embodiment of this invention, the method of manufacturing an ILRE comprises extruding the second light transmitting material and curing the material when it is in contact with a substantially smooth roll or surface wherein the second light transmitting material is a radiation curable polymer.

In one embodiment of this invention, the method of manufacturing an ILRE comprises embossing the third light transmitting material using a radiation cured embossing process wherein the third light transmitting material is a radiation curable polymer.

In one embodiment of this invention, the method of manufacturing an ILRE comprises embossing the first surface wherein the first light transmitting material is extruded onto a substrate or carrier film.

In another embodiment of this invention, the method of manufacturing an ILRE comprises embossing the first surface wherein the first light transmitting material further comprises a first plurality of dispersed domains of a light transmitting material of refractive index $n_{H4x}$.

In one embodiment of this invention, the method of manufacturing an ILRE comprises extruding the first light transmitting material wherein the extrusion elongates the plurality of first dispersed domains along a first elongation direction.

In another embodiment of this invention, the method of manufacturing an ILRE comprises embossing a surface with inverted light collimating surface features wherein the inverted light collimating surface features comprise an array of grooves within the first light transmitting material and the light collimating surface features comprise an array of protruding prisms of the third light transmitting material oriented substantially orthogonal to the array of grooves.

In another embodiment of this invention, the method of manufacturing an ILRE comprises a) manufacturing a light transmitting film with light diffracting surface features in a first light transmitting material; b) coupling optically a second light transmitting material to the light diffracting surface features; and c) coupling optically and embossing a third light transmitting material onto the light transmitting film.

In another embodiment of this invention, the method of manufacturing an ILRE comprises coupling optically and embossing the third light transmitting material on the same processing or manufacturing line.

In another embodiment of this invention, the method of manufacturing an ILRE comprises extruding, coating, or laminating a first light transmitting material and extruding, coating, or applying a third light transmitting to the first light transmitting material wherein the refractive index of the first light transmitting material is less than 1.47 and the refractive index of the third light transmitting material is greater than 1.56 in a first axis x.

Skin Layers

A non-optical layer of material may be coextensively disposed on one or both major surfaces of the ILRE or a component, layer or film thereof. The composition of the layer, also called a skin layer, may be chosen, for example, to protect the integrity of the optical layers, to add mechanical or physical properties to the final film or to add optical functionality to the final film. Suitable materials of choice may include the material of one or more of the optical layers. Other materials with a melt viscosity similar to the extruded optical layers may also be useful. It should also be noted that many of the mechanical advantages derived from skin layers can also be derived from an analogous internal thick non-optical layer.

A skin layer or layers may reduce the wide range of shear intensities the extruded multilayer stack might experience within the extrusion process, particularly at the die. A high shear environment may cause undesirable deformations in the optical layers. A skin layer or layers may also add physical strength to the resulting ILRE or reduce problems during processing, such as, for example, reducing the tendency for the film to split during the orientation process Skin layer materials that remain amorphous can result in films having a higher toughness, while skin layer materials that are semicrystalline can result in films having a higher tensile modulus. Other functional components such as antistatic additives, UV absorbers, dyes, antioxidants, and pigments, may be added to the skin layer, provided they do not substantially interfere with the desired optical properties of the resulting product Skin layers or coating may also be used to aid in post-extrusion processing; for example, by preventing sticking of the film to hot rollers or tenter clips.

Skin layers or coatings may also be added to impart desired barrier properties to the resulting film or device. Thus, for example, barrier films or coatings may be added as skin layers, or as a component in skin layers, to alter the transmitting properties of the film or device towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film. Such a skin layer, however, should not unduly compromise the optical properties required for the application to which the film is directed.

Skin layers or coatings may also be added to impart or improve puncture and/or tear resistance in the resulting article. Thus, for example, in embodiments in which the outer layer of the optical film comprises coPEN, a skin layer of monolithic coPEN may be coextruded with the optical layers to impart good tear resistance to the resulting film. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the optical film. Adhering these layers to the optical film during the manufacturing process, such as by a coextrusion process, provides the advantage that the optical film is protected during the manufacturing process. In some embodiments, one or more puncture or tear resistant layers may be provided within the optical film, either alone or in combination with a puncture or tear resistant skin layer.

The skin layers may be applied to one or two sides of the extruded ILRE at some point during the extrusion process, i.e., before the extruded and skin layer(s) exit the extrusion die. This may be accomplished using conventional coextrusion technology, which may include using a three-layer coextrusion die. Lamination of skin layer(s) to a previously formed film or ILRE is also possible. Total skin layer thicknesses may range from about 2% to about 50% of the total optical stack/skin layer thickness.

In some applications, additional layers may be coextruded or adhered on the outside of the skin layers during manufacture of the ILRE. Such additional layers may also be extruded or coated onto the optical film in a separate coating operation, or may be laminated to the optical film as a separate film, foil, or rigid or semi-rigid substrate such as polyester (PET), acrylic (PMMA), polycarbonate, metal, or glass.

Many light transmitting materials such as polymers are suitable for skin layers. Of the predominantly amorphous polymers, suitable examples include copolyesters based on one or more of terephthalic acid, 2,6-naphthalene dicarboxylic acid, isophthalic acid phthalic acid, or their alkyl ester counterparts, and alkylene diols, such as ethylene glycol. Examples of semicrystalline polymers suitable for use in skin layers include 2,6-polyethylene naphthalate, polyethylene terephthalate, and nylon materials Skin layers that may be used to increase the toughness of the optical film include high elongation polyesters such as ECDEL™ and PCTG 5445 (available commercially from Eastman Chemical Co., Rochester, N.Y.) and polycarbonates. Polyolefins, such as polypropylene and polyethylene, may also be used for this purpose, especially if they are made to adhere to the optical film with a compatibilizer.

In one embodiment of this invention, an ILRE or layer or film used in the production thereof comprises skin layers Skin layers can be added to the ILRE to protect layers comprising dispersed domains or other optical layers from the effects of wall stress and possible resulting flow instabilities. Other reasons for adding a thick layer at the surface(s) of the film include, e.g., surface properties such as adhesion, coatability, release, coefficient of friction, and barrier properties, weatherability, scratch and abrasion resistance, and others. In multilayer films that are subsequently uniaxially or very unequally biaxially drawn, "splittiness," (i.e., the tendency to tear or fail easily along the more highly drawn direction), can be substantially suppressed by choosing a skin layer polymer that (1) adheres well to the sub-skin or nearest optical layer polymer and (2) is less prone to orientation upon draw. An example of a useful skin layer, where the optical stack comprises a PEN homopolyer, is a copolymer of PEN having a comonomer content sufficient to suppress crystallinity and/or crystalline orientation. Marked suppression of splittiness is observed in such a structure, compared to a similar film without the coPEN skin layer(s), when the films are highly drawn in one planar direction and undrawn or only slightly drawn in the orthogonal planar direction. One skilled in the art will be able to select similar skin layer polymers such as PET homopolymers to complement other optical layer polymers and/or sub-skin polymers.

Temperature control is important in the feedblock and subsequent flow leading to casting at the die lip. While temperature uniformity is often desired, in some cases, deliberate temperature gradients in the feedblock or temperature differences of up to about 40° C. in the feed streams can be used to narrow or widen the stack layer thickness distribution. Feed streams into the PBL or skin blocks can also be set at different temperatures than the feedblock average temperature. Often, the PBL or skin streams are about 40° C. higher than the feed stream temperature to reduce viscosity or elasticity in the protective streams and thus enhance their effectiveness as protective layers. Sometimes, the protective streams' temperature can be decreased up to about 40° C. to improve the rheology matching between them and the rest of the flow stream. For example, decreasing the temperature of a low viscosity skin may enhance viscosity matching and enhance flow stability. Other times, elastic effects need to be matched.

Conventional means for heating the feedblock-multiplierdie assembly, namely, the use of insertion- or rod- or cartridge-type heaters fitted into bores in the assembly, are frequently incapable of providing the temperature control required for the inventive optical films. Preferably, heat is provided uniformly from outside the assembly by (i) tiling its exterior with plate-type heaters, (ii) insulating thoroughly the entire assembly, or (iii) combining the two techniques. Plate-type heaters typically use a resistance-heating element embedded in a metal material, such as cast aluminum. Such heaters can distribute heat uniformly to an apparatus, such as, e.g., the feedblock.

In one embodiment of this invention, a polymer web is cast onto casting roll, sometimes referred to as a casting wheel or casting drum. The casting roll is preferably chilled to quench the web and begin the formation of a film or ILRE. Preferably, casting is assisted by electrostatic pinning, the details of which are well-known in the art of polyester film manufacture. For the inventive optical films, care should be exercised in setting the parameters of the electrostatic pinning apparatus. Periodic cast web thickness variations along the extrusion direction of the film, frequently referred to as "pinning chatter," should be avoided to the extent possible. Adjustments to the current, voltage, pinning wire thickness, and pinning wire location with respect to the die and the casting chill roll are all known to have an affect, and should be set on a case-by case basis by one skilled in the art.

The web can sometimes attain a sidedness in surface texture, degree of crystallinity, or other properties due to wheel contact on one side and merely air contact on the other. This can be desirable in some applications and undesirable in others. When minimization of such sidedness differences is desired, a nip roll can be used in combination with the casting roll to enhance quenching or to provide smoothing onto what would otherwise be the air side of the cast web.

In some cases, it is desired to provide the ILRE, film or layer with a surface relief structure or roughness or surface texture to improve handling in winding and/or subsequent conversion and use such removing wetting out or Newton's Rings.

ILRE as a Light Emitting Device or Component Thereof

In one embodiment of this invention, a light emitting device comprises an ILRE and at least one light source. In one embodiment of this invention, a light fixture comprises the injection molded article of one embodiment of this invention and a housing. In another embodiment of this invention, a backlight or light emitting device comprises the ILRE of one embodiment of this invention. In another embodiment of this invention, a backlight or light emitting device further comprises at least one of a light diffusing film, light collimating film, brightness enhancing film, polarizer or other film or optical component known to provide light control or re-direction in a backlight or light fixture. In one embodiment of this invention, a liquid crystal display comprises the backlight of one embodiment of this invention. In another embodiment of this invention, a light fixture or illumination apparatus comprises the light emitting device of one embodiment of this invention. In one embodiment, a light emitting device comprises an ILRE wherein the light emitted is more collimated relative to the device without the ILRE.

Figure 6:
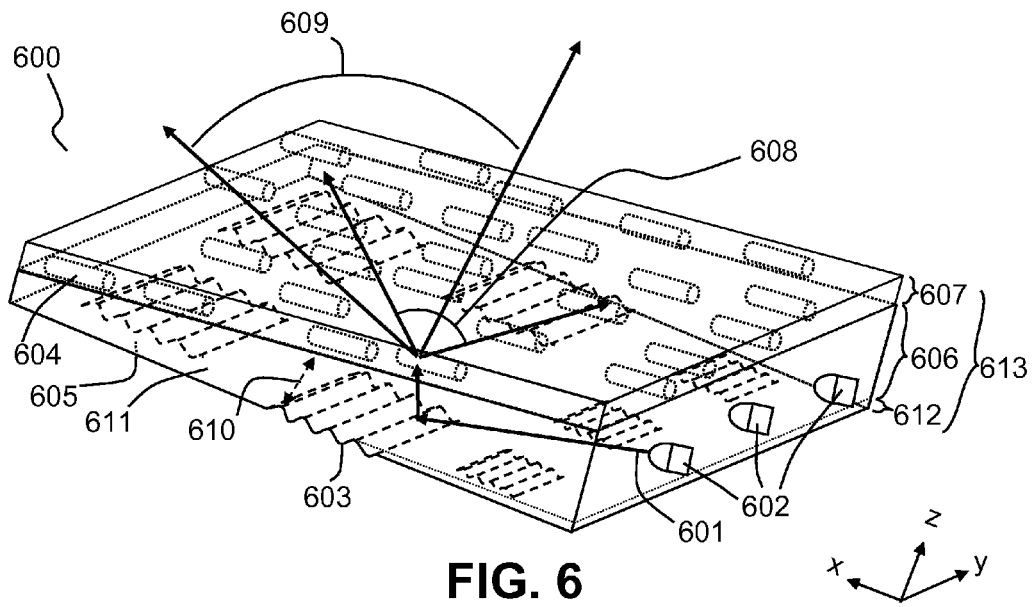
FIG. 6 is a perspective view of one embodiment of this invention of an edge-lit light emitting device comprising an ILRE.

FIG. 6 illustrates one embodiment of this invention of a light emitting device 600 comprising an ILRE 613, a linear array of light emitting diodes 602, a light transmitting region 606 disposed between a light diffracting region 612 and a volumetric anisotropic light scattering region 607. The light diffracting region 612 comprises backward diffracting elements 603 on the rear surface 605 of a light transmitting material 611. The separation 610 between the light scattering region 607 and the light diffracting region 612 is greater than one from the group of 100 μm, 500 μm, and 1 mm for more than 50% of the backward diffracting region 612 disposed to diffract light toward the light scattering region. The volumetric anisotropic light scattering region 607 comprises asymmetrically shaped light scattering domains 604 aligned in the x-direction. By oriented the domains in the x-direction with the light traveling within the light transmitting region in the x direction, the domains do not scatter too much light out of the lightguide in regions close to the light sources. Additionally, the peak angle and uniformity can be controlled separately by primarily the properties and arrangement of the light diffracting groups and elements. In one embodiment of this invention, the angular diffusion profile of the anisotropic light scattering region is larger in the y-z plane than the x-z plane such that the lightguide has increased spatial luminance and color uniformity in the y direction and the diffusion in the x-z plane is sufficient to provide a low angular color shift within an angular range within 30 degrees from the normal to the light output surface. In a further embodiment of this invention, the light emitted by the ILRE comprising a light scattering region and a backward diffracting region has a peak intensity within 30 degrees from the normal of the output surface of the optical element when illuminated by light at an incident angle of $\theta_1$ where $\theta_1 > 30$ degrees. In another embodiment of this invention, the angular diffusion profile of the anisotropic light scattering region is larger in the x-z plane than the y-z plane and the diffusion angles of the anisotropic light scattering region are chosen such that in combination with the light diffracting region, the lightguide has sufficient spatial luminance and color uniformity in the x and y directions and the diffusion in the x-z plane is sufficient to provide an angular color shift less than 0.01 within an angular range within 30 degrees from the normal to the light output surface.

In another embodiment of this invention, the angular diffusion profile of the anisotropic light scattering region is larger in the y-z plane than the x-z plane and the diffusion angles of the anisotropic light scattering region are chosen such that in combination with the light diffracting region, the lightguide has sufficient spatial luminance and color uniformity in the x and y directions and the diffusion in the x-z plane is sufficient to provide an angular color shift of less than 0.01 within an angular range within 30 degrees from the normal to the light output surface.

In one embodiment of this invention, a light emitting device comprises a first light source, a first light transmitting material disposed to receive light from the light source, a diffracting optical element with an angular chromatic dispersion within a first plane when illuminated at a first angle θ1 disposed to receive light from the light source and diffract light into a second angle θ2, where θ2≠θ1, a light scattering region with a first angular diffusion width at half maximum intensity of the diffusion profile in the first plane disposed to receive light from the light source wherein a portion of light from the light source is diffracted by the diffracting optical element and scattered by the light scattering region such that the angular color shift, Δu'v', of the light emitted by the light emitting device within a 30 degree angular range within the first plane is less than one from the group of 0.05, 0.01 and 0.004. In a further embodiment of this invention, a light emitting device comprising an ILRE has an angular color shift within a 50 or 70 degree angular range within the first plane less than 0.05.

The volumetric anisotropic light transmitting region 606 has a wedge-shape and is optically coupled to the volumetric anisotropic light scattering region 607 and its surface on the back side comprises the backward diffracting region 612. Light 601 from the LEDs 602 travels through the light transmitting region 606 and is backwardly diffracted by the backward diffracting elements 603 and passes through the volumetric anisotropic light scattering region 607 such that the light is scattered into a FWHM diffusion angle 609 in the y-z plane that is larger than the FWHM diffusion angle 608 in the x-z plane.

Figure 13:
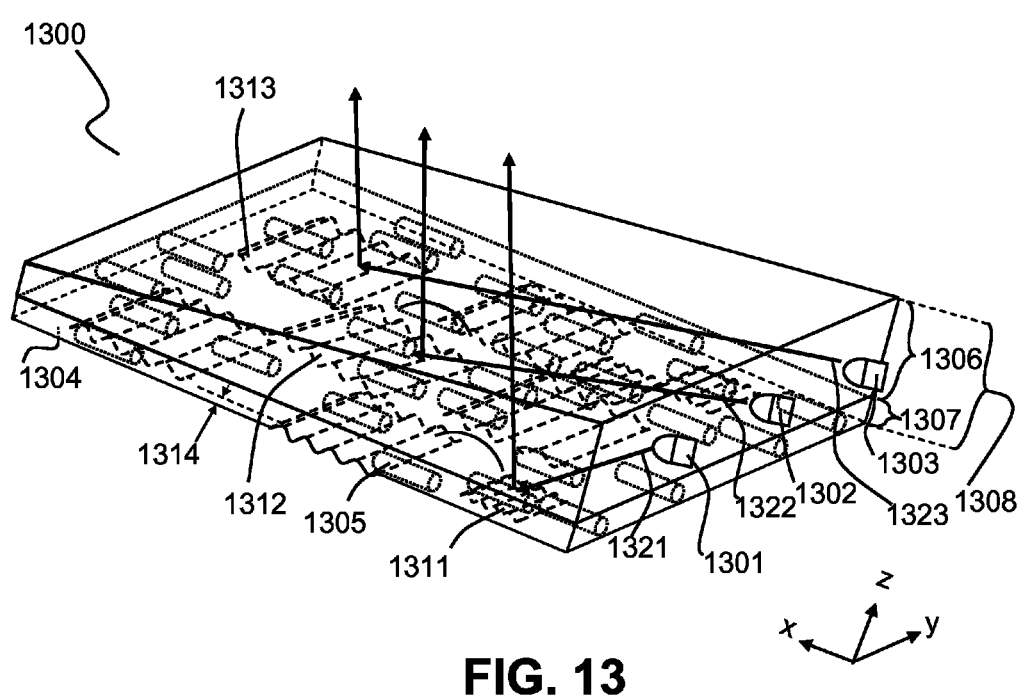
FIG. 13 is a perspective view of one embodiment of this invention of a light emitting device comprising an ILRE comprising a spatial arrangement of light diffracting regions with different pitches and light sources with different color outputs.

FIG. 13 illustrates one embodiment of this invention of a light emitting device 1300 comprising an ILRE 1308, a blue light emitting diode 1301, a green light emitting diode 1302, a red light emitting diode 1303, a light transmitting region 1306 and a volumetric anisotropic light scattering region 1307 comprising asymmetrically shape dispersed domains 1305 with a light diffracting region 1314 disposed on the lower surface 1304. The light diffracting region 1314 comprises backward diffracting elements 1311, 1312, and 1313, each with a different pitch which backwardly diffract blue light 1321, green light 1322, and red light 1323 from the blue LED 1301, green LED 1302, and red LED 1303, respectively. In one embodiment, the backward diffracting elements substantially direct the diffracted light toward the light output surface normal of the light emitting device 1300.

Figure 19:
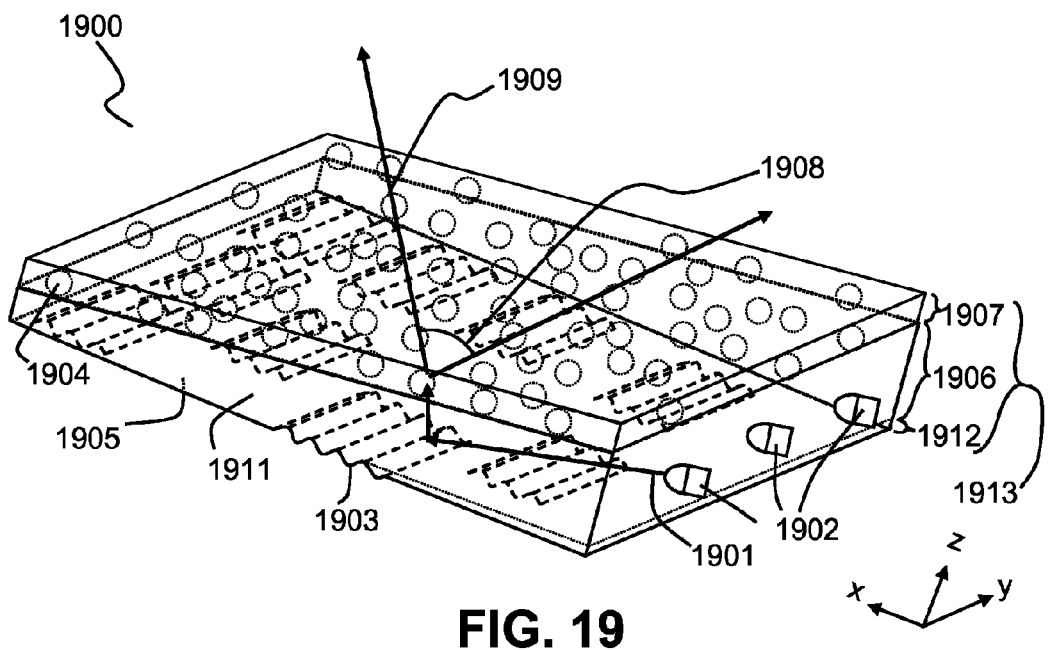
FIG. 19 is a perspective view of one embodiment of this invention of a light emitting device comprising an ILRE wherein the light scattering region is a region comprising phosphors.

FIG. 19 illustrates one embodiment of this invention of a light emitting device 1900 comprising an ILRE 1913 comprising a linear array of blue light emitting diodes 1902, a light transmitting region 1906 disposed between a light diffracting region 1912 and a light scattering region 1907. The light diffracting region 1912 comprises backward diffracting elements 1903 on the rear surface 1905 of a light transmitting material 1911. The light scattering region 1907 comprises phosphors 1904 which convert and scatter the incident blue 1901 light such that a significant portion of the light 1909 escapes the light emitting device 1900 within an angular range 1908 with different spectral properties such as substantially white light. Suitable phosphors and phosphor materials are known in the art of white LEDs or OLEDs produced by one or more phosphor materials or light conversion materials when illuminated with blue or blue-UV light and are suitable for use in one or more embodiments of this invention. In a further embodiment of this invention, the light scattering region comprises quantum dots, up-conversion materials or other materials known to scatter and convert light of a first wavelength range into a second wavelength range.

In one embodiment of this invention, a light fixture comprising an ILRE has a first glare ratio, G1 of less than 30% wherein the first glare ratio is defined as the luminance at 50 degrees divided by the luminance at 0 degrees in a first output plane. In a further embodiment of this invention, a light fixture comprising an ILRE has a first glare ratio less than 20%, 10% or 5% in a first output plane.

In one embodiment of this invention, a light fixture comprising an ILRE has a second glare ratio, G2 of less than 30% wherein the second glare ratio is defined as the luminance at 50 degrees divided by the luminance at 0 degrees in a second output plane orthogonal to the first output plane. In a further embodiment of this invention, a light fixture comprising an ILRE has a second glare ratio less than 20%, 10% or 5% in a second output plane.

In one embodiment of this invention, a light fixture comprising an ILRE has a first glare ratio less than 30% and a second glare ratio greater than 30%.

In a further embodiment of this invention, a light emitting device comprises a substantially polarized light source, a polarization selective light diffracting region, and a polarization preserving light scattering region. In one embodiment of this invention, a polarization selective backward diffracting region selectively diffracts substantially polarized light from a polarized LED or OLED into angles such that the light escapes the lightguide after passing through a polarization maintaining light scattering region. In a further embodiment of this invention, the light transmitting material, the light scattering region, the dispersed domains comprise materials with substantially isotropic refractive indexes. Similarly, the light diffracting region may comprise a light transmissive diffracting region.

In one embodiment of this invention, the ILRE comprises a low refractive index first light transmitting material with inverted light collimating surface features and high refractive index materials optically coupled to both surfaces of the first light transmitting material and light collimating surface features such that the glare is reduce at higher angles such as 50 degrees due to increased collimation along one or more output planes.

In one embodiment of this invention, the ILRE is lightguide with luminance uniformity greater than 70% when illuminated from an edge by one or more light sources.

The ILRE of this invention can be used to provide improved luminance and color uniformity and angular light distribution when illuminated from the edge. A light emitting device comprising an ILRE can be used to provide illumination to an area such as a room, hallway, building, exterior surface, etc. In one embodiment of this invention a light fixture comprises an ILRE and a light source. The ILRE of this invention can be used as a backlight lightguide for illuminating a spatial light modulating device such as an LCD. In one embodiment, the ILRE illuminates an LCD providing spatial luminance uniformity greater than 70%, spatial color shift within two regions of the light output surface less than 0.05, or angular color shift less than 0.05 within a first angular range.

Light Fixture Configuration

Figure 17:
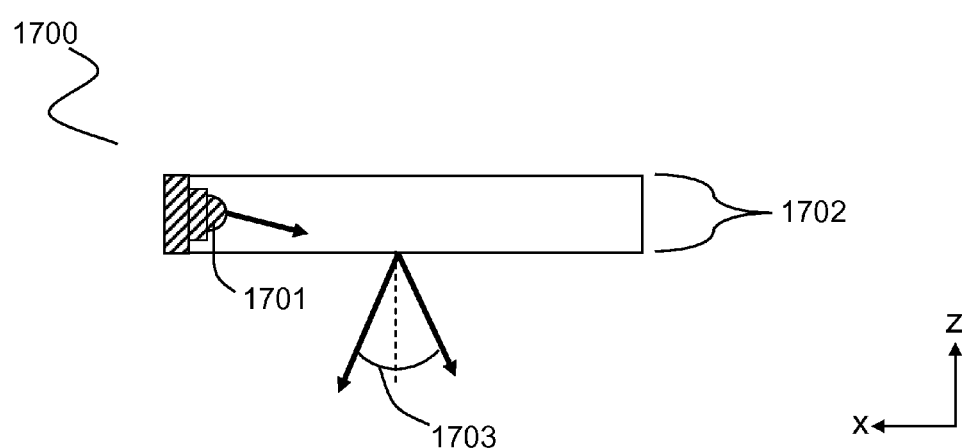
FIG. 17 is a cross-sectional view of one embodiment of this invention of a light fixture comprising an ILRE.

FIG. 17 illustrates one embodiment of this invention of a light fixture 1700 comprising a light source 1701, and an ILRE 1702. Light emitted from the light source 1701 is diffracted and scattered by the ILRE 1702 such that the light output from the light fixture 1700 has an angular color shift, $\Delta u'v'$, within the angular range 1703 of less than 0.05. In one embodiment, the angular range 1703 is one selected from a group of 30 degrees, 50 degrees and 70 degrees. In another embodiment of this invention, the angular color shift, $\Delta u'v'$, within the angular range 704 is less than one selected from the group of 0.05, 0.01 and 0.004.

In a further embodiment the illuminance profile of the total light output profile from the light fixture has an angular illuminance color variation within a first angular illuminance range of less than 0.05. In a further embodiment, the first angular illuminance range is one selected from a group of 30 degrees, 50 degrees and 70 degrees. In another embodiment of this invention, the angular color shift, $\Delta u'v'$, within the angular illuminance range is less than one selected from the group of 0.05, 0.01 and 0.004.

Backlight and Display Configuration

The backlight of one embodiment of this invention includes an ILRE that comprises one or more light scattering regions and one or more light diffracting region comprising one or more light diffracting groups. In one embodiment, the ILRE further comprises light collimating refractive features. The backlight may also include other layers, coatings, or regions that collimate a portion of the light from the light sources in a direction toward the normal of the backlight. In one embodiment of this invention, a backlight comprising an ILRE directs a significant portion of light from the ILRE into a first angular range from a first angle to a second angle with respect to the normal of the backlight and one or more of the optical films may re-direct a substantial amount of the light from this first angular range toward the backlight normal.

Figure 7:
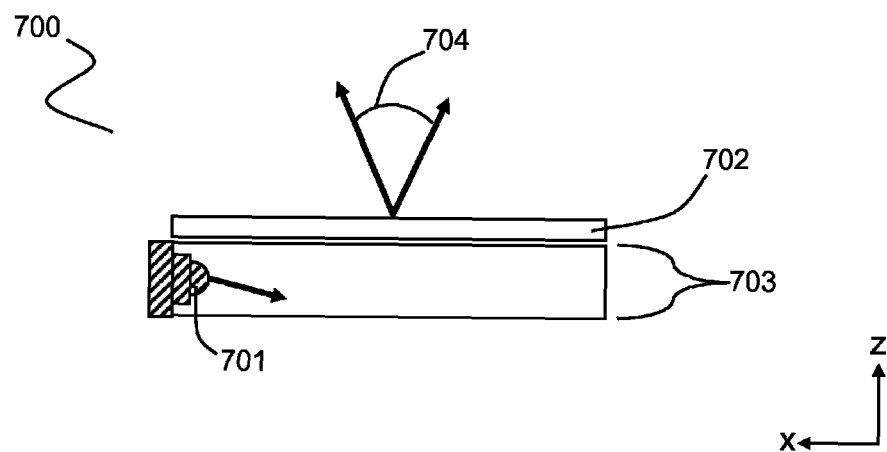
FIG. 7 is a perspective view of one embodiment of this invention of a display comprising an ILRE.

FIG. 7 illustrates one embodiment of this invention of a display 700 comprising a light source 701, an ILRE 703 and a spatial light modulator 702. Light emitted from the light source 701 is diffracted and scattered such that it passes through the spatial light modulator 702 and the light output from the display has an angular color shift, Δu'v', within the angular range 704 of less than 0.05. In one embodiment, the angular range 704 is one selected from a group of 30 degrees, 50 degrees and 70 degrees. In another embodiment of this invention, the angular color shift, Δu'v', within the angular range 704 is less than one selected from the group of 0.05, 0.01 and 0.004.

In one embodiment of this invention, a backlight includes at least one PDALS region and one NPDALS region located between the light source and the display. The light source in the backlight or light emitting device of one embodiment of this invention may be one or more fluorescent sources, organic LED's, inorganic LED's, photonic lattice LED's, photonic bandgap light sources, polarized LED, electroluminescent sources, carbon nanotube, FED, laser or other luminous sources known to be usable in display applications.

The shape and configuration of the light sources may be point sources such as discrete LED's, linear such as a linear array of CCFL lamps, grid arrays of LED's, serpentine shaped fluorescent bulbs, or a planar sources such as flat fluorescent lamps. The shape and configuration may be regular or irregular such that the resulting backlight or light emitting device system luminance uniformity is greater than 70%.

Figure 18:
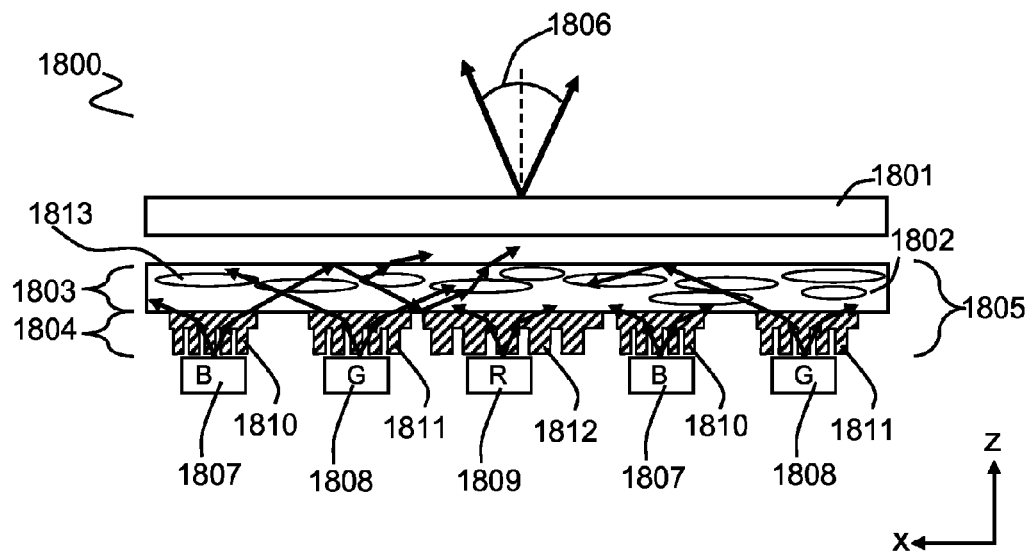
FIG. 18 is a cross-sectional view of one embodiment of this invention of a direct-lit light emitting device comprising an ILRE.

FIG. 18 is a cross-sectional view of an embodiment of this invention of a direct-lit display comprising an ILRE. The display 1800 comprises an ILRE 1805, more than one light source and a spatial light modulator 1801. The ILRE comprises a volumetric anisotropic light scattering region 1803 and a light diffracting region 1804. The light diffracting region 1804 comprises light diffracting elements 1810 designed to direct light from the blue LEDs 1807 into large angles within the light scattering region 1803 such that a significant amount of light is input-coupled into the light scattering region 1803 and satisfies the conditions for total internal reflection and waveguiding. Similarly, the light diffracting region 1804 further comprises light diffracting elements 1811 designed to direct light from the green LEDs 1808 into large angles within the light scattering region 1803 such that a significant amount of light is input-coupled into the light scattering region 1803 and satisfies the conditions for total internal reflection and waveguiding. Also, the light diffracting region 1804 further comprises light diffracting elements 1812 designed to direct light from the red LEDs 1809 into large angles within the light scattering region 1803 such that a significant amount of light is input-coupled into the light scattering region 1803 and satisfies the conditions for total internal reflection and waveguiding. The light diffracting elements can be arranged in a grid, array or other spatial pattern such that a desired color and luminance uniformity is achieved. By using linear diffracting gratings as input couplers into a light scattering region, the lateral spread of light can be achieved in a very thin component and control the diffusion of the light in the direction orthogonal to the plane of diffraction of the grating. In a further embodiment, the light scattering region is symmetrically scattering and the diffraction grating elements are linear crossed diffraction grating elements or radial diffraction grating elements. By optimizing the grating pitch along with the cross-sectional profile in the x-z or y-z planes and the angular FWHM of the diffusion profile in the x-z or y-z planes and the light transmission for a first polarization state of the light scattering region, the angular color shift, Δu'v', within a first angular range can be of less than 0.05 and the luminance or color uniformity can be greater than 70%.

In one embodiment of this invention, a backlight configured similar to the light emitting device of FIG. 19 comprises a light scattering region comprising phosphors within in the phosphor layer 1907. In a further embodiment of this invention, the light scattering region 1907 comprises a phosphor layer that is a photoluminescent polarizer. A photoluminescent polarizer can efficiently emit and illuminate a liquid crystal panel forming a more efficient display with higher light output.

Light Emitting Device Thickness

In one embodiment of this invention, the light emitting device is a direct-lit type. In another embodiment of this invention, the light emitting device is an edge-lit type which can generally be made thinner than a direct-lit type. In one embodiment of this invention, the ILRE increases the uniformity, reduces the thickness and provides increased collimation. In one embodiment of this invention, a light emitting device comprises at least one light source, and an ILRE and a lightguide wherein the ratio of the distance, $d_0$, from the furthermost region of the lightguide disposed to output light from the device from a light source providing light for the light emitting device to the thickest region, $w_0$, of the lightguide disposed in a region to output light from the device is greater than one selected from the group of 100, 200, 500 and 1000. In a further embodiment of this invention, $d_0$ is greater than one selected from the group of 400 mm, 600 mm, 800 mm and 1000 mm.

In a further embodiment of this invention, a light emitting device comprises an ILRE (comprising the light output surface of the light emitting device), an optical waveguide, and a white diffusely reflecting film opposite the light output side of the waveguide. In a further embodiment of this invention, a light emitting device comprises an ILRE and at least one of the group of light sources, optical elements, films or waveguides disclosed in an embodiment of U.S. Pat. No. 5,594,830, the contents of which are incorporated by reference herein.

Other Films, Components, or Layers

The light emitting device or ILRE may comprise one or more light re-directing, brightness enhancement, prismatic films, reflective or absorptive polarizers, non-polarization dependent light homogenizer, polarization-dependent light homogenizer, or other optical films commonly used in backlights for displays or light fixtures may also be used to provide improved angular or spatial luminance or color uniformity, light efficiency, light re-direction, or polarized light or angular light recycling.

In another embodiment of this invention a light emitting device comprises an ILRE and at least one additional collimating element such as a 90 degree apex angle prismatic film. In one embodiment of this invention, the light incident on a collimating film from the ILRE is preconditioned by the ILRE such that more light is transmitted and collimated such that the FWHM angular output angles of the light emitting device comprising the ILRE and collimating film along one or more output planes is reduced relative to a light emitting device comprising the collimating film and not the ILRE. In one embodiment of this invention, a light emitting device comprises two crossed 90 degree prismatic collimating films and an ILRE such that the angular width of the FWHM intensity profile within one output plane is less that 15 degrees. In an additional embodiment of this invention, a light emitting device comprises two crossed 90 degree prismatic collimating films and an ILRE such that the angular width of the FWHM intensity profile within one output plane is less that 10 degrees. In another embodiment of this invention, a light emitting device comprises two crossed 90 degree prismatic collimating films and an ILRE such that the FWHM along one output plane is less than 8 degrees. In another embodiment of this invention, a light emitting device comprises one 90 degree prismatic collimating film and an ILRE such that the FWHM along one output plane is less than 70 degrees.

In another embodiment of this invention, a light emitting device comprises an ILRE further comprising dispersed phase domains dispersed within the substrate or light transmitting region as describe in U.S. Patent Application Publication No. 20070201246, the contents of which is incorporated herein by reference. In this embodiment, the angular width of the FWHM intensity profile within one output plane of the ILRE when illuminated with collimated light with a wavelength of 532 nm at 0 degrees is less than one selected from the group of 8 degrees, 10 degrees, 15 degrees or 20 degrees. In another embodiment of this invention, a light emitting device comprises a 90 degree prismatic collimating film disposed above a ILRE wherein the prisms are oriented substantially orthogonal to the dispersed phase domains and further comprises a second 90 degree prismatic film disposed on the opposite side of the ILRE providing brightness and uniformity enhancement, a waveguide, and at least one light emitting diode.

The light emitting device may also comprise an ILRE and a light re-directing component that re-directs a substantial portion of the light into an off-axis orientation. In one embodiment of this invention, a light emitting device comprises a ILRE and a non-symmetrical prismatic film such as a Image Directing Film (IDF or IDFII) or Transmissive Right Angle Film (TRAF or TRAFII) sold by 3M. In one embodiment of this invention, a light emitting device comprises an ILRE and a non-symmetrical prismatic film. In one embodiment of this invention, a light emitting device comprises an ILRE and a symmetrical prismatic film to re-distribute the light symmetrically about an axis such as a prismatic film with a 60 degree apex angle with the prisms oriented toward the output surface. In other embodiment of this invention, an ILRE or a light emitting device comprising an ILRE, comprises a lenticular lens array, a light reflecting region, light transmitting regions, and a linear prism film with an apex angle between 45 degrees and 75 degrees where the substrate of the linear prism film is coupled directly or through another layer to the light reflecting regions with the prisms oriented away from the lenticules. In another embodiment of this invention, the linear prism film is a "reverse prism film" such as sold by Mitsubishi Rayon Co., Ltd. under the trade names of DIA ART H150, H210, P150 and P210, or is a prismatic film of a similar type as disclosed in the embodiments within U.S. Pat. Nos. 6,545,827; 6,151,169; 6,746,130; and 5,126,882, the contents of which are incorporated by reference herein.

Polarization sensitive light homogenizers such as those discussed in U.S. patent application Ser. No. 11/828,172, the contents of which are incorporated by reference herein, may be used as the anisotropic light scattering film, an additional film within the ILRE or in conjunction with the ILRE to form a backlight or light fixture.

In one embodiment of this invention, a light emitting device comprises an LED array on a flexible circuit disposed in a circular or arc shape in proximity to a waveguide within an ILRE or as a separate component from the light recycling directional control element. In another embodiment of this invention, a light emitting device comprising an ILRE further comprises a circular array of LED's on flexible circuit such that the light from the LED's is directed inward toward the center of a circular disc-shaped waveguide comprising light extraction elements of at least one type selected from the group of embossed features, light refracting features, light diffracting features, laser-ablated features, stamped features, inked surface patterns, injection molded features, etched surface patterns, sand or glass-blasted micro-patterns, UV cured embossing patterns, dispersed phase particle scattering, scattering from region comprising beads, fibers or light scattering or diffracting shapes. In one embodiment of this invention, the light emitting device has a substantially curve output surface in one or more planes, such as a domed light fixture or a planar circularly display.

One or more elements or films within the light emitting device or ILRE may be combined by using adhesives (such as pressure sensitive adhesives), thermally bonding, co-extrusion, insert molding, and other techniques known to combine two polymeric films or elements. In one embodiment of this invention, a ILRE comprises an element with surface relief structures of a first material with a first refractive index ns that is at least one of a lenticular lens array and light collimating element wherein the element is physically coupled to second optical element by using second material with a second refractive index nc such that ns−nc>0.01. In this embodiment, the lenticular lens array or collimating element can be physically coupled to another element while still retaining a level of refraction or reflection. In another embodiment, the value ns−nc is greater than one selected from the group of 0.05, 0.1, 0.2, 0.4 or 0.5. In one embodiment, the lenticular lens array or collimating element or light transmitting material with a surface relief structure is made of a high refractive index UV curable material.

In one embodiment of this invention, the ILRE (or light emitting device comprising the same) comprises at least one coating or component selected from the group of anti-reflection coating or film, anti-glare film or coating, tinted film or coating, colored coating or tint, light scattering coating or film, hard-coating or film comprising a hard-coating, housing or element to hold more than one component together, element to enable rotation or translation of one or more elements relative to the other.

In another embodiment of this invention, a light emitting device comprises an electrical device for controlling the color (such as individually adjusting the output from a red, green and blue LED), angular light output profile (such as by moving a lens), direction of the light output profile, intensity of the light output, and mode of operation.

The ILRE may comprise additional layers to provide functional properties such as improved extrusion, UV protection, slip promotion, increased toughness, adhesion promotion, conductive layers, anti-static properties, shatter resistance, etc.

The ILRE or light emitting device of one embodiment of the present invention may further be laminated to rigid or semi-rigid substrates, such as, for example, glass, metal, acrylic, polyester, and other polymer backings to provide structural rigidity, weatherability, or easier handling. For example, the optical films of the present invention may be laminated to a thin acrylic or metal backing so that it can be stamped or otherwise formed and maintained in a desired shape. For some applications, such as when the ILRE is applied to other breakable backings, an additional layer comprising PET film or puncture-tear resistant film may be used.

Various optical layers, materials, and devices may also be applied to, or used in conjunction with the ILREs and light emitting devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent film for low emissivity applications; release films or release coated paper; and polarizers or mirrors. Multiple additional layers on one or both major surfaces of the ILRE are contemplated, and can be any combination of aforementioned coatings or films. For example, when an adhesive is applied to the optical film, the adhesive may contain a white pigment such as titanium dioxide to increase the overall reflectivity, or it may be optically transparent to allow the reflectivity of the substrate to add to the reflectivity of the optical film.

For some applications, it may also be desirable to provide the ILREs and light emitting devices of the present invention one or more layers having continuous and disperse phases in which the interface between the two phases will be sufficiently weak to result in voiding when the film is oriented. The average dimensions of the voids may be controlled through careful manipulation of processing parameters and stretch ratios, or through selective use of compatibilizers. The voids may be back-filled in the finished product with a liquid, gas, or solid.

In one embodiment of this invention, the ILRE comprises one or more layers, coatings or films or additives described in U.S. Pat. No. 6,808,658, the contents of which are incorporated by reference herein.

Collimating and Diffusing Films

One or more collimating films and diffuser films may be used within the backlight stack of this invention including a ILRE in order to achieve the desired luminance profile from the backlight and resulting display. In one preferred embodiment, a prismatic collimating film is used in the backlight to direct light from large angles in the vertical direction (as viewed in a typical television display application) toward the direction normal to the display. Two collimating films of linear arrays of prisms that are arranged perpendicular to each other (crossed prismatic films) may be used to further increase the amount of light directed perpendicular to the surface of the backlight or display. Diffusing films that contain surface features may provide collimating properties as well as diffusion properties. The diffusing properties may also help to reduce the visibility of features such as the tips of the prismatic arrays. In some embodiments, a diffusion film is located between the ILRE and the prismatic collimating film. In another embodiment, a diffuser film is located between the prismatic film and the display. In another embodiment, more than one diffuser film is located between the ILRE and the display and a prismatic film is not used.

Waveplates

One or more optical retardation films may be used in conjunction or as part of the ILRE in an optical system such as a backlight. In one embodiment of this invention, at least one element from the group of anisotropic light scattering region, anisotropic light scattering substrate, diffraction grating, diffraction grating substrate, light guide, light guide in combination with ILRE or a component thereof is polarization sensitive such that the addition of a optical retarder or waveplate into an element or as a separate film or component within the optical system increases the optical efficiency or polarization recycling efficiency.

Polarizers

Reflective polarizers may be used to improve the light recycling of the ILRE. This provides additional recycling of polarization that would normally be absorbed in the bottom polarizer of a liquid crystal display. Reflective polarizers may reflect linear or circularly polarized light. In some embodiments a linear reflective polarizer is used between the collimating film and liquid crystal display. In another preferred embodiment, a reflective polarizer is used between the ILRE and the display. In one embodiment of this invention an ILRE comprises a polarizer or is optically coupled to a polarizer.

Light Sources

The light source used within one embodiment of this invention is at least one selected from the group of fluorescent lamp, cold-cathode fluorescent lamp, compact fluorescent, radiofluorescent, halogen, incandescent, Mercury vapor, sodium vapor, high pressure sodium, metal halide, tungsten, carbon arc, electroluminescent, LED, OLED, laser, photonic bandgap based light source. In one embodiment of this invention, the light source is a transparent OLED such as those produced by Universal Display Corporation. In a further embodiment of this invention, at least one of the light transmitting regions (or material) comprises a phosphor or phosphorescent material and the light source emits light capable of exciting the phosphor. In one embodiment of this invention, the light transmitting region comprises at least one phosphor material such that substantially blue or UV light from at least one LED incident on the phosphor will cause the phosphor to emit light which will be substantially collimated or directed by the lenticular lens array or beads. By using a phosphor material in the light transmitting regions which will effectively convert the wavelength and transmit light, the light emitting device can be made more uniform by light recycling and reflection from the light reflecting regions of a ILRE and the output will direction will be efficiently controlled. In one embodiment of this invention, a light emitting device comprises an organic light emitting diode (OLED) and an ILRE where the angular width of the output of the light emitting device is less than the angular width of the output of the OLED light source.

The optical axis of the light source is defined herein as the axis of light emitted from the light source with the highest intensity. With some light sources, this axis may be parallel, perpendicular or at an angle to a physical edge or surface of the light source. With top emitting LEDs, the optical axis is typically normal to the output surface. With side emitting LEDs the optical axis can be parallel to a mounting plane or in the case of an LED with a side-emitting primary optic, the LED may have more than one optical axis extending in a radial plane or cone from the light source.

In one embodiment of this invention, the light source comprises an array of light emitting devices. In a further embodiment, the light source is a linear array of LEDs aligned parallel to an axis, thus defining the light source axis.

The different variations in features and designs of the ILRE backlight and method of manufacture described herein can be envisioned and include one or more combinations of the features described below:

1. Light sources: CCFL; LED; OLED; electroluminescent material; laser diode; carbon nanotube; fluorescent bulb; substantially planar fluorescent bulb; halogen bulb; incandescent bulb; metal halide bulb;
2. Light source color: Red; green; blue; white; cyan; magenta; yellow;
3. Light source location: in a plane substantially parallel to the display surface; beneath the display; one edge of the waveguide; more than one edge of a waveguide; opposite side of the waveguide than the liquid crystal cell; within the waveguide;
4. Light source configuration: linear array; grid array; regularly positioned; irregularly positioned; in red, green and blue clusters; color based arrays;

5. Spacing between light-scattering regions, collimating films, display, polarizers, diffuser films, and diffusing plates: air gap; optically coupled.
6. Scattering region:
   a. Scattering region location: above the light source; beneath the display; above collimating film(s); below collimating film(s); in-between collimating films; within the collimating structures; in the substrate of the collimating structures; on the surface of the ILRE; within the volume of the ILRE; in regions of the substrate or collimating structures separated by a non-scattering region; within a polarizer; on the surface of a polarizer; within an adhesive layer;
   b. Diffusing domain shapes: symmetric domains; asymmetric domains; a combination of asymmetric and symmetric domains.
   c. Diffusing domains refractive index: average refractive index $n_d$ wherein $|n_d-n_m|>0.001$; domain refractive index $n_{dx}$, $n_{dy}$, and $n_{dz}$ in the x, y, and z directions, respectively, and matrix refractive index $n_{mx}$ and $n_{my}$ and $n_{mz}$ in the x, y, and z directions respectively, wherein $|n_{dx}-n_{mx}|>0.01$; $|n_{dy}-n_{my}|>0.01$; or $|n_{dz}-n_{mz}|>0.01$; $|n_{dx}-n_{mx}|<0.005$; $|n_{dy}-n_{my}|<0.005$; or $|n_{dz}-n_{mz}|<0.005$;
   d. Diffusing domains concentration: less than 1% by weight; greater than 1% and less than 40% by weight; between 40% and 50% by weight; greater than 50% by weight;
   e. Asymmetric domain alignment: substantially parallel to an edge of the display; substantially perpendicular to an edge of the display; or at an angle beta with respect to an edge of the display; substantially parallel to an array of light sources; substantially perpendicular to a an array of light sources or at an angle beta with respect to an array of light sources; substantially parallel to an array of collimating features; substantially perpendicular to a an array of collimating features or at an angle beta with respect to an array of collimating features.
7. Collimating region type: Prismatic; microlens; pyramidal; conical; hemispherical; array of refractive features; array of diffractive features; array of light-scattering features;
8. Collimating region orientation: substantially parallel to an array of light sources; substantially perpendicular to a an array of light sources or at an angle beta with respect to an array of light sources; substantially parallel to an edge of the display; substantially perpendicular to an edge of the display; or at an angle beta with respect to an edge of the display;
9. Light redirecting region type: Prismatic; microlens; pyramidal; conical; hemispherical; array of refractive features; array of diffractive features; array of light-scattering features; waveguide resonant structures; guided-mode resonant structures; diffractive-refractive hybrid;
10. Light redirecting region orientation: substantially parallel to an array of light sources; substantially perpendicular to a an array of light sources or at an angle beta with respect to an array of light sources; substantially parallel to an edge of the display; substantially perpendicular to an edge of the display; or at an angle beta with respect to an edge of the display;
11. Light-collimating region or light-redirecting region comprising arrays of prisms:
   a. Prism Pitch: Constant; non-constant (irregular); random.
   b. Prism Orientation: At an angle, phi, with respect to a predetermined edge; or at an angle phi2, wherein phi2 varies across the length of the prisms.
   c. Prism height: Constant; varying lengthwise across the length of the prisms; varying from one prism to another.
   d. Prism Apex angle: At a constant angle, alpha; or at an angle alpha2, wherein alpha2 varies across the length of the prisms; or at an angle alpha3, wherein alpha3 can vary from one prismatic structure to the next
   e. Prism structure refractive index: $n_m$, with the region in optical contact with the prism structure having a refractive index $n_1$ wherein $n_m > n_1$.
   f. Surface structure on sheet face opposite prism face: planar; prismatic; microlens array; surface relief structure providing pre-determined angular scattering (included ruled structure, holographic diffuser); any combination of the above structures.
12. Polarization-sensitive light-scattering region type: Reflective; absorptive; linear; circular; partially reflective and absorptive;
13. Polarization-sensitive light-scattering region location: between the display and light source; between a collimating film and the ILRE; between a diffuser film and a collimating film; between the ILRE and a diffuser film;

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:
1. An optical element comprising:
   a) an input surface;
   b) an output surface;
   c) a light transmissive diffractive region;
   d) a light scattering region optically coupled to the light transmissive diffractive region and disposed between the light transmissive diffractive region and the output surface;
   wherein a portion of incident light with a wavelength, $\lambda$, incident at an angle $\theta_1$ is diffracted forward by the light transmissive diffractive region and subsequently diffused by the light scattering region such that a ratio of angular diffusion of the light scattering region to angular chromatic dispersion of at least one light transmissive diffractive element is greater than 0.5.
2. The optical element of claim 1 wherein $\theta_1$ is greater than 30 degrees.
3. The optical element of claim 1 wherein $\lambda$ is selected from a wavelength range of 400 to 700 nanometers.
4. The optical element of claim 1 wherein $\theta_1$ is an angle selected from a range between 50 and 80 degrees.

5. The optical element of claim 1 wherein the light transmissive diffractive region is a linear diffraction grating comprising linear diffractive elements oriented parallel to a first direction.

6. The optical element of claim 5 wherein the linear diffractive elements have a substantially triangular cross section.

7. The optical element of claim 5 wherein the linear diffractive elements have a substantially rectangular cross section.

8. The optical element of claim 1 wherein the light scattering region anisotropically scatters light and has a full angular width at half maximum intensity in a first plane comprising the first direction less than a full angular width at half maximum intensity in a second plane orthogonal to the first plane.

9. The optical element of claim 1 wherein the light scattering region anisotropically scatters light and has a full angular width at half maximum intensity in a first plane comprising the first direction greater than a full angular width at half maximum intensity in a second plane orthogonal to the first plane.

10. The optical film of claim 1 wherein a ratio of angular diffusion of the light scattering region to angular chromatic dispersion of at least one light transmissive diffractive element is greater than 1.

11. The optical element of claim 1 wherein light emitted by the optical element from the output surface has a peak intensity within 30 degrees from normal of the output surface.

12. The optical element of claim 1 wherein the light scattering region comprises a volumetric light scattering material.

* * * * *